US011466162B2

(12) United States Patent
O'Brien et al.

(10) Patent No.: US 11,466,162 B2
(45) Date of Patent: Oct. 11, 2022

(54) MULTI-STAGE POLYMERIC LATEXES, COATING COMPOSITIONS CONTAINING SUCH LATEXES, AND ARTICLES COATED THEREWITH

(71) Applicant: SWIMC LLC, Cleveland, OH (US)

(72) Inventors: Robert M. O'Brien, Monongahela, PA (US); Mark Stuetelberg, Hiawatha, KS (US); Joseph D. Desousa, Pittsburgh, PA (US); Mary Jo Scandolari, Caraopolis, PA (US); Nikolaus Koch, Greensburg, PA (US); Stephen Pollin, Ambridge, PA (US); Nusrah Hussain, Pittsburgh, PA (US)

(73) Assignee: SWIMC LLC, Cleveland, OH (US)

( * ) Notice: Subject to any disclaimer, the term of this patent is extended or adjusted under 35 U.S.C. 154(b) by 0 days.

(21) Appl. No.: 16/805,602

(22) Filed: Feb. 28, 2020

(65) Prior Publication Data
US 2020/0199396 A1 Jun. 25, 2020

Related U.S. Application Data

(63) Continuation of application No. PCT/US2018/049143, filed on Aug. 31, 2018.

(60) Provisional application No. 62/725,204, filed on Aug. 30, 2018, provisional application No. 62/553,309, filed on Sep. 1, 2017.

(51) Int. Cl.
| | |
|---|---|
| *C09D 5/02* | (2006.01) |
| *C09D 151/00* | (2006.01) |
| *C08F 220/12* | (2006.01) |
| *C08F 265/06* | (2006.01) |
| *B65D 25/14* | (2006.01) |
| *C08F 220/06* | (2006.01) |
| *C08F 220/14* | (2006.01) |

(52) U.S. Cl.
CPC .......... *C09D 5/027* (2013.01); *C08F 220/06* (2013.01); *C08F 220/14* (2013.01); *C08F 265/06* (2013.01); *C09D 151/003* (2013.01)

(58) Field of Classification Search
None
See application file for complete search history.

(56) References Cited

U.S. PATENT DOCUMENTS

| | | | |
|---|---|---|---|
| 3,943,187 A | 3/1976 | Wu | |
| 4,071,163 A | 1/1978 | Martin | |
| 4,071,463 A | 1/1978 | Steinhauer | |
| 4,076,676 A | 2/1978 | Sommerfeld | |
| 4,150,005 A | 4/1979 | Gehman et al. | |
| 4,247,439 A | 1/1981 | Matthews et al. | |
| 4,285,847 A | 8/1981 | Ting | |
| 4,289,674 A | 9/1981 | Christenson et al. | |
| 4,305,859 A | 12/1981 | McEwan et al. | |
| 4,413,015 A | 11/1983 | Anderson et al. | |
| 4,443,568 A | 4/1984 | Woo | |
| 4,446,258 A | 5/1984 | Chu et al. | |
| 4,476,262 A | 10/1984 | Chu et al. | |
| 4,487,859 A | 12/1984 | Martino | |
| 4,499,212 A | 2/1985 | Martino | |
| 4,503,173 A | 3/1985 | Martino et al. | |
| 4,522,961 A | 6/1985 | Martino et al. | |
| 4,522,962 A | 6/1985 | Abbey et al. | |
| 4,684,708 A | 8/1987 | Deets et al. | |
| 4,948,834 A | 8/1990 | Baker et al. | |
| 4,963,602 A | 10/1990 | Patel | |
| 5,043,380 A | 8/1991 | Cole | |
| 5,157,078 A | 10/1992 | Woo et al. | |
| 5,201,436 A | 4/1993 | Owens et al. | |
| 5,264,469 A | 11/1993 | Mysliwczyk et al. | |
| 5,296,525 A | 3/1994 | Spencer | |
| 5,306,763 A | 4/1994 | Matsumoto et al. | |
| 5,308,890 A | 5/1994 | Snyder | |
| 5,387,625 A | 2/1995 | Parekh et al. | |
| 5,527,840 A | 6/1996 | Chutko et al. | |
| 5,532,297 A | 7/1996 | Woo et al. | |
| 5,714,539 A | 2/1998 | Perez et al. | |
| 5,830,952 A | 11/1998 | Pedersen et al. | |
| 5,869,552 A | 2/1999 | Pedersen et al. | |

(Continued)

FOREIGN PATENT DOCUMENTS

| | | | |
|---|---|---|---|
| EP | 0256391 | 2/1988 | |
| EP | 256391 A2 * | 2/1988 | ............... C09D 3/00 |

(Continued)

OTHER PUBLICATIONS

International Search Report and Written Opinion for International Application No. PCT/US2018/049059 dated Nov. 19, 2018.
International Search Report and Written Opinion for International Application No. PCT/US2018/049143 dated Dec. 21, 2018.
Wikipedia, "Acid Dissociation Constant", Feb. 17, 2019. https://en.wikipedia.org/wiki/Acid_dissociation_constant.
Wikipedia, "Vinyl group", Nov. 20, 2018. https://en.wikipedia.org/Vinyl_group.
Teng et al., "Effect of Introduction Mode of Hydroxyl Functionality on Morphology and Film Properties of Cycloaliphatic Diepoxide Crosslinkable Core-Shell Latex", Journal of Polymer Science Part A Polymer Chemistry 40(23): 4256-4265. Dec. 2002.
Chakraborty et al., "Assessment of Solubilization Characteristics of Different Surfactants for Carvedilol Phosphate as a Function of pH", Journal of Colloid and Interface Science 335 (2009) 242-249.

(Continued)

Primary Examiner — Vu A Nguyen
(74) Attorney, Agent, or Firm — Patterson Thuente Pedersen, P.A.

(57) ABSTRACT

An aqueous coating composition is provided that is useful in coating a variety of substrates, including interior or exterior portions of food or beverage cans. The coating composition includes a resin system that includes a multi-stage latex. In some embodiments, the multi-stage latex is formed using a process that includes emulsion polymerizing two or more stages in the presence of an aqueous dispersion including a water-dispersible polymer. In certain preferred embodiments, the water-dispersible polymer is a polyether polymer.

57 Claims, No Drawings

(56) References Cited

U.S. PATENT DOCUMENTS

| | | | |
|---|---|---|---|
| 5,877,239 | A | 3/1999 | Craun et al. |
| 5,922,817 | A | 7/1999 | Pedersen et al. |
| 6,008,273 | A | 12/1999 | Leibelt et al. |
| 6,710,113 | B2 | 3/2004 | Weitzel |
| 6,992,121 | B1 | 1/2006 | Peters et al. |
| 7,037,584 | B2 | 5/2006 | Wind et al. |
| 7,189,787 | B2 | 3/2007 | O'Brien et al. |
| 7,592,047 | B2 | 9/2009 | O'Brien et al. |
| 7,682,699 | B2 | 3/2010 | Wind et al. |
| 7,695,770 | B2 | 4/2010 | Dombrowski |
| 8,057,893 | B2 | 11/2011 | Killilea et al. |
| 8,092,876 | B2 | 1/2012 | O'Brien et al. |
| 8,105,744 | B2 | 1/2012 | Matsumura |
| 8,142,868 | B2 | 3/2012 | O'Brien et al. |
| 8,173,265 | B2 | 5/2012 | O'Brien et al. |
| 8,202,578 | B2 | 6/2012 | Killilea et al. |
| 8,617,663 | B2 | 12/2013 | O'Brien et al. |
| 8,835,012 | B2 | 9/2014 | O'Brien et al. |
| 8,907,005 | B2 | 12/2014 | Dombrowski et al. |
| 8,932,718 | B2 | 1/2015 | Garner et al. |
| 9,012,027 | B2 | 4/2015 | Nabuurs et al. |
| 9,029,470 | B2 | 5/2015 | Rademacher et al. |
| 9,181,448 | B2 | 11/2015 | Li et al. |
| 9,242,763 | B2 | 1/2016 | O'Brien et al. |
| 9,394,456 | B2 | 7/2016 | Rademacher et al. |
| 9,404,006 | B2 | 8/2016 | Li |
| 9,409,219 | B2 | 8/2016 | Niederst et al. |
| 9,415,900 | B2 | 8/2016 | O'Brien et al. |
| 9,862,854 | B2 | 1/2018 | O'Brien et al. |
| 10,023,997 | B2 | 7/2018 | Haven et al. |
| 2003/0059618 | A1 | 3/2003 | Takai |
| 2004/0236005 | A1 | 11/2004 | Scheerder et al. |
| 2006/0100366 | A1* | 5/2006 | O'Brien ................ C08F 265/10 524/800 |
| 2007/0265391 | A1 | 11/2007 | Yang et al. |
| 2008/0075868 | A1 | 3/2008 | Dombrowski et al. |
| 2009/0012207 | A1 | 1/2009 | Leyrer et al. |
| 2010/0068433 | A1 | 3/2010 | Gibanel et al. |
| 2012/0302690 | A1 | 11/2012 | Cunningham et al. |
| 2013/0105472 | A1 | 5/2013 | Beaudry et al. |
| 2013/0281574 | A1* | 10/2013 | Li ............................ C09D 5/20 523/453 |
| 2013/0316109 | A1 | 11/2013 | Niederst et al. |
| 2015/0004420 | A1 | 1/2015 | Hill et al. |
| 2015/0031830 | A1 | 1/2015 | Wu |
| 2015/0197597 | A1 | 7/2015 | Gallucci et al. |
| 2015/0197657 | A1 | 7/2015 | Niederst et al. |
| 2016/0009941 | A1 | 1/2016 | Rademacher |
| 2016/0024325 | A1 | 1/2016 | Li |
| 2016/0145430 | A1 | 5/2016 | Junk et al. |
| 2016/0297994 | A1 | 10/2016 | Kuo et al. |
| 2016/0376446 | A1* | 12/2016 | Gibanel ................ B32B 15/095 428/35.8 |
| 2017/0002227 | A1 | 1/2017 | Gibanel et al. |
| 2017/0096521 | A1 | 4/2017 | Niederst et al. |
| 2017/0369603 | A1 | 12/2017 | Gibanel et al. |

FOREIGN PATENT DOCUMENTS

| | | |
|---|---|---|
| EP | 0101307 B1 | 5/1989 |
| GB | 1555868 | 11/1979 |
| GB | 1574721 | 9/1980 |
| JP | 5339387 | 4/1978 |
| JP | 5043830 A | 2/1993 |
| JP | 2002155234 | 5/2002 |
| JP | 2008-001888 | 1/2008 |
| JP | 2016-065130 | 4/2016 |
| KR | 2010 0137850 | 12/2010 |
| WO | WO9514063 | 5/1995 |
| WO | WO2002064691 | 8/2002 |
| WO | WO2005121595 | 12/2005 |
| WO | WO2010097353 | 9/2010 |
| WO | WO2011009024 | 1/2011 |
| WO | WO2012089747 | 7/2012 |
| WO | WO2012170623 | 12/2012 |
| WO | WO2013191825 | 12/2013 |
| WO | WO2014025411 | 2/2014 |
| WO | WO2014134442 | 9/2014 |
| WO | WO2014139971 | 9/2014 |
| WO | WO2014139973 | 9/2014 |
| WO | WO2015002958 | 1/2015 |
| WO | WO2015002961 A1 | 1/2015 |
| WO | WO 2015/015827 | 2/2015 |
| WO | WO2015121595 | 8/2015 |
| WO | WO 2016/105502 A1 | 6/2016 |
| WO | WO2016105504 | 6/2016 |
| WO | WO2016196174 | 12/2016 |
| WO | WO2016196190 | 12/2016 |
| WO | WO2017079437 | 5/2017 |
| WO | WO20170012837 | 6/2017 |
| WO | WO2017180895 | 10/2017 |
| WO | WO2018013766 | 1/2018 |

OTHER PUBLICATIONS

The Polymer Property Database accessed online at https:polymerdatabase.com/polymer%20Physics/Polymer%20Tg.html, 6 pages, 2021.

Sigma-Aldrich, Dihexyl sodium sulfosuccinate for synthesis, Jul. 2020, 2 pages.

GEO Specialty Chemicals, "Bisomer PEM 6 LD Technical Data Sheet," Oct. 2020, 2 pages.

Cytec, "Specialty Additives: Surfactants for Emulsion Polymerization and Specialty Applications," 2010, 7 pages.

Adeka Corporation, "New Reactive Surfactant Adeka Reasoap ER/SR Series Technical Datasheet," Sep. 30, 2011, 8 pages.

Notice of Rejection from JP Patent Appln No. 2020-511960 dated Apr. 12, 2022, 13 pages.

* cited by examiner

MULTI-STAGE POLYMERIC LATEXES, COATING COMPOSITIONS CONTAINING SUCH LATEXES, AND ARTICLES COATED THEREWITH

CROSS REFERENCE TO RELATED APPLICATIONS

This application is a continuation under 35 U.S.C. § 111(a) of International Application No. PCT/US2018/049143 filed on Aug. 31, 2018, which claims priority to U.S. Provisional Application No. 62/553,309 filed on Sep. 1, 2017 and U.S. Provisional Application No. 62/725,204 filed on Aug. 30, 2018, both of which are entitled "MULTI-STAGE POLYMERIC LATEXES, COATING COMPOSITIONS CONTAINING SUCH LATEXES, AND ARTICLES COATED THEREWITH" and the disclosures of both of which are incorporated herein by reference in their entirety.

BACKGROUND

Bisphenol A has been used to prepare polymers having a variety of properties and uses. For example, bisphenol A may be reacted with epichlorohydrin to provide polymers useful in packaging coatings. There is a desire to reduce or eliminate the use of certain bisphenol A-derived polymers in food or beverage container coatings. Although a number of replacement coating compositions made without bisphenol A have been proposed, some replacement compositions have exhibited insufficient coating properties such as insufficient corrosion resistance on metal substrates, insufficient flexibility or insufficient toughness.

The balance of coating performance attributes required for a coating composition to be suitable for use as a food or beverage can coatings are particularly stringent and are unique from other coating end uses. As such, coatings designed for other ends uses are not typically suitable for use as food or beverage can coatings.

For example, coatings for use on food or beverage containers should avoid unsuitably altering the taste of the packaged food or beverage products, and should also avoid flaking or chipping into the packaged products. The coatings should also resist chemically aggressive food or beverage products (which can have a complex chemical profile, including salt, acids, sugars, fats, etc.) for extended periods of time (e.g., years). Food or beverage container coatings should also have good adhesion to the underlying substrate and remain sufficiently flexible after curing, because subsequent fabrication and denting during transportation, storage or use (e.g., by dropping) may cause the metal substrate to deform, which will cause the coating to flex. A brittle coating will crack during flexure, exposing the container metal to the packaged products, which can sometimes cause a leak in the container. Even a low probability of coating failure may cause a significant number of containers to leak, given the high number of food and beverage containers produced.

Accordingly, it will be appreciated that what is needed in the art are improved coating compositions that are made without intentionally using bisphenol A, but which exhibit the stringent balance of coating properties to permit the use of such coating compositions on food or beverage containers.

SUMMARY

In one aspect, the present invention provides an aqueous coating composition comprising a multi-stage polymeric latex having two or more emulsion polymerized stages in an aqueous carrier liquid, wherein the latex has one or both of:
  (i) a lower glass transition temperature ("Tg") emulsion polymerized stage having a calculated Tg that is at least 20° C. lower than a calculated Tg of a higher Tg emulsion polymerized stage, or
  (ii) a gradient Tg with at least a 20° C. differential in the calculated Tg of monomers fed at the start of polymerization compared to monomers fed at the end of polymerization; and
wherein when spray applied onto an interior of a 355 mL (12 U.S. fluid oz.) no. 211 two-piece drawn and ironed aluminum beverage can at 115 milligrams per can coating weight and cured at 188° C. to 199° C. (measured at the can dome) for 55 seconds, the cured coating composition exhibits:
  (iii) a global extraction result of less than 50 ppm; and
  (iv) a metal exposure of less than 3 mA on average when the can is filled with 1% NaCl in deionized water and tested pursuant to the Initial Metal Exposure test method disclosed herein.

In another aspect, the present invention provides an article that has been or will be formed into a food or beverage container or container component, the article comprising a metal substrate having on at least one surface a coating formed from an aqueous coating composition comprising:
  a multi-stage polymeric latex having two or more emulsion polymerized stages in an aqueous carrier liquid, wherein the latex has one or both of:
    (i) a lower Tg emulsion polymerized stage having a calculated Tg that is at least 20° C. lower than a calculated Tg of a higher Tg emulsion polymerized stage, or
    (ii) a gradient Tg with at least a 20° C. differential in the calculated Tg of monomers fed at the start of polymerization compared to monomers fed at the end of polymerization; and
  wherein when spray applied onto an interior of a 355 mL (12 U.S. fluid oz.) no. 211 two-piece drawn and ironed aluminum beverage can at 115 milligrams per can coating weight and cured at 188° C. to 199° C. (measured at the can dome) for 55 seconds, the cured coating composition exhibits:
    (iii) a global extraction result of less than 50 ppm; and
    (iv) a metal exposure of less than 3 mA on average when the can is filled with 1% NaCl in deionized water and tested pursuant to the Initial Metal Exposure test method disclosed herein.

In another aspect, the present invention provides a method for making a coated food or beverage container or container component, the method comprising the steps of:
  (a) spray applying on an interior surface of a metal food or beverage can having a body portion and an end portion an aqueous coating composition comprising a multi-stage polymeric latex having two or more emulsion polymerized stages in an aqueous carrier liquid, wherein the latex has one or both of:
    (i) a lower Tg emulsion polymerized stage having a calculated Tg that is at least 20° C. lower than a calculated Tg of a higher Tg emulsion polymerized stage, or
    (ii) a gradient Tg with at least a 20° C. differential in the calculated Tg of monomers fed at the start of polymerization compared to monomers fed at the end of polymerization; and (b) curing the coating composition to form a hardened coating;

wherein the hardened coating exhibits:

(iii) a global extraction result of less than 50 ppm; and (iv) a metal exposure of less than 3 mA on average when the can is filled with 1% NaCl in deionized water and tested pursuant to the Initial Metal Exposure test method disclosed herein.

In another aspect, the present invention provides a method for making a coated food or beverage container or container component, the method comprising the steps of:

(a) applying to at least one metal substrate surface of a food or beverage container or container component a coating formed from an aqueous coating composition comprising a multi-stage polymeric latex having two or more emulsion polymerized stages in an aqueous carrier liquid, wherein the latex has one or both of:

(i) a lower Tg emulsion polymerized stage having a calculated Tg that is at least 20° C. lower than a calculated Tg of a higher Tg emulsion polymerized stage, or (ii) a gradient Tg with at least a 20° C. differential in the calculated Tg of monomers fed at the start of polymerization compared to monomers fed at the end of polymerization; and (b) curing the coating composition to form a hardened coating;

wherein the cured coating composition:

(iii) exhibits a global extraction result of less than 50 ppm; and (iv) has a dry coating weight of about 0.6 grams per square meter ("gsm") to about 13 gsm.

In another aspect, the present invention provides an aqueous coating composition comprising:

a resin system including a water-dispersible polymer and two or more emulsion polymerized stages of a multi-stage polymeric latex in an aqueous carrier liquid, wherein the water-dispersible polymer is incorporated into the multi-stage polymeric latex, blended with the multi-stage polymeric latex, or both; and wherein the latex has one or both of:

(i) a lower Tg emulsion polymerized stage having a calculated Tg that is at least 20° C. lower than a calculated Tg of a higher Tg emulsion polymerized stage, or (ii) a gradient Tg with at least a 20° C. differential in the calculated Tg of monomers fed at the start of polymerization compared to monomers fed at the end of polymerization.

In another aspect, the present invention provides an article that has been or will be formed into a food or beverage container or container component, the article comprising a metal substrate having on at least one surface a coating formed from an aqueous coating composition comprising:

a resin system including a water-dispersible polymer and two or more emulsion polymerized stages of a multi-stage polymeric latex in an aqueous carrier liquid, wherein the water-dispersible polymer is incorporated into the multi-stage polymeric latex, blended with the multi-stage polymeric latex, or both; and wherein the latex has one or both of:

(i) a lower Tg emulsion polymerized stage having a calculated Tg that is at least 20° C. lower than a calculated Tg of a higher Tg emulsion polymerized stage, or (ii) a gradient Tg with at least a 20° C. differential in the calculated Tg of monomers fed at the start of polymerization compared to monomers fed at the end of polymerization.

In another aspect, the present invention provides a method for making a latex dispersion useful for coating food or beverage containers or container components, the method comprising the steps of:

(a) providing an aqueous dispersion of a water-dispersible polymer; and (b) emulsion polymerizing two or more stages in the presence of the aqueous dispersion to form a multi-stage polymeric latex, wherein the latex has one or both of:

(i) a lower Tg emulsion polymerized stage having a calculated Tg that is at least 20° C. lower than a calculated Tg of a higher Tg emulsion polymerized stage, or (ii) a gradient Tg with at least a 20° C. differential in the calculated Tg of monomers fed at the start of polymerization compared to monomers fed at the end of polymerization.

In another aspect, the present invention provides a method for making a coated food or beverage container or container component, the method comprising the steps of:

(a) spray-applying on an interior surface of a metal food or beverage can having a body portion and an end portion an aqueous coating composition comprising a resin system including a water-dispersible polymer and two or more emulsion polymerized stages of a multi-stage polymeric latex in an aqueous carrier liquid, wherein the water-dispersible polymer is incorporated into the multi-stage polymeric latex, blended with the multi-stage polymeric latex, or both; and wherein the latex has one or both of:

(i) a lower Tg emulsion polymerized stage having a calculated Tg that is at least 20° C. lower than a calculated Tg of a higher Tg emulsion polymerized stage, or (ii) a gradient Tg with at least a 20° C. differential in the calculated Tg of monomers fed at the start of polymerization compared to monomers fed at the end of polymerization; and (b) curing the coating composition to form a hardened coating.

In another aspect, the present invention provides a method for making a coated food or beverage container or container component, the method comprising the steps of:

(a) applying to at least one metal substrate surface of a food or beverage container or container component a coating formed from an aqueous coating composition comprising a resin system including a water-dispersible polymer and two or more emulsion polymerized stages of a multi-stage polymeric latex in an aqueous carrier liquid, wherein the water-dispersible polymer is incorporated into the multi-stage polymeric latex, blended with the multi-stage polymeric latex, or both; and wherein the latex has one or both of:

(i) a lower Tg emulsion polymerized stage having a calculated Tg that is at least 20° C. lower than a calculated Tg of a higher Tg emulsion polymerized stage, or (ii) a gradient Tg with at least a 20° C. differential in the calculated Tg of monomers fed at the start of polymerization compared to monomers fed at the end of polymerization; and (b) curing the coating composition to form a hardened coating.

In another aspect, the present invention provides an aqueous dispersion that includes a multi-stage polymeric latex having two or more emulsion polymerized stages and is suitable for use in forming a food-contact coating on a metal substrate of a food or beverage can. The latex has one or both of: (i) a "lower" Tg emulsion polymerized stage having a calculated Tg that is at least 20° C., at least 30° C., at least 35° C., at least 40° C., at least 50° C., at least 60° C., or at least 70° C. lower than a calculated Tg of a "higher" Tg emulsion polymerized stage or (ii) a gradient Tg with at least a 20° C. differential in the calculated Tg of monomers fed at the start of polymerization compared to monomers fed at the end of polymerization. In some embodiments, the multi-stage polymeric latex is present in a resin system that includes a water-dispersible polymer (e.g., an acrylic polymer, a polyether polymer, a polyolefin polymer, a polyester polymer, a polyurethane polymer, or a mixture or copolymer thereof), wherein the water-dispersible polymer is incorporated into the multi-stage polymeric latex, blended with the multi-stage polymeric latex, or both.

In some embodiments, the above-mentioned aqueous coating composition comprises an aqueous carrier liquid and a resin system comprising a multi-stage polymeric latex having two or more emulsion polymerized stages dispersed in the aqueous carrier, wherein the latex has one or both of: (i) a lower Tg emulsion polymerized stage having a calculated Tg that is at least 20° C., at least 30° C., at least 35° C., at least 40° C., at least 50° C., at least 60° C., or at least 70° C. lower than a calculated Tg of a higher Tg emulsion polymerized stage or (ii) a gradient Tg with at least a 20° C. differential in the calculated Tg of monomers fed at the start of polymerization compared to monomers fed at the end of polymerization. In some embodiments, if the latex has the above (i), then more than 50 weight percent of the emulsion polymerized stages preferably have a calculated Tg of at least 40° C., at least 50° C., at least 60° C., at least 70° C., or at least 80° C.

In some embodiments, the above-mentioned aqueous coating composition comprises an aqueous carrier liquid and a resin system that includes a water-dispersible polymer and two or more emulsion polymerized stages of a multi-stage polymeric latex. The water-dispersible polymer is preferably incorporated into the multi-stage polymeric latex, blended with the multi-stage polymeric latex, or both. The latex preferably has one or both of: (i) a lower Tg emulsion polymerized stage having a calculated Tg that is at least 20° C., at least 30° C., at least 35° C., at least 40° C., at least 50° C., at least 60° C., or at least 70° C. lower than a calculated Tg of a higher Tg emulsion polymerized stage or (ii) a gradient Tg with at least a 20° C. differential in the calculated Tg of monomers fed at the start of polymerization compared to monomers fed at the end of polymerization.

In some embodiments, at least one monomer A of the below Formula (I) is employed to prepare one or more of the emulsion polymerized stages:

$$CH_2=C(R^1)-X_n-C(CH_3)_t(R^2)_{3-t} \quad (I)$$

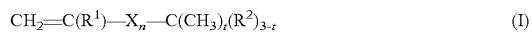

wherein:
R$^1$ is hydrogen or an alkyl group, more typically hydrogen or a methyl group;
n is 0 or 1, more typically 1;
X, if present, is a divalent linking group; more typically an amide, carbonate, ester, ether, urea, or urethane linkage; and even more typically an ester linkage of either directionality (viz., —C(O)—O— or —O—C(O)—);
t is 0 to 3;
each R$^2$, if present, is independently an organic group that may optionally be itself branched, more typically an alkyl group that may optionally include one or more heteroatoms (e.g., N, O, P, Si, etc.); and
two or more R$^2$ may optionally form a cyclic group with one another.

In some embodiments, at least one (meth)acrylate of the below Formula (II) is employed to prepare one or more of the emulsion polymerized stages:

$$CH_2=C(R^3)-CO-OR^4 \quad (II)$$

wherein:
R$^3$ is hydrogen or methyl, and
R$^4$ is an alkyl group preferably containing one to sixteen carbon atoms, a cycloaliphatic group, an aryl group, a silane group, or a combination thereof.

In some embodiments, the above-mentioned aqueous coating composition comprises an aqueous carrier liquid and a resin system that includes s a multi-stage polymeric latex having two or more emulsion polymerized stages, wherein the multi-stage latex is formed by emulsion polymerizing ethylenically unsaturated monomers in the presence of an aqueous dispersion of a water-dispersible polymer. The latex preferably has one or both of: (i) a lower Tg emulsion polymerized stage having a calculated Tg that is at least 20° C., at least 30° C., at least 35° C., at least 40° C., at least 50° C., at least 60° C., or at least 70° C. lower than a calculated Tg of a higher Tg emulsion polymerized stage or (ii) a gradient Tg with at least a 20° C. differential in the calculated Tg of monomers fed at the start of polymerization compared to monomers fed at the end of polymerization. The water-dispersible polymer preferably comprises a polyether polymer.

In some embodiments, the above-mentioned aqueous coating composition comprises an aqueous carrier liquid and a resin system that includes a multi-stage polymeric latex formed by emulsion polymerizing ethylenically unsaturated monomers in two or more stages (e.g., a lower Tg stage and a higher Tg stage) in the presence of a water-dispersible polymer (e.g., an acrylic polymer, a polyether polymer, a polyolefin polymer, a polyester polymer, a polyurethane polymer, or a mixture or copolymer thereof), wherein the emulsion polymerized ethylenically unsaturated monomers comprise at least 80 wt. % of two or more (e.g., two, three, four, or five) of methyl methacrylate, ethyl acrylate, ethyl methacrylate, butyl acrylate (e.g., n-butyl acrylate), and butyl methacrylate (e.g., n-butyl methacrylate.

In some embodiments, the above-mentioned coating compositions contain less than about 10 wt. %, less than about 5 wt. %, less than about 1 wt. % or do not contain polyether compounds or polymers. In some embodiments, the above-mentioned coating compositions are substantially free of or do not contain each of bisphenol A, bisphenol F, and bisphenol S. In some embodiments, the above-mentioned coating compositions are optionally substantially free of or do not contain styrene.

In yet another aspect, substrates (e.g., metal substrates) having one or more of the above-mentioned coating compositions disposed thereon are also disclosed. In some embodiments, the substrate is a metal food or beverage can or container, or portion thereof (e.g., twist-off closure lid, can end, beverage can end, can sidewall body portion and bottom end portion, etc.) with the disclosed coating composition invention applied on an exterior surface, an interior surface, or a combination of both. Certain embodiments of the coating composition of the present invention have been found to be particularly suitable for spray application on the interior of food or beverage cans, including, e.g., aluminum beverage cans.

In yet another aspect, the present invention provides a method of coating a food or beverage can. The method preferably includes applying (e.g., spray applying, roll coating, etc.) one or more of the above-mentioned coating compositions to a surface of a metal substrate prior to or after forming the metal substrate into a food or beverage can or a portion thereof.

In yet another aspect, the present invention provides food contact multi-stage latex dispersions and methods of making food contact multi-stage latex dispersions. In preferred embodiments, the method includes providing an aqueous dispersion of a water-dispersible polymer (e.g., an acrylic polymer, a polyether polymer, a polyolefin polymer, a polyester polymer, a polyurethane polymer, or a mixture or copolymer thereof); and emulsion polymerizing two or more latex stages in the presence of the aqueous dispersion to form a multi-stage polymeric latex, wherein the latex has one or both of: (i) a lower Tg emulsion polymerized stage having a calculated Tg that is preferably at least 20° C., at least 30° C., at least 35° C., at least 40° C., at least 50° C., at least 60° C., or at least 70° C. lower than a calculated Tg of a higher Tg emulsion polymerized stage or (ii) a gradient Tg with at least a 20° C. differential in the calculated Tg of monomers fed at the start of polymerization compared to monomers fed at the end of polymerization.

The above summary of the present invention is not intended to describe each disclosed embodiment or every implementation of the present invention. The description that follows more particularly exemplifies illustrative embodiments. In several places throughout the application, guidance is provided through lists of examples, which can be used in various combinations. In each instance, the recited list serves only as a representative group and should not be interpreted as limiting or as an exclusive list.

The details of one or more additional embodiments of the invention are set forth in the description below. Other features, objects, and advantages of the invention will be apparent from the description and from the embodiments.

Selected Definitions

Unless otherwise specified, the following terms as used herein have the meanings as provided below.

The terms "a," "an," "the," "at least one," and "one or more" are used interchangeably. Thus, for example, a coating composition that comprises "a" polyether polymer means that the coating composition includes "one or more" polyether polymers.

The terms "acrylate" and "acrylic" are used broadly herein and encompasses materials prepared from, for example, one or more of acrylic acid, methacrylic acid, or any acrylate or methacrylate compound. Thus, for example, a polyether-acrylate copolymer in which the "acrylate" component consists entirely of polymerized (meth)acrylic acid would still include an "acrylate" component even though no (meth)acrylate monomer was employed.

The term "bisphenol" refers to a polyhydric polyphenol monomer having two phenylene groups that each have a hydroxyl group attached to a carbon atom of the ring, wherein the rings of the two phenylene groups do not share any atoms in common.

The terms "comprises", "comprising" and variations thereof do not have a limiting meaning where these terms appear in the description and embodiments.

The term "dihydric monophenol" refers to a polyhydric monophenol that only includes two hydroxyl groups attached to the aryl or heteroaryl ring.

The term "diphenol" refers to a polyphenol in which two phenylene groups each have one hydroxyl group.

The term "easy open end" refers to a can end (typically an end of a food or beverage can) that includes (i) a frangible opening portion (which for some beverage can ends functions as a drinking spout) and (ii) a riveted portion for attaching a pull tab thereto for purposes of opening the frangible opening portion to access a product housed within a can.

The terms "estrogenic activity" or "estrogenic agonist activity" refer to the ability of a compound to mimic hormone-like activity through interaction with an endogenous estrogen receptor, typically an endogenous human estrogen receptor.

The term "flavor scalping" refers to a loss of quality in a packaged item due either to its aroma or other flavor components being absorbed by the packaging (e.g., an interior beverage can coating) or due to a food or beverage contained in the packaging absorbing undesirable aromas or other flavor components from the packaging, such as may arise due to coating film failure.

The term "food-contact surface" refers to a surface of an article (e.g., a food or beverage container) that is in contact with, or suitable for contact with, a food or beverage product.

The term "incorporated", when used with respect to a water-dispersible polymer incorporated into a latex polymer or particle, means that the water-dispersible polymer is physically entangled, imbibed into or covalently bound with the polymer particles of the latex such that the water-dispersible polymer and latex cannot readily be separated using techniques such as washing or separation.

A group that may be the same or different is referred to as being "independently" something. The term "group" also encompasses single atom moieties. Thus, for example, a halogen atom can be a group.

The term "low molecular weight" refers to a material, generally monomeric or oligomeric in nature, having a molecular weight less than about 2,000 or less than about 1,000. In the case of oligomeric materials containing molecules having a variety of molecular weights, the term low molecular weight refers to the number average molecular weight.

The term "(meth)" as used in "(meth)acrylate" and "(meth)acrylic acid" is intended to indicate that either a hydrogen or methyl group may be attached to the pertinent carbon atom of the monomer. For example "ethyl (meth)acrylate" encompasses both ethyl acrylate, ethyl methacrylate, and mixtures thereof.

The term "multi-stage" when used with respect to a latex polymer means the polymer was made using discrete charges of two or more monomers, made using a varying (e.g., continuously-varying) charge of two or more monomers, or made using a combination of both discrete charges and varying charges of two or more monomers. The presence in an initial latex polymer reaction mixture of "seed" particles representing no more than 10 wt. % of the latex polymer solids in the final latex, whether as an inorganic particulate seed (e.g., clay or glass particles), as a preformed particulate polymer seed, or as particulate seed polymer formed in situ, will not be deemed to provide a stage of a multi-stage polymer or to provide a basis for designating a single stage polymer made using such seed polymer as a multi-stage polymer. The presence in a latex composition of a separate, non-latex polymer, will not be deemed to provide a stage of a multi-stage polymer or to provide a basis for designating a single stage polymer made using such separate polymer as a multi-stage polymer.

The term "on," when used in the context of a coating applied on a surface or substrate, includes both coatings applied directly or indirectly to the surface or substrate. Thus, for example, a coating applied to a primer layer overlying a substrate constitutes a coating applied on the substrate.

The term "or" when used with respect to a set of items, choices or other possibilities refers to either the inclusive or exclusive selection of such items, choices or other possibilities.

The term "phenylene" refers to a six-carbon atom aryl ring (e.g., as in a benzene group) that can have any substituent groups (including, e.g., hydrogen atoms, hydrocarbon groups, oxygen atoms, hydroxyl groups, etc.). Thus, for example, the following aryl groups are each phenylene rings: —$C_6H_4$—, —$C_6H_3(CH_3)$—, and —$C_6H(CH_3)_2$(OH)—. In addition, for example, each of the aryl rings of a naphthalene group are phenylene rings.

The term "polyhydric phenol" (which includes dihydric phenols) refers broadly to any compound having one or more aryl or heteroaryl groups (more typically one or more phenylene groups) and at least two hydroxyl groups attached to a same or different aryl or heteroaryl ring. Thus, for example, both hydroquinone and 4,4'-biphenol are considered to be polyhydric phenols. As used herein, polyhydric phenols typically have six carbon atoms in an aryl ring, although it is contemplated that aryl or heteroaryl groups having rings of other sizes may be used.

The term "polyhydric monophenol" refers to a polyhydric phenol that (i) includes an aryl or heteroaryl group (more typically a phenylene group) having at least two hydroxyl groups attached to the aryl or heteroaryl ring and (ii) does not include any other aryl or heteroaryl rings having a hydroxyl group attached to the ring.

The term "polyhydric polyphenol" (which includes bisphenols) refers to a polyhydric phenol that includes two or more aryl or heteroaryl groups each having at least one hydroxyl group attached to the aryl or heteroaryl ring.

The term "polyphenol" refers to a polyhydric material having two or more phenylene groups that each include a six-carbon ring and a hydroxyl group attached to a carbon atom of the ring, wherein the rings of the phenylene groups do not share any atoms in common.

The term "polymer" includes both homopolymers and copolymers (e.g., polymers of two or more different monomers). Similarly, unless otherwise indicated, the use of a term designating a polymer class such as, for example, "polyether" is intended to include both homopolymers and copolymers (e.g., polyether-acrylate copolymers).

The terms "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

The term "substantially free" when used with respect to a coating composition that may contain a particular compound means that the coating composition contains less than 1,000 parts per million (ppm) of the recited compound (corresponding to less than 0.1 wt. %) regardless of whether the compound is mobile in the coating or bound to a constituent of the coating. The term "essentially free" when used with respect to a coating composition that may contain a particular compound means that the coating composition contains less than 100 parts per million (ppm) of the recited compound regardless of whether the compound is mobile in the coating or bound to a constituent of the coating. The term "essentially completely free" when used with respect to a coating composition that may contain a particular compound means that the coating composition contains less than 5 parts per million (ppm) of the recited compound regardless of whether the compound is mobile in the coating or bound to a constituent of the coating. The term "completely free" when used with respect to a coating composition that may contain a particular compound means that the coating composition contains less than 20 parts per billion (ppb) of the recited compound regardless of whether the compound is mobile in the coating or bound to a constituent of the coating. When the phrases "free of" (outside the context of the aforementioned phrases), "do not contain", "does not contain", "does not include any" and the like are used herein, such phrases are not intended to preclude the presence of trace amounts of the pertinent structure or compound which may be present but were not intentionally used, e.g., the presence of environmental contaminants. As will be appreciated by persons having ordinary skill in the art, the amount of a compound in an ingredient, polymer, formulation or other component typically may be calculated based on the amounts of starting materials employed and yields obtained when making such ingredient, polymer, formulation or other component.

The recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 4 to 5, etc.).

DETAILED DESCRIPTION

The present invention relates to a coating composition that includes a multi-stage polymeric latex, which is particularly suitable for use in formulating packaging coatings, and particularly food or beverage can coatings. The coating composition of the present invention is preferably an aqueous coating composition, which may optionally include one or more organic solvents. In preferred embodiments, the multi-stage polymeric latex is formulated in combination with a water-dispersible polymer. Typically, the multi-stage polymeric latex is formed in the presence of the water-dispersible polymer. While not intending to be bound by theory, it is believed the water-dispersible polymer can function as a surfactant to support formation and stability of the multi-stage polymeric latex.

Epoxy-acrylate copolymers (also referred to as epoxy-acrylic copolymers) with over-polymerized emulsion polymerized acrylics have been used in food or beverage can coatings. The epoxy polymer portion of such systems was conventionally BPA-based (e.g., polymers formed via reaction of bisphenol A with a diglycidyl ether of bisphenol A) and the acrylic was rich in styrene content. It was generally understood by those skilled in the art that certain end use critical coating performance attributes (e.g., sufficient flexibility for a food or beverage can coating end use) of such conventional epoxy-acrylic systems derived primarily, or even exclusively, from the epoxy polymer, with the acrylic content functioning primarily as inexpensive filler to allow the amount of more expensive epoxy polymer to be minimized. Because the acrylic content in such conventional systems was believed to contribute little to coating performance properties, it was understood by those skilled in the art that the amount of epoxy polymer in such epoxy-acrylic systems should generally be more than about 50% by weight of the overall resin system to avoid unsuitable degradation in coating properties.

The system of the present invention has surprisingly allowed the amount of epoxy polymer employed to be dramatically reduced relative to such conventional systems while still achieving a comparable balance of coating properties, including without the use of either BPA or styrene in some embodiments. For example, in the Examples section below, a latex resin system is exemplified that exhibits a suitable balance of coating properties with 80% by weight of total "acrylic" polymer content and only 20% by weight of polyether polymer content (which can also be referred to as an "epoxy" polymer, e.g., due to the reactants used to make it). Surprisingly, such results were achieved without the use of either BPA or styrene, which are generally acknowledged by those skilled in the art as bringing beneficial coating properties that are difficult to replicate with alternate materials.

In the preceding paragraph, the term "acrylic" in the context of "acrylic polymer content" is intended to be construed broadly to indicate the amount of polymerized (emulsion polymerized or otherwise polymerized) ethylenically unsaturated monomer present. Such ethylenically unsaturated monomers are typically vinyl monomers—some or all of which are typically either (meth)acrylic acids or (meth)acrylates. A preponderance (e.g., >50 wt. %, >60 wt. %, >70 wt. %, >80 wt. %, >90 wt. %, etc.), and in some embodiments all or substantially all, of the acrylic polymer content of the coating composition comprises emulsion polymerized ethylenically unsaturated monomers (e.g., the lower Tg and higher Tg emulsion polymerized stages). In some embodiments (e.g., in which the water-dispersible polymer is a polyether-acrylate, polyester-acrylate, etc.), the acrylic polymer content also includes organic solution polymerized ethylenically unsaturated monomers, which typically include one or more (meth)acrylic acids or (meth) acrylates. In preferred embodiments, acrylic polymer content constitutes more than 50 wt. %, preferably at least 60 wt. %, even more preferably at least 65 wt. %, even more preferably at least 70 wt. %, even more preferably at least 75 wt. %, and optimally 80 wt. % or more of the resin system, based on the combined weight of the water-dispersible polymer and the monomers used to form the emulsion polymerized stages. In some embodiments, the resin system constitutes 70 to 100 wt. % of the total resin solids in the coating composition.

While not intending to be bound by theory, it is believed the suitable balance of coating properties exhibited by preferred embodiments of the latex resin system of the present invention, including excellent flexibility, can be achieved, even when using very low amounts of polyether polymer or other water-dispersible polymer, due to the latex resin system's novel multi-stage structure. In particular, a multi-stage latex resin system is preferably employed that includes two or more different emulsion polymerized stages having sufficiently different Tg values to achieve the desired balance of coating properties. Such Tg differences may be achieved via multiple approaches, some of which are described below.

Usually a multi-stage latex will not exhibit a single Tg inflection point as measured via differential scanning calorimetry ("DSC"). For example, a DSC curve for a multi-stage latex made using discrete charges of two or more monomers may exhibit two or more Tg inflection points. Also, a DSC curve for a multi-stage latex made using a continuously-varied charge of two or more monomers may exhibit no Tg inflection points. By way of further explanation, a DSC curve for a single stage latex made using a single monomer charge or a non-varying charge of two monomers may exhibit only a single Tg inflection point. Occasionally when only one Tg inflection point is observed it may be difficult to determine whether the latex represents a multi-stage latex. In such cases a further (e.g., lower or higher) Tg inflection point may sometimes be detected on closer inspection, or the synthetic scheme used to make the latex may be examined to determine whether or not a multi-stage latex would be expected to be produced. When evaluating such Tg inflection points, it may be necessary to exclude inflection points of non-latex polymers that may also be present in a latex polymer composition.

In some embodiments, the multi-stage latex polymer is formed from ingredients including a "lower" Tg ethylenically unsaturated monomer component and a "higher" Tg ethylenically unsaturated monomer component. The lower Tg and higher Tg monomer components can be emulsion polymerized at any time relative to one another. In some embodiments, the lower Tg or the higher Tg monomer component is polymerized in a first stage and the other monomer component is emulsion polymerized in a later second stage after emulsion polymerization of the first stage has been completed. In other embodiments, emulsion polymerization of the second stage may be initiated prior to completion of emulsion polymerization of the first stage. One or more additional ethylenically unsaturated monomer components of any suitable Tg may also optionally be employed and may be emulsion polymerized before, after, between, or during polymerization of the lower or high Tg monomer components. Thus, in some embodiments, the multi-stage latex polymer may include three or more emulsion polymerized stages. However, in some embodiments the emulsion polymerized portions of the multi-stage latex polymer consists essentially of stages (typically two stages) formed from the higher Tg ethylenically unsaturated monomer component and the lower Tg ethylenically unsaturated monomer component, respectively.

The lower Tg emulsion polymerized stage preferably has a calculated Tg that is at least 20° C. lower, at least 30° C. lower, at least 35° C. lower, at least 40° C. lower, at least 50° C. lower, at least 60° C. lower, or at least 70° C. lower than a calculated Tg of the higher Tg emulsion polymerized stage. For sake of convenience, in the discussion that follows the term "stage(s)" is used in place of "emulsion polymerized stage(s)." Preferably, more than 50 weight percent of the stages present in the multi-stage latex have a calculated Tg of at least 40° C., at least 50° C., at least 60° C., at least 70° C., or at least 80° C.

Typically, the higher Tg stage will have a calculated Tg of greater than 40° C., greater than 45° C., greater than 50° C., greater than 60° C., greater than 70° C., or greater than 80° C. Although the Tg of the higher Tg stage is not particularly restricted, typically it will be about 105° C. or less. The lower Tg stage will typically have a calculated Tg of less than 40° C., more typically less than 35° C., and even more typically less than 30° C. In some embodiments the lower Tg stage has a calculated Tg of less than 20° C., less than 10°

C., less than 0° C., or even −10° C. or less. The lower Tg stage will typically have a calculated Tg of about −54° C. or greater.

In certain preferred embodiments, the higher Tg stage has a calculated Tg of greater than 40° C., the lower Tg stage has a calculated Tg of less than 40° C., and the higher Tg stage Tg value is at least 20° C. greater than that of the lower Tg stage. In some embodiments, the higher Tg stage has a calculated Tg of greater than 45° C., the lower Tg stage has a calculated Tg of less than 35° C. and the higher Tg stage Tg value is at least 20° C. greater than that of the lower Tg stage. In some embodiments, the higher Tg stage has a calculated Tg of greater than 50° C. and the lower Tg stage has a calculated Tg of less than 30° C. In some embodiments, the higher Tg stage has a calculated Tg of greater than 60° C. and the lower Tg stage has a calculated Tg of less than 20° C. In some embodiments, the higher Tg stage has a calculated Tg of greater than 70° C. and the lower Tg stage has a calculated Tg of less than 10° C.

The Tg of a particular stage, or combination of stages, can be estimated (viz., calculated) using the Fox equation. For example, for a polymer made from two monomer feeds, the theoretical Tg may be calculated using the Fox equation as follows:

$$1/Tg = W_a/T_{ga} + W_b/T_{gb}$$

where $T_{ga}$ and $T_{gb}$ are the respective glass transition temperatures of homopolymers made from monomers "a" and "b"; and $W_a$ and $W_b$ are the respective weight fractions of polymers "a" and "b".

When additional monomer feeds "c", "d" and so on are employed, additional fractions $W_c/T_{gc}$, $W_d/T_{gd}$ and so on are added to the right-hand side of the above equation. Unless indicated otherwise, the "calculated" stage or copolymer Tg's referenced herein are calculated using the Fox equation. Also, the calculation is based on all of the monomers that are reacted together to form a stage, and not upon merely a portion of such monomers. If an emulsion polymerized ethylenically unsaturated monomer component (e.g., a monomer mixture used to form the higher Tg stage or the lower Tg stage) includes more than 5% by weight of one or more monomers not having a homopolymer Tg (e.g., because the monomer cannot be homopolymerized), then instead of relying on the Fox equation, a single-stage reference latex can be made using the same overall monomer composition as the emulsion polymerized ethylenically unsaturated monomer component and the actual Tg measured via DSC. If the emulsion polymerized ethylenically unsaturated component includes 5% by weight or less of one or more monomers not having a homopolymer Tg, then the one or more such monomers can be ignored and the Tg determined by the Fox equation.

In some embodiments, a gradient Tg approach may be used to polymerize the multi-stage latex polymer, or a portion of the multi-stage latex polymer. When a gradient Tg approach is used, it should be noted that it may not be possible to measure a discrete Tg for certain latex polymers, and certain gradient Tg latex polymers may contain an almost infinite number of Tg stages. For example, one may start with a higher Tg monomer composition and then at a certain point in the polymerization start to feed a lower Tg stage monomer composition into the higher Tg stage monomer feed (or vice versa). The resulting multi-stage latex polymer will have a gradient Tg from high to low (or vice versa). A "power feed" process may be used to prepare such compositions. A gradient Tg polymer may also be used in conjunction with multiple multi-stage Tg polymers. As an example, one may prepare a higher Tg monomer feed (F1) and a lower Tg monomer feed (F2). One would begin to feed F1 into the latex reactor vessel and initiate polymerization of a higher Tg "hard stage" monomer composition. At a certain period during the F1 feed, one would then feed F2 into F1 wherein the F2 feed rate is faster than the overall feed rate of F1+F2 into the reactor vessel. Consequently, once the F2 feed into F1 is complete, the overall Tg of the F1+F2 monomer feed blend will be a lower Tg "soft stage" monomer composition. When a gradient Tg approach is employed, a composite Tg may be calculated by using the Fox equation for all the monomers and their respective fractions in the final copolymer, without regard to which stage or stages may contain such monomers. In some embodiments, the composite Tg is at least 0° C., at least 20° C., at least 30° C., at least 40° C., or at least 50° C. If the monomers used to produce such gradient Tg latex polymers include one or more monomers not having a homopolymer Tg (e.g., because the monomer does not homopolymerize), then a non-gradient reference latex can be made, in a non-power feed method, using the same overall monomer composition and used to measure Tg.

For gradient Tg latex polymers, a Tg differential may be determined by using the Fox equation to calculate the theoretical Tg for a copolymer made from the monomer feed at the start of polymerization and comparing the result to the calculated theoretical Tg for a copolymer made from the monomer feed at the end of polymerization. For multi-stage polymers made using such a gradient Tg approach, the Tg differential in the calculated Tg of monomers fed at the start of polymerization compared to monomers fed at the end of polymerization of the gradient-fed monomers preferably is at least 20° C., at least 30° C., at least 35° C., at least 40° C., at least 50° C., at least 60° C., or at least 70° C.

Any suitable weight ratio of lower Tg stage(s) to higher Tg stage(s) may be employed. In some embodiments, a slight to substantial majority of higher Tg stage(s) relative to lower Tg stages(s) is employed. Typically, the weight ratio of the lower Tg stage relative to the higher Tg stage (viz., lower Tg stage: higher Tg stage) will be from 5:95 to 95:5, more typically from 20:80 to 70:30, and even more typically from 25:75 to 48:52. The above weight ratios are based on the weights of the ethylenically unsaturated components (typically monomers) used to produce the respective stages. In certain preferred embodiments, the higher Tg stage constitutes more than 50 weight percent of the total emulsion polymerized stages (viz., the combined weight of the lower Tg stage, the higher Tg stage, and any additional stages that may optionally be present). While not intending to be bound by theory, interior can coatings that will be exposed to sensitive flavor products (e.g., certain colas in which certain flavorants are present at very low concentrations) or chemically aggressive food or beverage products (e.g., high acid, high salt, or high fat) can benefit from the inclusion of a sufficient amount of suitable higher Tg components (e.g., the higher Tg stage). The challenge in such situations, however, is to preserve the overall balance of coating properties, including for example, coating flexibility. Again, while not intending to be bound by theory, it is believed the inclusion of a sufficient amount of suitable lower Tg components (e.g., the lower Tg stage) can help avoid unsuitable degradation in other desired coating properties such as, e.g., flexibility.

Any suitable ethylenically unsaturated monomer or combinations of monomers can be used to form each of the stages of the multi-stage latex polymer. Typically, a mixture of two or more monomers is used to form each stage. In preferred embodiments, the coating compositions include, based on total resin solids, at least 50 wt. %, at least 60 wt. %, at least 70 wt. %, at least 75 wt. %, or at least 80 wt. % of the two or more emulsion polymerized stages. In some such embodiments, the coating compositions include such an amount of high Tg and low Tg stages, based on the total amount of reactants used to form the high Tg and low Tg stages relative to the total resin solids.

As discussed herein, the resin system may also optionally include polymerized ethylenically unsaturated monomers that are polymerized using polymerization techniques other than emulsion polymerization (e.g., free radical organic solution polymerization). In preferred embodiments, the total amount of polymerized ethylenically unsaturated monomers constitutes more than 50 wt. %, preferably more than 60 wt. %, even more preferably more than 70 wt. %, and optimally 80 wt. % or more of the total resin solids of the coating composition.

In some embodiments, the emulsion polymerized monomers of the higher Tg and lower Tg stages comprise at least 50 wt. %, at least 60 wt. %, at least 75 wt. %, or at least 85 wt. % or more of the total amount of polymerized ethylenically unsaturated monomers present in the coating composition.

The coating composition of the present invention is preferably formulated using a resin system that includes a water-dispersible polymer and two or more emulsion polymerized stages. The water-dispersible polymer may be incorporated into the multi-stage polymeric latex, blended with the multi-stage polymeric latex, or both. In presently preferred embodiments, the two or more emulsion polymerized stages are formed by emulsion polymerizing the monomers used to make such stages in the presence of the water-dispersible polymer.

While it is contemplated that one or more ethylenically unsaturated monomer components may be polymerized separate from the water-dispersible polymer, in preferred embodiments, the ethylenically unsaturated monomer components used to make the two or more emulsion polymerized stages are polymerized in an aqueous composition that includes the water-dispersible polymer dispersed therein. Preferably, the water-dispersible polymer functions as a "polymeric surfactant" that helps support emulsion polymerization of two or more stages containing the ethylenically unsaturated monomer components. By way of example, a polymer that is only stably dispersible in an aqueous medium with the assistance of a conventional external surfactant is not considered to be water-dispersible. By way of further example, a stage (e.g., first stage) of a latex polymer that is polymerizable only with the assistance of such an external surfactant is not itself considered to be a water-dispersible polymer herein. In some embodiments, the multi-stage latex is emulsion polymerized in the presence of the water-dispersible polymer without the use of conventional non-polymeric surfactants (e.g., without the use of a low molecular weight surfactant such as sodium lauryl sulfate (288.4 g/mol), sodium dodecylbenzene sulfonate (348.5 g/mol), dioctyl sulfosuccinate sodium salt (444.5 g/mol), amine-neutralized dodecyl benzene sulfonic acid (326.5 g/mol not counting the amine molecular weight), e.g., ethoxylated fatty alcohol ether sulfate sodium salt (1.022 g/mol plus the ethylene oxide weight) or other such conventional surfactants). Thus in some embodiments, the emulsion polymerized ethylenically unsaturated monomer component, and often the entire resin system, does not include and is not derived from low molecular weight non-polymeric surfactants, e.g., low molecular weight anionic, cationic or nonionic surfactants. If any such surfactants are employed, their total amount preferably is no more than 0.5 wt. %, more preferably no more than 0.25 wt. % and most preferably no more than 0.1 wt. % of the aggregate weight of the polymerizable monomers employed to make the latex, and excluding the weight of any monomers employed to make a seed polymer prior to or at the start of polymerization of the latex. Such surfactants are also preferably amine-functional surfactants or amine-neutralized surfactants, as the amine tends to be volatilized from the coating under bake cure conditions.

In some embodiments, the multi-stage latex is also or instead emulsion polymerized in the presence of one or more polymerizable surfactants. Examples of suitable polymerizable surfactants include those disclosed in U.S. Patent Application Publication No. 2002/0155235; Published International Application No. WO 2016/105504A1; and those commercially available under the tradename "REASOAP" from Adeka Corporation, Tokyo, Japan, under the tradenames "NOIGEN" and "HITENOL" from Da-Ichi Kogyo Siyyaku Co., Ltd., Tokyo, Japan; and under the tradename "SIPOMER" from Solvay Rhodia, Brussels, Belgium. In embodiments that include polymerizable surfactants, the polymerizable surfactants may constitute greater than about 0.1%, greater than about 1%, greater than about 2%, or greater than about 3% by weight, based on the total weight of the reactant monomers. The polymerizable surfactant may also constitute less than about 25%, less than about 20%, less than about 15%, or less than about 10% by weight, based on the aggregate weight of the polymerizable monomers employed to make the latex, and excluding the weight of any monomers employed to make a seed polymer prior to or at the start of polymerization of the latex.

In some embodiments, the emulsion polymerized ethylenically unsaturated monomer component is derived using primarily or only low molecular weight surfactants, e.g., low molecular weight anionic or nonionic surfactants. The concentration of such low molecular weight surfactants may vary depending on the types and concentrations of the reactant components, including the presence of any other polymerizable or polymeric surfactants. In embodiments that include low molecular weight surfactants, the low molecular weight surfactants may constitute greater than about 0.01%, greater than about 0.05%, or greater than about 0.1% by weight, based on the aggregate weight of the polymerizable monomers employed to make the latex, and excluding the weight of any monomers employed to make a seed polymer prior to or at the start of polymerization of the latex. The low molecular weight surfactants may also constitute less than about 10%, less than about 7%, or less than about 5% by weight, based on the aggregate weight of the polymerizable monomers employed to make the latex, and excluding the weight of any monomers employed to make a seed polymer prior to or at the start of polymerization of the latex.

Any suitable amount of the water-dispersible polymer may be used. In preferred embodiments, the weight ratio of water-dispersible polymer to emulsion polymerized stages is less than 50:50; preferably less than 40:60; and even more preferably less than 30:70, less than 25:75, or less than 20:80.

The water-dispersible polymer can be any suitable polymer or combination of polymers including, for example, one or more acrylic polymers, polyester polymers, polyether polymers, polyolefin polymers, polysilicone polymers, polyurethane polymers, or copolymers thereof (e.g., polyether-acrylate copolymers, polyester-acrylate copolymers, etc.).

Typically, the water-dispersible polymer is not formed in aqueous media, and instead may for example be formed in solvent media or in a solventless process and then made dispersible into aqueous media, e.g., by neutralization of one or more groups on the polymer to convert such groups into water-dispersing groups. The water-dispersible polymer may have any suitable water-dispersing group or groups. As used herein, the term "water-dispersing groups" also encompasses water-solubilizing groups. Typically, the water-dispersible polymer will include one or more polar groups, more typically one or more salt groups (e.g., anionic salt groups such as base-neutralized acid or anhydride groups or cationic salt groups such as acid-neutralized base groups) or salt-forming groups (e.g., base groups or acid or anhydride groups). In preferred embodiments, the water-dispersible polymer is an acid- or anhydride-functional polymer in which preferably a suitable amount of the acid or anhydride groups have been neutralized with a suitable base, more preferably a fugitive base (e.g., nitrogen-containing bases such as ammonia or amines).

The water-dispersible polymer may have any suitable acid number so long as the polymer is preferably capable of being stably dispersed into water. Preferred acid- or anhydride-functional water-dispersible polymers have an acid number of at least about 40, more preferably at least about 55, and even more preferably at least about 70 milligrams (mg) KOH per gram of the polymer. While the upper range of suitable acid numbers is not particularly restricted, typically the acid number will be less than about 400, more typically less than about 300, and even more typically less than about 200 mg KOH per gram of the polymer. Acid numbers referred to herein may be calculated pursuant to BS EN ISO 3682-1998 standard, or alternatively may be theoretically determined based on the reactant monomers.

Examples of neutralized acid groups include carboxylic acid or anhydride groups that have been at least partially neutralized with a suitable base. Fugitive bases are presently preferred, with nitrogen-containing bases being preferred, and amines (e.g., primary, secondary, or tertiary amines) being particularly preferred. In certain embodiments, the amine is a tertiary amine. Preferably, the tertiary amine is selected from trimethyl amine, dimethylethanol amine (also known as dimethylamino ethanol), methyldiethanol amine, triethanol amine, ethyl methyl ethanol amine, dimethyl ethyl amine, dimethyl propyl amine, dimethyl 3-hydroxy-1-propyl amine, dimethylbenzyl amine, dimethyl 2-hydroxy-1-propyl amine, diethyl methyl amine, dimethyl 1-hydroxy-2-propyl amine, triethyl amine, tributyl amine, N-methyl morpholine, and mixtures thereof. In certain preferred embodiments, an acid- or anhydride-functional polymer is at least 25% neutralized with the amine in water.

In some embodiments, the water-dispersible polymer includes a free-radical polymerized ethylenically unsaturated monomer component (e.g., a styrene-containing or styrene-free vinyl addition component). In preferred such embodiments, the vinyl addition component is formed from an ethylenically unsaturated monomer mixture that includes one or more acid- or anhydride-functional monomers (e.g., methacrylic acid) and typically one or more (meth)acrylates, more typically one or more methacrylates, and even more typically one or more alkyl methacrylates (e.g., ethyl methacrylate or butyl methacrylate), optionally in combination with one or more acrylates or alkyl acrylates (e.g., ethyl acrylate), wherein the monomer mixture is polymerized in organic solvent in the presence or absence of the water-dispersible polymer.

In some embodiments, the water-dispersible polymer is a polyether-acrylate copolymer (alternatively referred to as a "polyether-acrylic" copolymer), more preferably an aromatic polyether-acrylate that optionally does not contain any structural units derived from styrene. In such embodiments, a polyether polymer used to form the polyether-acrylate copolymer preferably comprises at least 30 wt. %, more preferably at least 50 wt. %, and even more preferably at least 60 wt. % or more of the polyether-acrylate copolymer, based on the total weight of the polyether-acrylate copolymer. Typically, the polyether polymer will constitute less than 95 wt. %, more typically less than 90 wt. %, and even more typically less than 85 wt. % of the polyether-acrylate copolymer.

In some embodiments, the water-dispersible polymer may be a phosphated polymer. Examples of such water-dispersible polymers include reaction products of polymers having oxirane groups, preferably aromatic polyether polymers having oxirane groups, and phosphoric acid or related compounds. A specific example of such a water-dispersible polymer is an aromatic polyether phosphate ester polymer. Such phosphated polymers may additionally include one or more other salt groups to enable desired molecular weight and water-dispersibility properties to be achieved.

The water-dispersible polymer can have any suitable molecular weight. Typically, the number average molecular weight (Mn) of the water-dispersible polymer will be at least 1,500, at least 2,000, at least 3,000, or at least 4,000, as determined using gel permeation chromatography ("GPC") and a polystyrene standard. Typically, the water-dispersible polymer will have an Mn of less than 50,000, less than 20,000, less than 10,000, or less than 8,000.

In some embodiments, the polyether polymer has a calculated Tg of at least 30° C., more preferably at least 60° C., and even more preferably at least 70° C. or at least 80° C. Typically, the Tg of the polyether polymer will be less than 150° C., more typically less than 130° C., and even more typically less than 110° C. In this context, the Tg refer to the Tg value of the polyether polymer alone (e.g., prior to forming a polyether-acrylate copolymer). In embodiments in which the water-dispersible polymer is a polyether polymer or polyether-acrylate copolymer formed from ingredients including a polyether polymer, the polyether polymer will typically have a number average molecular weight (Mn) of at least 2,000, more typically at least 3,000, and even more typically at least 4,000. The molecular weight of the polyether polymer may be as high as is needed for the desired application. Typically, however, the Mn of the polyether polymer will not exceed about 11,000. In some embodiments, the polyether polymer has an Mn of about 5,000 to about 8,000. In embodiments where the water-dispersible polymer is a polyether-acrylate copolymer, the molecular weight of the overall polymer may be higher than that recited above, although the molecular weight of the polyether polymer portion will typically be as described above. Typically, however, such polyether-acrylate copolymers will have an Mn of less than about 20,000.

A variety of acid- or anhydride-functional monomers, or salts thereof, can be incorporated into the water-dispersible polymer; their selection is dependent on the desired final polymer properties. In some embodiments, such monomers are ethylenically unsaturated, more preferably, alpha, beta-ethylenically unsaturated. Suitable ethylenically unsaturated acid- or anhydride-functional monomers for the present invention include monomers having a reactive carbon-carbon double bond and an acidic or anhydride group, or salts thereof. Preferred such monomers have from 3 to 20 carbons, at least 1 site of unsaturation, and at least 1 acid or anhydride group, or salt thereof.

Suitable acid-functional monomers include ethylenically unsaturated acids (e.g., mono-protic or diprotic), anhydrides or monoesters of a dibasic acid, which are copolymerizable with the optional other monomer(s) used to prepare the polymer. Illustrative monobasic acids are those represented by the structure $CH_2=C(R)-COOH$, where $R^5$ is hydrogen or an alkyl group of 1 to 6 carbon atoms. Suitable dibasic acids include those represented by the formulas $R^6(COOH)C=C(COOH)R^7$ and $R^6(R^6)C=C(COOH)RCOOH$, where $R^6$ and $R^7$ are each independently hydrogen, an alkyl group of 1 to 8 carbon atoms, a halogen, a cycloalkyl group of 3 to 7 carbon atoms or a phenyl group, and $R^8$ is an alkylene group of 1 to 6 carbon atoms. Half-esters of these acids with alkanols of 1 to 8 carbon atoms are also suitable.

Examples of useful ethylenically unsaturated acid-functional monomers include acids such as, for example, acrylic acid, methacrylic acid, alpha-chloroacrylic acid, alpha-cyanoacrylic acid, crotonic acid, alpha-phenylacrylic acid, beta-acryloxypropionic acid, fumaric acid, maleic acid, sorbic acid, alpha-chlorosorbic acid, angelic acid, cinnamic acid, p-chlorocinnamic acid, beta-stearylacrylic acid, citraconic acid, mesaconic acid, glutaconic acid, aconitic acid, tricarboxyethylene, 2-methyl maleic acid, itaconic acid, 2-methyl itaconic acid, methyleneglutaric acid, and the like, or mixtures thereof. Preferred unsaturated acid-functional monomers include acrylic acid, methacrylic acid, crotonic acid, fumaric acid, maleic acid, 2-methyl maleic acid, itaconic acid, 2-methyl itaconic acid, and mixtures thereof. More preferred unsaturated acid-functional monomers include acrylic acid, methacrylic acid, crotonic acid, fumaric acid, maleic acid, itaconic acid, and mixtures thereof. Most preferred unsaturated acid-functional monomers include acrylic acid, methacrylic acid, maleic acid, crotonic acid, and mixtures thereof. Examples of suitable ethylenically unsaturated anhydride monomers include compounds derived from the above acids (e.g., as pure anhydride or mixtures of such). Preferred anhydrides include acrylic anhydride, methacrylic anhydride, and maleic anhydride. If desired, aqueous salts of the above acids may also be employed.

Polyether polymers are preferred water-dispersible polymers, with aromatic polyethers or polyethers rich in other cyclic groups being preferred, which are preferably substantially free of or do not contain each of BPA, BPF, and BPS, including epoxides thereof, being particularly preferred. Such polyether polymers typically include secondary hydroxyl groups, more typically secondary hydroxyl groups present in backbone $-CH_2CH(OH)CH_2-$ segments. In preferred embodiments, the polyether polymer is derived from ingredients including (i) an aliphatic, cycloaliphatic, or aromatic diepoxide and (ii) an extender compound capable of building the molecular weight of the diepoxide to form a polymer. The above (i) and (ii) may be reacted together in an appropriate ratio such as, e.g., about 1.05:1 to about 1:1.05 stoichiometric ratio. In some embodiments the diepoxide and the extender contain similar structural units (e.g., a residue of a diphenol in the diepoxide and the same diphenol in the extender). In other embodiments the diepoxide and the extender contain dissimilar structural units (e.g., a residue of a diphenol in the diepoxide and a different diphenol in the extender). In some embodiments the diepoxide, the extender or both include two ring oxygen atoms with at least one substituent or bond (e.g., a bond to an aryl ring) located ortho to a ring oxygen atom. In other embodiments the diepoxide, the extender or both include two ring oxygen atoms with substituents or bonds located in both ortho ring positions relative to the ring oxygen atoms. In further embodiments the diepoxide, the extender or both include two ring oxygen atoms with no substituents or bonds located ortho to a ring oxygen atom.

Examples of suitable extender compounds include diols, diacids, and compounds having both an acid and a hydroxyl group. Polyhydric phenols (e.g., dihydric phenols) are preferred extenders, with polyhydric monophenols (e.g., dihydric monophenols) being preferred in certain embodiments. Examples of dihydric monophenol compounds include catechol and substituted catechols (e.g., 3-methylcatechol, 4-methylcatechol, 4-tert-butyl catechol, and the like); hydroquinone and substituted hydroquinones (e.g., methylhydroquinone, 2,5-dimethylhydroquinone, trimethylhydroquinone, tetramethylhydroquinone, ethylhydroquinone, 2,5-diethylhydroquinone, triethylhydroquinone, tetraethylhydroquinone, tert-butylhydroquinone, 2,5-di-tert-butylhydroquinone, and the like); resorcinol and substituted resorcinols (e.g., 2-methylresorcinol, 4-methyl resorcinol, 2,5-dimethylresorcinol, 4-ethylresorcinol, 4-butylresorcinol, 4,6-di-tert-butylresorcinol, 2,4,6-tri-tert-butylresorcinol, and the like); and variants and mixtures thereof. Examples of dihydric diphenol compounds include 4,4'-methylenebis(2,6-dimethylphenol) (tetramethyl bisphenol F), 4,4'-(ethane-1,2-diyl)bis(2,6-dimethylphenol), 4,4'-butylidenebis(2-t-butyl-5-methylphenol), 4,4'-methylenebis(2,6-di-t-butylphenol), 2,2'-methylenebis(4-methyl-6-t-butylphenol, 4,4'-(ethane-1,2-diyl)bis(2,6-dimethylphenol), tetrabromobisphenol A, 2,2'-biphenol and other bridged dihydric phenols having a ring to ring bridge linkage located ortho to a phenol oxygen atom, and the like. Other suitable dihydric diphenol compounds include those described in U.S. Patent Application Publication No. US 2015/0197597 A1 and Published International Application No. WO 2018/125895 A1. Although not preferred for use in all instances, bisphenol compounds such as bisphenol A, bisphenol F and bisphenol S may be employed in some end uses, in some jurisdictions, or in admixture with other extender compounds, for example to reduce raw material costs.

Examples of suitable diepoxides include diepoxides of (e.g., diglycidyl ethers or esters of): substituted dihydric phenols (e.g., ortho-substituted dihydric phenols such as tetramethyl bisphenol F, di-tert-butylhydroquinone, 2,2'-biphenol and other bridged dihydric phenols having a ring to ring bridge linkage located ortho to a phenol oxygen atom, and the like), aromatic diols (e.g., benzene dimethanol, vanillyl alcohol, furan dimethanol, and the like), aromatic diacids (e.g., isophthalic acid, terephthalic acid, and the like), aliphatic diols, aliphatic diacids, cycloaliphatic diols (e.g., cyclobutane diols such as 2,2,4,4-tetramethyl-1,3-cyclobutanediol and cyclohexane dimethanol), cycloaliphatic diacids (e.g., cyclobutane diacids such as 2,2,4,4-tetramethyl-1,3-cyclobutane dicarboxylic acid), and combinations thereof. Other suitable diepoxides include the diglycidyl ether compounds described in U.S. Patent Application Publication No. US 2015/0197597 A1 and Published International Application Nos. WO 2017/079437 A1 and WO 2018/125895 A1. Although not preferred for use in all instances, diepoxides (e.g., diglycidyl ethers) of bisphenol compounds such as bisphenol A, bisphenol F and bisphenol S may be employed in some end uses, in some jurisdictions, or in admixture with other diepoxides, for example to reduce raw material costs.

In some embodiments, the water-dispersible polymer is a reaction product of ingredients including a dihydric phenol and a diepoxide of a dihydric phenol (e.g., reacted in an appropriate ratio such as, e.g., about 1.05:1 to about 1:1.05 stoichiometric ratio).

Examples of suitable polyether polymers include those disclosed in U.S. Pat. No. 9,409,219 B2; in U.S. Patent Application Publication Nos. US 2015/0021323 A1, US 2015/0151878 A1, 2015/0197597 A1, US 2016/0272576 A1, US 2017/0051177 A1, US 2017/0096521 A1 and US 2017/0096579 A1; and in Published International Application Nos. WO 2017/079437 A1 and WO 2018/125895 A1.

In some embodiments (for example, those prepared without the use of a water-dispersible polyether polymer), one or more of the disclosed latex dispersion, resin system and aqueous coating composition does not contain polyether compounds or polymers. In other embodiments, the total amount of such polyether compounds or polymers will be less than 10 wt. %, less than 5 wt. % or less than 1 wt. % based on the total solids in the dispersion, resin system or coating composition.

Polymers that are not reducible in water can be rendered water-dispersible using technologies well known to those of skill in the art. In some embodiments, the polymer (e.g., aromatic polyether polymer or other polymer) is covalently attached to one or more materials (e.g., monomers, oligomers or polymers) having one or more water-dispersing groups (e.g., salt or salt-forming groups) to render the polymer water-dispersible. The salt, salt-forming, or the water-dispersible-group-containing material may be, for example, oligomers or polymers that are (i) formed in situ prior to, during, or after formation of the polymer or (ii) provided as preformed materials that are reacted with a preformed, or nascent, polymer. The covalent attachment may be achieved through any suitable means including, for example, via reactions involving carbon-carbon double bonds, hydrogen abstraction (e.g., via a reaction involving benzoyl peroxide mediated grafting via hydrogen abstraction such as, e.g., described in U.S. Pat. No. 4,212,781), or the reaction of complimentary reactive functional groups such as occurs, e.g., in condensation reactions. In one embodiment, a linking compound is utilized to covalently attach the polymer and a salt- or salt-forming-group-containing material. In certain preferred embodiments, the one or more materials having salt or salt-forming groups is a vinyl addition component (e.g., a vinyl addition polymer), which is typically an acrylic material (e.g., is formed from an ethylenically unsaturated monomer component that includes one or more of a (meth)acrylate, a (meth)acrylic acid, and the like), more preferably an acid- or anhydride-functional acrylic material.

In one embodiment, a water-dispersible polymer may be formed from preformed polymers (e.g., (a) an oxirane-functional polymer, such as, e.g., an oxirane-functional polyether polymer, and (b) an acid-functional polymer such as, e.g., an acid-functional acrylic polymer) in the presence of an amine, more preferably a tertiary amine. If desired, an acid-functional polymer can be combined with an amine, more preferably a tertiary amine, to at least partially neutralize it prior to reaction with an oxirane-functional polymer.

In another embodiment, a water-dispersible polymer may be formed from an oxirane-functional polymer (more preferably a polyether polymer described herein) that is reacted with ethylenically unsaturated monomers to form an acid-functional polymer, which may then be neutralized, for example, with a base such as a tertiary amine. Thus, for example, in one embodiment, a water-dispersible polymer may be formed pursuant to the acrylic polymerization teachings of U.S. Pat. No. 4,285,847 or 4,212,781, which describe techniques for grafting acid-functional acrylic groups (e.g., via use of benzoyl peroxide) onto oxirane-functional polymers. In another embodiment, acrylic polymerization may be achieved through reaction of ethylenically unsaturated monomers with unsaturation present in the polymer. See, for example, U.S. Pat. No. 4,517,322 or U.S. Patent Application Publication No. 2005/0196629 for examples of such techniques.

In another embodiment, a water-dispersible polymer may be formed having the structure E-L-A, where "E" is a polyether portion of the polymer formed from a polyether polymer, "A" is a polymerized acrylic portion of the polymer, and "L" is a linking portion of the polymer which covalently links E to A. Such a polymer can be prepared, for example, from (a) a polyether polymer preferably having about two oxirane groups, (b) an unsaturated linking compound preferably having (i) a carbon-carbon double bond, a conjugated carbon-carbon double bond or a carbon-carbon triple bond and (ii) a functional group capable of reacting with an oxirane group (e.g., a carboxylic group, a hydroxyl group, an amino group, an amido group, a mercapto group, etc.). Preferred linking compounds include 12 or less carbon atoms, with sorbic acid being an example of a preferred such linking compound. The acrylic portion preferably includes one or more salt groups or salt-forming groups (e.g., acid groups such as present in α,β-ethylenically unsaturated carboxylic acid monomers). Such polymers may be formed, for example, using a BPA- and BADGE-free polyether polymer as described in the above-mentioned U.S. Pat. No. 9,409,219 B2, U.S. Patent Application Publication Nos. US 2015/0021323 A1, US 2015/0151878 A1, US 2016/0272576 A1, US 2017/0051177 A1, US 2017/0096521 A1 and US 2017/0096579 A1, and Published International Application No. WO 2018/125895 A1, optionally in combination with the materials and techniques disclosed in U.S. Pat. No. 5,830,952 or U.S. Patent Application Publication No. US 2010/0068433 A1.

In the above approaches utilizing an acrylic component to render the polymer water-dispersible, the acrylic component is typically formed from an ethylenically unsaturated monomer mixture that includes one or more α,β-unsaturated carboxylic acid, although any suitable acid- or anhydride-functional monomer may be used. The one or more α,β-unsaturated carboxylic acid preferably renders the polymer water-dispersible after neutralization with a base. Suitable α,β-unsaturated carboxylic acid monomers include any of those previously referenced herein. Although it may be possible to blend the multi-stage latex polymer and the water-dispersible polymer together, in presently preferred embodiments at least some (and in some embodiments all) of the ethylenically unsaturated monomer component is emulsion polymerized in an aqueous dispersion including at least some water-dispersible polymer.

Although not wishing to be bound by theory, it may be possible to achieve desirable coating performance for certain end uses within the food or beverage can coatings area without using any polyether polymer, or for that matter any water-dispersible polymer, in conjunction with the multi-stage latex of the present invention. Nonetheless, presently preferred embodiments include a water-dispersible polymer, with polyether polymers (e.g., polyether-acrylate copolymers) being preferred water-dispersible polymers.

Although BPA or styrene may be used, in presently preferred embodiments, the coating composition of the present invention is substantially free of or does not contain one or more of: (i) styrene and (ii) bisphenol A ("BPA"), bisphenol F ("BPF"), and bisphenol S ("BPS"). By way of example, a coating composition that is substantially free of each of BPA, BPF, and BPS is necessarily also substantially free of each of the diglycidyl ether of BPA ("BADGE), the diglycidyl ether of BPF, and the diglycidyl ether of BPS. In preferred embodiments, the coating composition exhibits a balance of coating properties in food or beverage can coating end uses that is comparable to conventional epoxy-acrylate coating systems that utilize substantial amounts of both BPA and styrene. In some embodiments, the coating composition is also substantially free of or does not contain substituted styrene compounds (e.g., alpha-methylstyrene, methyl styrenes (e.g., 2-methyl styrene, 4-methyl styrene, vinyl toluene, and the like), dimethyl styrenes (e.g., 2,4-dimethyl styrene), trans-beta-styrene, divinylbenzene, and the like). In some embodiments, the coating composition is substantially free of or does not contain vinyl aromatic compounds.

Any combination of one or more (meth)acrylates may be included in the two or more emulsion polymerized stages. Suitable (meth)acrylates include any of those referenced herein, as well as those having the structure of the above-mentioned Formula (II):

wherein:
$R^3$ is hydrogen or methyl, and
$R^4$ is an alkyl group preferably containing one to sixteen carbon atoms, a cycloaliphatic group, an aryl group, a silane group, or a combination thereof.

If desired, $R^4$ may optionally be substituted with one or more (e.g., one to three) moieties such as hydroxy, halo, phenyl, and alkoxy, for example. Examples of suitable (meth)acrylates (including, e.g., suitable alkyl (meth)acrylates) include methyl (meth)acrylate, ethyl (meth)acrylate, propyl (meth)acrylate, isopropyl (meth)acrylate, butyl (meth)acrylate, isobutyl (meth)acrylate, pentyl (meth)acrylate, isoamyl (meth)acrylate, hexyl (meth)acrylate, 2-ethylhexyl (meth)acrylate, cyclohexyl (meth)acrylate, decyl (meth)acrylate, isodecyl (meth)acrylate, benzyl (meth)acrylate, phenyl (meth)acrylate, lauryl (meth)acrylate, isobornyl (meth)acrylate, octyl (meth)acrylate, nonyl (meth)acrylate, hydroxyethyl (meth)acrylate, hydroxypropyl (meth)acrylate, and the like, substituted variants thereof (e.g., ring substituted variants of benzyl (meth)acrylate or phenyl (meth)acrylate), and isomers and mixtures thereof.

In the discussions that follow, various weight percentages are provided pertaining to the constituents of the two or more emulsion polymerized stages. As will be understood by one of skill in the art, unless specifically indicated to the contrary, these weight percentages are based on the total weight of the reactants (typically monomers) used to form the pertinent stage or stages.

Typically, (meth)acrylates (e.g., one or a mixture of two or more (meth)acrylates) will constitute a substantial portion of each of the two or more stages. In some embodiments, (meth)acrylates may constitute at least 30 wt. %, at least 50 wt. %, at least 70 wt. %, at least 85 wt. %, at least 95 wt. %, or even 100 wt. % of the monomers used to form at least one of the emulsion polymerized stages (and in some embodiments the aggregate of monomers used to form the two or more stages). The aforementioned weight percentages include all (meth)acrylates monomers present in the particular stage(s), regardless of whether one or more of the monomers may also qualify as a "monomer A" as described below. In some embodiments, one or more methacrylate monomers are present in an amount recited in this paragraph.

In some embodiments, alkyl (meth)acrylates may constitute at least 30 wt. %, at least 50 wt. %, at least 70 wt. %, at least 85 wt. %, at least 95 wt. %, or even 100 wt. % of the monomers used to form at least one of the emulsion polymerized stages (and in some embodiments the aggregate of monomers used to form the two or more stages). The aforementioned weight percentages include all alkyl (meth)acrylates monomers present, regardless of the fact that all such monomers are also (meth)acrylates, and regardless of whether one or more of the monomers may also qualify as a "monomer A".

In some embodiments, the monomers used to form at least one of the emulsion polymerized stages (and in some embodiments the aggregate of monomers used to form the two or more emulsion polymerized stages) preferably include at least 50 wt. %, at least 75 wt. %, or at least 80 wt. % of one or more (e.g., one, two, three, four, or five) of methyl methacrylate, ethyl acrylate, ethyl methacrylate, butyl acrylate (e.g., n-butyl acrylate), and butyl methacrylate (e.g., n-butyl methacrylate). In some embodiments, the monomers used to form at least one of the emulsion polymerized stages (and in some embodiments the monomers used to form each of the respective two or more emulsion polymerized stages) include a butyl methacrylate, a butyl acrylate, or both. In some embodiments, the monomers used to form the at least one emulsion polymerized stage, and in some embodiments the monomers used to form each of the respective two or more emulsion polymerized stages, include (i) both n-butyl methacrylate and one or both of ethyl methacrylate or methyl methacrylate and (ii) optionally one or more of ethyl acrylate, methyl acrylate, or n-butyl acrylate.

In some embodiments, a majority (e.g., >50 wt. %, ≥60 wt. %, ≥70 wt. %, ≥80 wt. %, ≥90 wt. %, ≥95 wt. %, etc.), or even all, of the (meth)acrylates present in the monomers used to form one or more stages (e.g., the higher Tg stage) are methacrylates, more preferably alkyl methacrylates. Examples of preferred methacrylates include methyl methacrylate, ethyl methacrylate, n-propyl methacrylate, n-butyl methacrylate, and isomers thereof (e.g., t-butyl methacrylate, iso-butyl methacrylate, etc.). In addition, di(meth)acrylates and tri(meth)acrylates may be used, with preferred examples including ethanediol dimethacrylate, propanediol dimethacrylate, and butanediol dimethacrylate (e.g., 1,3-butanediol dimethacrylate and 1,4-butanediol dimethacrylate).

Thus, in some embodiments the monomers used to form one or more stages (e.g., the higher Tg stage, and in some embodiments the aggregate of monomers used to form the two or more emulsion polymerized stages) include at least 30 wt. %, at least 50 wt. %, at least 70 wt. %, at least 85 wt. %, or at least 95 wt. % of one or more alkyl methacrylates.

In some embodiments (e.g., certain styrene-free embodiments), the monomers used to form at least one of the emulsion polymerized stages include one or more ethylenically unsaturated monomers that include a cycloaliphatic group or a hydrocarbon group including at least four carbon atoms (referred to collectively hereinafter as "monomer component A" or "monomers A" for short), or a mixture of both. Although any suitable ethylenically unsaturated monomer(s) A may be used, such monomers will typically be vinyl monomers such as, for example, alkyl (meth)acrylates, cycloalkyl (meth)acrylates, vinyl aromatics (including, e.g., aryl (meth)acrylates), vinyl esters, and the like. One or more heteroatoms may optionally be present in the cycloaliphatic group or the C4 or greater hydrocarbon group. In some embodiments, only carbon atoms and hydrogen atoms are present in the cycloaliphatic group or the C4 or greater hydrocarbon group. The C4 or greater hydrocarbon group can have any suitable structure, although linear chains or branched linear chains are preferred in some embodiments, with linear or branched linear groups having a longest chain that includes at least 3 carbon atoms being particularly preferred in certain embodiments. Alkyl (meth)acrylates having the specified groups are examples of preferred such monomers A, although any suitable type or types of ethylenically unsaturated monomers having such groups may be used.

While not intending to be bound by any theory, it is believed that the inclusion of one or more ethylenically unsaturated monomers that include a cycloaliphatic group or a hydrocarbon group having at least four carbon atoms can, among other things, help impart a suitably high level of hydrophobicity. It is believed that this may be desirable for multiple reasons such as, e.g., to enhance water resistance or retort resistance and help reduce partitioning ("scalping") of low concentration flavorants present in certain aqueous packaged products (e.g., certain colas) into the coating. Resistance to unsuitable levels of flavor scalping is generally desired for interior can coatings, especially for interior beverage can coatings that may be used to package products such as, e.g., certain colas that may contain relatively low flavorant concentrations where significant partitioning of flavorant into the coating may lead to perceivable changes in product flavor.

Examples of suitable C4 or greater hydrocarbon groups for inclusion in monomers A include hydrocarbon groups having 4 or more, 5 or more, 6 or more, 7 or more, or 8 or more carbon atoms, with preferred such hydrocarbon groups being butyl, pentyl, hexyl, and isomers thereof (e.g., n-butyl, sec-butyl, t-butyl. etc.). Some specific examples of such monomers A include: n-butyl (meth)acrylate, isobutyl (meth)acrylate, sec-butyl (meth)acrylate, tert-butyl (meth) acrylate, n-pentyl (meth)acrylate, isopentyl (meth)acrylate, hexyl (meth)acrylate, 2-ethylhexyl (meth)acrylate, isodecyl methacrylate, 3,5,5-trimethylhexyl (meth)acrylate, derivatives and isomers thereof, and combinations thereof. In some embodiments, C4 or greater hydrocarbon groups having between 4 and 6 carbon atoms are preferred. While not intending to be bound by any theory, it is believed that the inclusion of an excessive amount of monomers A having long linear carbon chains (e.g., C7 or greater, and in certain instances C5 or C6) may result in a latex having an unsuitably low glass transition temperature for certain internal can coating applications. Any suitably cycloaliphatic group may be employed in monomers A, including, for example, cycloaliphatic groups having 4-membered rings, 5-membered rings, 6-membered rings, or even 7-membered rings or larger. The cycloaliphatic groups may also be monocyclic or polycyclic (e.g., bicyclic, tricyclic, tetracyclic, etc.). Any suitable polycyclic groups may be employed, including, for example, bridged polycyclic ring systems (e.g., norbornane groups), fused polycyclic ring systems, or combinations thereof (e.g., tricyclodecane groups). Typically, the atoms making up the ring(s) will be carbon atoms, although as discussed above, one or more heteroatoms may also be present in the ring. Examples of monomers A having a cycloaliphatic group include cyclohexyl (meth)acrylate, 4-tert-butylcyclohexyl (meth)acrylate, 3,3,5-trimethylcyclohexyl (meth)acrylate, isobornyl (meth)acrylate, tetrahydrofurfuryl (meth)acrylate, variants and isomers thereof, and mixtures thereof.

In some embodiments, butyl (meth)acrylates are preferred monomers A. In some embodiments, the ethylenically unsaturated monomer component includes both butyl acrylate and butyl methacrylate. In some such embodiments, it may be preferable to use an excess amount of butyl methacrylate relative to the amount of butyl acrylate.

As mentioned above, in some embodiments at least one monomer A of the below Formula (I) is employed to prepare one or more of the emulsion polymerized stages:

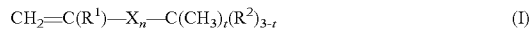

wherein:
R$^1$ is hydrogen or an alkyl group, more typically hydrogen or a methyl group;
n is 0 or 1, more typically 1;
X, if present, is a divalent linking group; more typically an amide, carbonate, ester, ether, urea, or urethane linkage; and even more typically an ester linkage of either directionality (viz., —C(O)—O— or —O—C(O)—);
t is 0 to 3;
each R$^2$, if present, is independently an organic group that may optionally be itself branched, more typically an alkyl group that may optionally include one or more heteroatoms (e.g., N, O, P, Si, etc.); and
two or more R$^2$ may optionally form a cyclic group with one another.

In some embodiments, t is 1 and the total number of carbon atoms present in both R$^2$ groups is 6, 7, or 8. Examples of such monomers A include the VEOVA 9 (Tg 70° C.), VEOVA 10 (Tg –3° C.), and VEOVA 11 (Tg –40° C.) monomers commercially available from Hexion.

In some embodiments, t is 0, 1, or 2, and least one R$^2$ is a branched organic group, more typically a branched alkyl group. Thus, for example, in some embodiments, at least one R$^2$ is present that includes a tertiary or quaternary carbon atom. The VEOVA 9 monomer is an example of such a branched monomer.

In some embodiments, at least one of the emulsion polymerized stages (and in some embodiments the aggregate of monomers used to form the two or more stages) includes at least 30 weight percent ("wt. %"), at least 35 wt. %, at least 40 wt. %, at least 45 wt. %, or even 80 wt. % or more of one or more monomers A. Although the upper amount is not restricted, when used, the one or more monomers A are typically the present in an amount (in a particular stage or the aggregate of monomers used to form the two or more stages) of 100 wt. %, more typically less than 80 wt. %, even more typically less than 75 wt. %, and even more typically less than 65 wt. %.

In some embodiments, the monomers used to form at least one of the emulsion polymerized stages (and in some embodiments the aggregate of the monomers used to form the two or more emulsion polymerized stages) include at least 20 wt. %, at least 30 wt. %, at least 35 wt. %, at least 40 wt. %, or even 80 wt. % or more of one or more ethylenically unsaturated monomers having a linear or branched hydrocarbon group including at least 4 carbon atoms and having a longest chain length of at least 3 carbon atoms.

In some embodiments, the monomers used to form at least one of the emulsion polymerized stages includes one or more ethylenically unsaturated monomers having a C1-C3 hydrocarbon group. The methyl group attached to the alpha-carbon of methacrylic acid is not considered such a C1-C3 hydrocarbon group. Similarly, the vinylic group of a vinyl monomer is not considered to be present in such a C1-C3 hydrocarbon group. Preferred such hydrocarbon groups include methyl, ethyl, propyl, and isopropyl groups. Examples of such monomers include alkyl (meth)acrylates in which the alkyl group (e.g., an $R^4$ group in the above Formula (II)) is a C1-C3 alkyl group such as, e.g., methyl, ethyl, n-propyl, iso-propyl, and mixtures thereof. Preferred such monomers having a C1-C3 hydrocarbon group include methyl methacrylate, ethyl acrylate, ethyl methacrylate, and mixtures thereof. An emulsion polymerized ethylenically unsaturated monomer component can include any suitable amount of such monomers, including, for example at least 10 wt. %, at least 20 wt. %, at least 30 wt. %, or at least 40 wt. %. Typically, the one or more ethylenically unsaturated monomers having a C1-C3 hydrocarbon group will constitute less than 70 wt. %, more typically less than 60 wt. %, and even more typically less than 50 wt. %.

Multi-functional monomers may be used, with multi-ethylenically unsaturated monomers being an example of preferred multi-functional monomers. Examples of suitable multi-ethylenically unsaturated (meth)acrylates include polyhydric alcohol esters of acrylic acid or methacrylic acid, such as ethanediol di(meth)acrylate, propanediol di(meth)acrylate, butanediol di(meth)acrylate (e.g., 1,3-butanediol di(meth)acrylate and 1,4-butanediol di(meth)acrylate), heptanediol di(meth)acrylate, hexanediol di(meth)acrylate, trimethylolethane tri(meth)acrylate trimethylolpropane tri (meth)acrylate, trimethylolbutane tri(meth)acrylate, trimethylolheptane tri(meth)acrylate, trimethylolhexane tri(meth) acrylate, tetramethylol methane tetra(meth)acrylate, dipropylene glycol di(meth)acrylate, trimethylol hexane tri (meth)acrylate, pentaerythritol tetra(meth)acrylate, isosorbide di(meth)acrylate, allyl (meth)acrylate, glycerol dimethacrylate, and mixtures thereof. Examples of multi-ethylenically unsaturated monomers other than (meth)acrylates include diallyl phthalate, divinylbenzene, divinyltoluene, divinylnaphthalene, and mixtures thereof.

In some embodiments, the monomers used to form at least one stage (and in some embodiments the aggregate of monomers used to form the two or more emulsion polymerized stages) may include a small amount (e.g., less than 5 wt. %, less than 2 wt. %, or less than 1 wt. %) of acid- or anhydride-functional ethylenically unsaturated monomer. Examples of suitable such acid- or anhydride-functional monomers may include any of those disclosed for use in conjunction with the acrylate portion of any of the polyether-acrylate copolymers disclosed herein.

The ethylenically unsaturated monomer component may also include any other suitable monomers. For example, suitable other vinyl monomers may include isoprene, diallylphthalate, conjugated butadiene, vinyl naphthalene, acrylonitrile, (meth)acrylamides (e.g., acrylamide, methacrylamide, N-isobutoxymethyl acrylamide, N-butoxymethyl acrylamide, etc.), methacrylonitrile, vinyl acetate, vinyl propionate, vinyl butyrate, vinyl stearate, and the like, and variants and mixtures thereof.

In some embodiments, the emulsion polymerized ethylenically unsaturated monomer component does not contain any oxirane-group containing monomer.

In presently preferred embodiments, the emulsion polymerized ethylenically unsaturated monomer component, and more preferably the entire resin system, does not include and is not derived from any acrylamide-type monomers (e.g., acrylamides or methacrylamides). If any such monomers are employed, their total amount preferably is no more than 0.5 wt. % and more preferably no more than 0.1 wt. % of the aggregate weight of the polymerizable monomers employed to make the resin system.

The emulsion polymerized ethylenically unsaturated monomer component may optionally include one or more vinyl aromatic compounds other than styrene. Such vinyl aromatic compounds may be substituted styrene compounds or other types of vinyl aromatic compounds (e.g., any of the aryl-group-containing ethylenically unsaturated monomers described herein such as benzyl (meth)acrylate, etc.). In some embodiments, the monomers used to form at least one stage (and in some embodiments the aggregate of monomers used to form the two or more emulsion polymerized stages) include, if any, less than 20 wt. %, less than 10 wt. %, less than 5 wt. % or less than 1 wt. % of vinyl aromatic compounds. In some embodiments, the monomers used to form the latex are substantially free of or do not contain such compounds.

With regard to the conditions of the emulsion polymerization reactions described herein, the two or more stages (e.g., the higher Tg and lower Tg stages) of the multi-stage latex are preferably polymerized in aqueous medium with a water-soluble free radical initiator in the presence of one or more water-dispersible polymers described herein. Although not presently preferred, it is also contemplated that some (or even all) of the emulsion polymerized ethylenically unsaturated components of the two or more stages can be emulsion polymerized separately and then later mixed with the one or more water-dispersible polymers.

The temperature of polymerization is typically from 0° C. to 100° C., preferably from 50° C. to 90° C., more preferably from 70° C. to 90° C., and even more preferably from 80° C. to 85° C. The pH of the aqueous medium is usually maintained at a pH of 5 to 12.

The free radical initiator can be selected, for example, from one or more water-soluble peroxides which are known to act as free radical initiators. Examples include hydrogen peroxide and t-butyl hydroperoxide. Redox initiator systems well known in the art (e.g., t-butyl hydroperoxide, erythorbic acid, and ferrous complexes) can also be employed. In some embodiments, a mixture of benzoin and hydrogen peroxide is used.

Further examples of polymerization initiators which can be employed include polymerization initiators that thermally decompose at the polymerization temperature to generate free radicals. Examples include both water-soluble and water-insoluble species. Further examples of free radical initiators that can be used include persulfates, such as ammonium or alkali metal (potassium, sodium or lithium) persulfate; azo compounds such as 2,2'-azo-bis(isobutyronitrile), 2,2'-azo-bis(2,4-dimethylvaleronitrile), and 1-t-butyl-azocyanocyclohexane; hydroperoxides such as t-amyl hydroperoxide, methyl hydroperoxide, and cumene hydroperoxide; peroxides such as benzoyl peroxide, caprylyl peroxide, di-t-butyl peroxide, ethyl 3,3'-di(t-butylperoxy) butyrate, ethyl 3,3'-di(t-amylperoxy) butyrate, t-amylperoxy-2-ethyl hexanoate, and t-butylperoxy pivilate; peresters such as t-butyl peracetate, t-butyl perphthalate, and t-butyl perbenzoate; as well as percarbonates, such as di(1-cyano-1-methylethyl)peroxy dicarbonate; perphosphates, and the like; and combinations thereof.

Polymerization initiators can be used alone or as the oxidizing component of a redox system, which also preferably includes a reducing component such as, e.g., ascorbic acid, malic acid, glycolic acid, oxalic acid, lactic acid, thiogycolic acid, or an alkali metal sulfite, more specifically a hydrosulfite, hyposulfite or metabisulfite, such as sodium hydrosulfite, potassium hyposulfite and potassium metabisulfite, or sodium formaldehyde sulfoxylate, and combinations thereof. The reducing component is frequently referred to as an accelerator or a catalyst activator.

The initiator and accelerator (if any) are preferably used in proportion from about 0.001% to 5% each, based on the weight of monomers to be copolymerized. Promoters such as chloride and sulfate salts of cobalt, iron, nickel or copper can be used in small amounts, if desired. Examples of redox catalyst systems include tert-butyl hydroperoxide/sodium formaldehyde sulfoxylate/Fe(II), and ammonium persulfate/sodium bisulfite/sodium hydrosulfite/Fe(II).

Chain transfer agents can be used to control polymer molecular weight, if desired. Exemplary chain transfer agents include mercaptans and other materials that will be familiar to persons having ordinary skill in the art.

The polymerization reaction of ethylenically unsaturated monomers in the presence of the aqueous dispersion of the water-dispersible polymer may be conducted as a batch, intermittent, or continuous operation.

Typically, the reactor is charged with an appropriate amount of water and water-dispersible polymer. Typically, the reactor is then heated to the free radical initiation temperature and then charged with ethylenically unsaturated monomers of a first stage (e.g., of the higher Tg stage or the lower Tg stage). There may also be some water miscible solvent present. At temperature, the free radical initiator is added and is allowed to react for a period of time at polymerization temperature, the remaining ethylenically unsaturated monomer component (if any of a first stage) is added incrementally with the rate of addition being varied depending on the polymerization temperature, the particular initiator being employed, and the type and amount of monomers being polymerized. After, or prior to, completion of the first stage polymerization, the ethylenically unsaturated monomers of a second stage (e.g., the other of the higher or lower Tg stage) are charged to the reactor, typically along with additional free radical initiator. After all the monomers have been charged, a final heating is carried out to complete the polymerization. The reactor is then cooled and the latex recovered. As previously discussed, the method may also include the emulsion polymerization of one or more additional optional stages (e.g., in addition to the higher Tg and lower Tg stages) at any suitable time. It should be understood that the above methodology is only representative and other suitable processes may also be used.

If desired, a non-polymeric surfactant (or emulsifier) may be employed to facilitate emulsion polymerization of one or more of the stages of the latex. Such surfactants may optionally be polymerizable and may be used instead of, or in addition to, the water-dispersible polymer. Examples of suitable such non-polymer surfactants are provided, for example, in Published International Application Nos. WO 2016/105504 A1 and WO 2017/112837 A1.

As previously discussed, in preferred embodiments, the water-dispersible polymer and two or more emulsion polymerized stages are both present in a latex (e.g., both present in a same latex particle or latex copolymer), which is preferably formed by emulsion polymerizing the two or more stages in the presence of the water-dispersible polymer. The water-dispersible polymer and one or more of the emulsion polymerized stages may optionally be covalently attached to one another. Similarly, two or more emulsion polymerized stages (e.g., the higher Tg and lower Tg stages) may be covalently attached to one another.

Coating compositions of the present invention preferably include at least a film-forming amount of the resin system described herein containing the water-dispersible polymer and the two or more emulsion polymerized stages. The coating composition typically includes at least 10 wt. %; more typically at least 20 wt. %; even more typically at least 50 wt. %; and even more typically at least 75 wt. %, at least 90 wt. %, or at least 95 wt. % of the resin system; based on the solids weight of the water-dispersible polymer and the two or more emulsion polymerized stages relative to the total resin solids weight of the coating composition. The coating composition includes 100 wt. % or less, more typically less than 99 wt. %, and even more typically less than 95 wt. % of the resin system (which is preferably a latex resin system), based on the solids weight of the water-dispersible polymer and the two or more emulsion polymerized stages relative to the total resin solids weight of the coating composition.

Typically, resin solids will constitute at least 30 wt. %, at least 40 wt. %, or at least 50 wt. % or more of the coating solids. In some embodiments, resin solids constitute all or substantially all (e.g., greater than 90 or 95 wt. % or even 100 wt. %) of the coating solids.

The coating composition may be formulated from the latex emulsion, optionally with the inclusion of one or more additives or by rheological modification for different coating applications (e.g., diluted for spray coating applications). In embodiments in which the coating composition includes one or more additives, the additives preferably do not adversely affect the latex emulsion, or a cured coating formed from the coating composition. For example, such optional additives may be included in the coating composition to enhance composition aesthetics, to facilitate manufacturing, processing, handling, and application of the composition, and to further improve a particular functional property of the coating composition or a cured coating resulting therefrom.

Such optional additives include, for example, catalysts, dyes, pigments, toners, extenders, fillers, lubricants, anticorrosion agents, flow-control agents, thixotropic agents, dispersing agents, antioxidants, adhesion promoters, light stabilizers, curing agents, co-resins and mixtures thereof. Each optional additive is preferably included in a sufficient amount to serve its intended purpose, but not in such an amount to adversely affect the coating composition or a cured coating resulting therefrom.

One preferred optional additive is a catalyst to increase the rate of cure. Examples of catalysts, include, but are not limited to, strong acids (e.g., dodecylbenzene sulphonic acid (DDBSA, available as CYCAT 600 from Cytec), methane sulfonic acid (MSA), p-toluene sulfonic acid (pTSA), dinonylnaphthalene disulfonic acid (DNNDSA), and triflic acid), quaternary ammonium compounds, phosphorous compounds, and tin, titanium, and zinc compounds. Specific examples include, but are not limited to, a tetraalkyl ammonium halide, a tetraalkyl or tetraaryl phosphonium iodide or acetate, tin octoate, zinc octoate, triphenylphosphine, and similar catalysts known to persons skilled in the art.

If used, the catalyst is preferably present in an amount of at least about 0.01% by weight, and more preferably at least about 0.1% by weight, based on the total solids weight of the coating composition. Furthermore, if used, the catalyst is also preferably present in an non-volatile amount of no greater than about 3% by weight, and more preferably no greater than about 1% by weight, based on the total solids weight of the coating composition.

Another useful optional ingredient is a lubricant (e.g., a wax), which facilitates manufacture of metal closures and other fabricated coated articles by imparting lubricity to sheets of coated metal substrate. Preferred lubricants include, for example, Carnauba wax and polyethylene-type lubricants. If used, a lubricant is preferably present in the coating composition in an amount of at least about 0.1% by weight, and preferably no greater than about 2% by weight, and more preferably no greater than about 1% by weight, based on the total solids weight of the coating composition.

Another useful optional ingredient is an organosilicon material, such as a siloxane-based or polysilicone-based materials. Representative examples of suitable such materials are disclosed in Published International Application Nos. WO/2014/089410 A1 and WO/2014/186285 A1.

Another useful optional ingredient is a pigment, such as titanium dioxide. If used, a pigment is present in the coating composition in an amount of no greater than about 70% by weight, more preferably no greater than about 50% by weight, and even more preferably no greater than about 40% by weight, based on the total solids weight of the coating composition.

The coating composition may also incorporate one or more optional curing agents (e.g., crosslinking resins, sometimes referred to as "crosslinkers"). The choice of particular crosslinker typically depends on the particular product being formulated. For example, some coatings are highly colored (e.g., gold-colored coatings). These coatings may typically be formulated using crosslinkers that themselves tend to have a yellowish color. In contrast, white coatings are generally formulated using non-yellowing crosslinkers, or only a small amount of a yellowing crosslinker. Preferred curing agents are substantially free of or do not contain each of BPA, BPF, BPS, and epoxy novolacs.

Any of the well-known, hydroxyl-reactive curing resins can be used. For example, phenoplast, blocked isocyanates, and aminoplast curing agents may be used, as well as combinations thereof. In addition, or alternatively, carboxyl-reactive curing resins may be used.

Phenoplast resins include the condensation products of aldehydes with phenols. Formaldehyde and acetaldehyde are preferred aldehydes. Various phenols can be employed such as phenol, cresol, p-phenylphenol, p-tert-butylphenol, p-tert-amylphenol, and cyclopentylphenol.

Aminoplast resins are the condensation products of aldehydes such as formaldehyde, acetaldehyde, crotonaldehyde, and benzaldehyde with amino or amido group-containing substances such as urea, melamine, and benzoguanamine. Examples of suitable aminoplast crosslinking resins include benzoguanamine-formaldehyde resins, melamine-formaldehyde resins, esterified melamine-formaldehyde, and urea-formaldehyde resins. One specific example of a suitable aminoplast crosslinker is the fully alkylated melamine-formaldehyde resin commercially available from Cytec Industries, Inc. under the trademark CYMEL 303.

Examples of other generally suitable curing agents are the blocked or non-blocked aliphatic, cycloaliphatic or aromatic di-, tri-, or poly-valent isocyanates, such as hexamethylene diisocyanate (HMDI), cyclohexyl-1,4-diisocyanate, and the like. Further examples of generally suitable blocked isocyanates include isomers of isophorone diisocyanate, dicyclohexylmethane diisocyanate, toluene diisocyanate, diphenylmethane diisocyanate, phenylene diisocyanate, tetramethyl xylene diisocyanate, xylylene diisocyanate, and mixtures thereof. In some embodiments, blocked isocyanates are used that have a number-average molecular weight of at least about 300, more preferably at least about 650, and even more preferably at least about 1,000.

Other suitable curing agents may include benzoxazine curing agents such as, for example, benzoxazine-based phenolic resins. Examples of benzoxazine-based curing agents are provided in U.S. Patent Application Publication No. US 2016/0297994 A1.

Alkanolamide-type curing agents may also be used. Preferred such curing agents include beta-hydroxyalkyl-amide crosslinkers such as, for example, those sold under the PRIMID trademark (e.g., the PRIMID XL-552 and QM-1260 products) by EMS-CHEMIE AG.

The concentration of the curing agent (e.g., crosslinker) in the coating composition may depend on the type of curing agent, the time and temperature of the bake, and the molecular weights of the copolymer particles. If used, the crosslinker is typically present in an amount of up to about 50% by weight, preferably up to about 30% by weight, and more preferably up to about 15% by weight. If used, the crosslinker is typically present in an amount of at least about 0.1% by weight, more preferably at least about 1% by weight, and even more preferably at least about 1.5% by weight. These weight percentages are based on the total resin solids weight of the coating composition.

In some embodiments, the coating composition may be cured without the use of an external crosslinker (e.g., without phenolic crosslinkers). Additionally, the coating composition may be substantially free of formaldehyde and formaldehyde-containing materials, more preferably essentially free of these compounds, even more preferably essentially completely free of these compounds, and most preferably completely free of or does not contain these compounds.

As mentioned above, in preferred embodiments the disclosed coating composition is substantially free of or does not contain one or more of: (i) styrene and (ii) each of BPA, BPF, and BPS. In addition, the coating composition is preferably substantially free of, completely free of or does not contain any structural units derived from a dihydric phenol, or other polyhydric phenol, having estrogenic agonist activity greater than or equal to that of 4,4'-(propane-2,2-diyl)diphenol. More preferably, the coating composition is substantially free of, completely free of or does not contain any structural units derived from a dihydric phenol, or other polyhydric phenol, having estrogenic agonist activity greater than or equal to that of BPS. In some embodiments, the coating composition is substantially free of, completely free of or does not contain any structural units derived from a bisphenol. By way of example, a structural unit derived from an epoxide of a bisphenol (e.g., a diglycidyl ether of a bisphenol) is considered to be a structural unit derived from a bisphenol.

Even more preferably, the coating composition is substantially free of, completely free of or does not contain any structural units derived from a dihydric phenol, or other polyhydric phenol, having estrogenic agonist activity greater than 4,4'-(propane-2,2-diyl)bis(2,6-dibromophenol). Optimally, the coating composition is substantially free of, completely free of or does not contain any structural units derived from a dihydric phenol, or other polyhydric phenol, having estrogenic agonist activity greater than 2,2-bis(4-hydroxyphenyl)propanoic acid. Estrogen agonist activity may be evaluated using a suitable competent in vitro human estrogen receptor assay such as the MCF-7 cell proliferation assay ("MCF-7 assay") or other assay that may be used in place of or correlated to the MCF-7 assay through analysis of common reference compounds. See, for example, U.S. Patent Application Publication No. 2013/0316109 A1 for a discussion of such structural units and applicable test methods.

In preferred embodiments, the coating composition is not prepared using halogenated monomers (whether free or polymerized), such as chlorinated vinyl monomers. In further preferred embodiments, the coating composition is substantially free of, completely free of or does not contain halogenated monomers.

The coating composition may also optionally be rheologically modified for different coating applications. For example, the coating composition may be diluted with additional amounts of the aqueous carrier to reduce the total solids content in the coating composition. Alternatively, portions of the aqueous carrier may be removed (e.g., evaporated) to increase the total solids content in the coating composition. The final total solids content in the coating composition may vary depending on the particular coating application used (e.g., spray coating), the particular coating use (e.g., for interior can surfaces), the coating thickness, and the like.

If desired, the coating composition may also include one or more other optional polymers, such as, for example, one or more acrylic polymers, alkyd polymers, epoxy polymers, polyolefin polymers, polyurethane polymers, polysilicone polymers, polyester polymers, and copolymers and mixtures thereof.

In some embodiments, such as for certain spray coating applications (e.g., inside spray for food or beverage cans including, e.g., aluminum beverage cans), the coating composition may have a total solids weight greater than about 5%, more preferably greater than about 10%, and even more preferably greater than about 15%, based on the total weight of the coating composition. In these embodiments, the coating composition may also have a total solids weight less than about 40%, more preferably less than about 30%, and even more preferably less than about 25%, based on the total weight of the coating composition. In some of these embodiments, the coating composition may have a total solids weight ranging from about 18% to about 22%. The aqueous carrier may constitute the remainder of the weight of the coating composition.

The aqueous carrier of the coating composition includes water and may further include one or more optional organic solvents. In some embodiments, water constitutes greater than about 20% by weight, more preferably greater than about 35% by weight, and even more preferably greater than about 50% by weight of the total weight of the aqueous carrier. In some embodiments, water constitutes 100% or less, more preferably less than about 95% by weight, and even more preferably less than about 90% by weight of the total weight of the aqueous carrier.

While not intending to be bound by theory, the inclusion of a suitable amount of an organic solvent can be advantageous, in some embodiments (e.g., for certain coil coating applications to modify flow and leveling of the coating composition, control blistering, and maximize the line speed of the coil coater). Accordingly, in certain embodiments, the organic solvents may constitute greater than 0%, more preferably greater than about 5%, and even more preferably greater than about 10% by weight of the aqueous carrier, based on the total weight of the aqueous carrier. In these embodiments, the organic solvents may also constitute less than about 80%, more preferably less than about 65%, and even more preferably less than about 50% by weight of the aqueous carrier, based on the total weight of the aqueous carrier. In some embodiments, organic solvents constitutes less than 40% by weight of the aqueous carrier.

The coating composition preferably has a viscosity suitable for a given coating application. In some embodiments, the coating composition may have an average viscosity greater than about 20 seconds, more preferably greater than 25 seconds, and even more preferably greater than about 30 seconds, based on the Viscosity Test described below (Ford Viscosity Cup #2 at 25° C.). In some embodiments, the coating composition may also have an average viscosity less than about 80 seconds, more preferably less than 60 seconds, and even more preferably less than about 50 seconds, based on the Viscosity Test described below (Ford Viscosity Cup #2 at 25° C.).

The coating composition of the present invention may be applied to a variety of different substrates using a variety of different coating techniques (e.g., spray coating, roll coating, wash coating, dipping, etc.). In preferred embodiments, the coating composition is applied as an inside spray coating to a container or portion or component thereof, or to a substrate surface that will become part or all of the inside of such container. As briefly described above, cured coatings formed from the coating composition are particularly suitable for use on metal food and beverage cans (e.g., two-piece cans, three-piece cans, and the like). Two-piece cans (e.g., two-piece beer or soda cans and certain food cans) are typically manufactured by a drawn and ironing ("D&I") process, and are becoming increasingly prevalent within the food and beverage industry. The cured coatings are also suitable for use in food or beverage contact situations (collectively referred to herein as "food-contact"), and may be used on the inside or outside of such cans.

Preferred coating compositions of the present invention are particularly suitable for in forming spray-applied interior coating on aluminum or steel two-piece draw and ironed beverage or food cans.

The disclosed coating compositions may be present as a layer of a mono-layer coating system or as one or more layers of a multi-layer coating system. The coating composition can be used as a primer coat, an intermediate coat, a top coat, or a combination thereof. The coating thickness of a particular layer and of the overall coating system will vary depending upon the coating material used, the substrate, the coating application method, and the end use for the coated article. Mono-layer or multi-layer coating systems including one or more layers formed from the disclosed coating composition may have any suitable overall coating thickness, but will typically have an overall average dry coating weight of from about 0.6 grams per square meter ("gsm") to about 13 gsm and more typically from about 1.0 gsm to about 6.5 gsm, with the chosen coating weight often depending on the desired end use. Minimum average dry film weights are also important to ensure adequate coverage while still maintaining suitable coating performance. For example, for beverage cans, typical minimum dry film weights are about 1.6 grams per square meter (gsm) (corresponding to a coating thickness of about 1.4 micrometers or about 0.055 mils for a typical cured coating density) for beer beverage cans; about 2.3 gsm (corresponding to about 2 micrometers or about 0.079 mils) for soda cans; and about 3.4 gsm (corresponding to about 3 micrometers or about 0.117 mils) for can intended for use in packaging "hard-to-hold" products such as sports and energy drinks, wine, mixers, and cocktail drinks. Coating systems for use on closures (e.g., twist-off metal closures) for food or beverage containers may have an average total coating weight up to about 5.2 gsm (corresponding to about 4.6 micrometers or about 0.18 mils). For sprayed tinplate food cans, typical minimum dry film weights are about 5.4 gsm (corresponding to about 4.8 micrometers or about 0.19 mils). Minimum dry film weights for other applications may be about 7.9 gsm (corresponding to about 6.9 micrometers or about 0.27 mils), about 9.5 gsm (corresponding to about 8.4 micrometers or about 0.33 mils), and about 11.7 gsm (corresponding to about 10.4 micrometers or about 0.41 mils). In certain embodiments in which the coating composition is used as an interior coating on a drum (e.g., a drum for use with food or beverage products), a typical minimum dry film weight may be about 13 gsm (corresponding to about 11.7 micrometers or about 0.46 mils). However, for reasons including economy, cure speed and efficiency, the maximum dry coating weight for the various applications listed above may also be less than about 15 gsm (corresponding to about 13.5 micrometers or about 0.53 mils).

The metal substrate used in forming rigid food or beverage cans, or portions thereof, typically has an average thickness in the range of about 125 micrometers to about 635 micrometers. Electro-tinplated steel, cold-rolled steel and aluminum are commonly used as metal substrates for food or beverage cans, or portions thereof. In embodiments in which a metal foil substrate is employed in forming, e.g., a packaging article, the thickness of the metal foil substrate may be even thinner that that described above.

The disclosed coating compositions may be applied to a substrate either prior to, or after, the substrate is formed into an article such as, for example, a food or beverage container or a portion thereof. In one embodiment, a method of forming food or beverage cans, or portions thereof, is provided that includes: applying a coating composition described herein to a metal substrate (e.g., applying the composition to the metal substrate in the form of a planar coil or sheet), hardening the composition, and forming (e.g., via stamping) the substrate into a packaging container or a portion thereof (e.g., a food or beverage can or a portion thereof). For example, two-piece or three-piece cans or portions thereof such as riveted beverage can ends (e.g., soda or beer cans) with a cured coating of the disclosed coating composition on a surface thereof can be formed in such a method. In another embodiment, a method of forming food or beverage cans is provided that includes: providing a packaging container or a portion thereof (e.g., a food or beverage can or a portion thereof), applying a coating composition described herein to the inside, outside or both inside and outside portions of such packaging container or a portion thereof (e.g., via spray application, dipping, etc.), and hardening the composition.

After applying the coating composition onto a substrate, the composition can be cured using a variety of processes, including, for example, oven baking by either conventional or convectional methods, or any other method that provides an elevated temperature suitable for curing the coating. The curing process may be performed in either discrete or combined steps. For example, substrates can be dried at ambient temperature to leave the coating compositions in a largely uncrosslinked state. The coated substrates can then be heated to fully cure the compositions. In certain instances, the disclosed coating compositions may be dried and cured in one step.

The cure conditions will vary depending upon the method of application and the intended end use. The curing process may be performed at any suitable temperature, including, for example, oven temperatures in the range of from about 100° C. to about 300° C., and more typically from about 177° C. to about 250° C. If a metal coil is the substrate to be coated (e.g., metal coil for forming beverage can ends), curing of the applied coating composition may be conducted, for example, by heating the coated metal substrate over a suitable time period to a peak metal temperature ("PMT") of preferably greater than about 177° C. More preferably, the coated metal coil is heated for a suitable time period (e.g., about 5 to 900 seconds) to a PMT of at least about 218° C. The cured (viz., hardened) coating preferably is a continuous cured coating (viz., a coating that exhibits a suitably low initial metal exposure value, thereby indicating that the substrate has been effectively coated).

In some embodiments, the coating composition is an inside spray coating composition capable of being spray applied on an interior of a food or beverage can (e.g., a 2-piece food or beverage can) to effectively, and evenly, coat the substrate and form a continuous cured coating.

Preferred Tg values for the cured coating include those greater than about 50° C., more preferably greater than about 60° C., even more preferably greater than about 70° C., and in some embodiments, greater than about 80° C. Preferred Tg values for the cured coating include those less than about 120° C., more preferably less than about 115° C., even more preferably less than about 110° C., and in some embodiments, less than about 100° C.

To further prevent or otherwise reduce coating penetration by an intended food or beverage product, the cured coating is preferably suitably hydrophobic. For example, the cured coating can have a contact angle with deionized water greater than about 80, more preferably greater than about 85, and even more preferably greater than about 90, when tested under ambient conditions. In some embodiments, the cured coating may have a contact angle other than the above-referenced levels.

In some embodiments, the cured coating preferably exhibits desired properties for use as an interior food-contact coating (e.g., inside spray coating) for food and beverage containers. It consequently will be desirable to avoid the use of materials that are unsuitable for food-contact applications due to factors such as taste or toxicity concerns or potential failure to meet governmental regulatory requirements. In addition, for such coatings it will be necessary to select cure chemistries capable of imparting sufficient hardness and other relevant cured film properties during the relatively short oven curing times employed when making food and beverage packaging containers and container components (e.g., less than about one minute for coil coating, less than about two minutes or less than about one minute for inside spray beverage can coatings, and not more than 10 minutes for food containers). These times are much shorter than those typically employed for many other coating end uses. Also, such coatings will need to provide adequate performance at the very thin film weights and thicknesses employed for food and beverage coatings. These film weights and thicknesses are often ¹/₁₀ or less of the film weights and thicknesses employed for many other coating end uses.

As a general guide to minimizing potential taste and toxicity concerns, cured food-contact coatings made from the disclosed multi-stage latex preferably exhibit a global extraction value less than about 50 ppm, more preferably less than about 25 ppm, even more preferably less than about 10 ppm, and most preferably less than about 1 ppm, pursuant to the Global Extraction test below. These global extraction values are sufficiently stringent to exclude typical multi-stage latex coating compositions used for architectural paints and other residential or industrial coating applications. Reduced Global Extraction values may be obtained by limiting the amount of mobile or potentially mobile species in the cured coating. Accordingly, normally it may be desirable to use pure rather than impure reactants; to avoid reaction schemes that produce unduly low yields or lead to undesirable side reactions; to choose appropriate stoichiometry so as to limit the amounts of unreacted or unconsumed species including monomers, oligomers, initiators, crosslinkers and catalysts; to avoid the presence of readily hydrolyzable species or bonds; to use the disclosed water-dispersible polymer for emulsion polymerizing the multi-stage latex rather than using conventional low molecular weight emulsion polymerization surfactants; to limit or avoid the use of other low molecular weight adjuvants (for example, low molecular weight antioxidants, biocides, buffers, coalescents, dispersing aids for pigments or colorants, defoamers, pH modifiers, nonaqueous solvents and cosolvents, and other mobile ingredients that sometimes accompany various coating adjuvants); and to ensure that thorough curing takes place within the planned curing cycle.

Additionally, the cured coating preferably exhibits a metal exposure less than about 5 milliamps (mA), more preferably less than about 2 mA, and even more preferably less than about 1 mA, pursuant to the Initial Metal Exposure test below. Reduced metal exposure values may be obtained by forming a more flexible coating. For a conventional latex-based coating employing a single stage latex, typically there is a tradeoff between flexibility and resistance to flavor scalping. That is, acrylics that tend to have acceptable flexibility also tend to scalp flavorants to an unsuitably high degree, whereas acrylics that tend to resist scalping flavorants to an unsuitable degree also tend to have unsuitable flexibility. This tradeoff in coating properties is particularly pronounced for acrylics made without using styrene. Without intending to be bound by theory, it appears that the use in the present invention of a multi-stage latex rather than a single stage latex may reduce the extent of such tradeoffs, thereby permitting attainment of satisfactory flexibility together with adequate flavor scalping resistance, even for acrylics made without using styrene.

Flexibility is especially important for inside spray coatings, and for many other food or beverage can coatings, so that the coating can deflect with the metal substrate during post-cure fabrication steps (e.g., necking and dome reformation) and if the can is dropped from a reasonable height during transport or use. In some preferred embodiments, the cured coating preferably exhibits a metal exposure less than about 10 mA, more preferably less than about 3.5 mA, even more preferably less than about 2.5 mA, and optimally less than about 1.5 mA, pursuant to the Metal Exposure After Drop Damage test below.

The coating composition of the present disclosure also offers utility in other coating applications. These additional applications include, but are not limited to, wash coating, sheet coating, and side seam coatings (e.g., food can side seam coatings). Other commercial coating application and curing methods are also envisioned, for example, electrocoating, extrusion coating, laminating, powder coating, and the like. The coating composition may also be useful in medical or cosmetic packaging applications, including, for example, on surfaces of metered-dose inhalers ("MDIs"), including on drug-contact surfaces.

Polymers and coating compositions such as those described in the Examples below may be evaluated using a variety of tests including:

1. Viscosity Test

This test measures the viscosity of a latex emulsion or coating composition for rheological purposes, such as for sprayability and other coating application properties. The test was performed pursuant to ASTM D1200-88 using a Ford Viscosity Cup #2 at 25° C. The results are measured in the units of seconds.

2. Curing Conditions

For beverage inside spray bakes, the curing conditions involve maintaining the temperature measured at the can dome at 188° C. to 199° C. (measured at the can dome) for 55 seconds. For a food can inside spray bake, the curing conditions involve maintaining the temperature at the can dome in a range of 208° C. to 218° C. for 2 minutes. For beverage end coil bakes, the curing conditions involve the use of a temperature sufficient to provide a peak metal temperature within the specified time (e.g., 10 seconds at 204° C. means 10 seconds, in the oven, for example, and a peak metal temperature achieved of 204° C.).

3. Beverage Can Inside Spray Testing

To facilitate spray-application of the disclosed coating compositions to the interior of commercially available, preformed, aluminum D&I cans, the viscosity of each coating is reduced such that the flow rate of each coating through a Ford viscosity cup (#2 orifice) is in the range of 20-80 seconds. This viscosity measurement is conducted with a clean, filtered sample of the coating composition at a temperature of 25° C. The tested cans are conventional 355 mL (12 U.S. fluid ounce) no. "211" diameter cans. The coating compositions are spray-applied at 115 milligrams (dry weight) per can coating weight using a laboratory scale D&I spray unit commercially available from Reynolds DG-250. This laboratory unit is considered an effective replica of commercial D&I beverage can spray units. The applied coatings are cured at 188° C. to 199° C. (measured at the can dome) for 55 seconds using a laboratory-scale D&I can oven commercially available from Ross Co.

4. Food Can Inside Spray Testing

To facilitate spray-application of the disclosed coating compositions to the interior of commercially available, preformed, tinplate D&I cans, the viscosity of each coating is reduced such that the flow rate of each coating through a Ford viscosity cup (#2 orifice) is in the range of 20-80 seconds. This viscosity measurement is conducted with a clean, filtered sample of the coating composition at a temperature of 25° C. The test cans have a "300×407" commercial designation, corresponding to a 0.113 m height, 0.076 m diameter and 0.032 $m^2$ internal area. The tested cans include conventional sidewall beading which imparts improved crush resistance to the can. In addition, each can is flanged, which allows for effective seaming and closure of the can with an appropriate 300 diameter commercially available food can end. The coating compositions are spray-applied at 250 to 375 milligrams (dry weight) per can coating weight using a laboratory scale D&I spray unit commercially available from H. L. Fisher Co. This laboratory unit is considered an effective replica of commercial D&I food can spray units. The applied coatings are cured at 208° C. to 218° C. (measured at the can) for 2 minutes using a laboratory-scale D&I can oven commercially available from Ross Co.

5. Initial Metal Exposure

This test method, sometimes called an "Enamel Rater Test", evaluates the coverage and integrity of a dry coating on the inside of a can by measuring current flow through the can and an electrolyte. A can is filled with an electrolyte and an electrode is lowered into the solution. A constant voltage is applied and the resulting current is measured in milliamps. The voltage level, time of exposure and electrolyte solution can all be varied as needed, and may be different depending upon factors including the packaging facility or packaging end use. In a representative procedure, an interior "inside spray" coating is applied using a high pressure airless spray and minimum dry film weights of 1.6 grams per square meter (gsm) for a beer can; 2.3 gsm for a soda can; 3.4 gsm for a can intended for use in packaging a "hard-to-hold" beverage product such as a sports drink, energy drink, wine, mixer, or cocktail; and 5.4 gsm for an inside spray coated tinplate food can.

The coated cans are filled with a room temperature electrolyte solution containing 1 wt. % sodium chloride in deionized water, and an electrical probe is attached to an uncoated, electrically conducting portion on the outside of the can. A second probe is immersed inside the can in the middle of the electrolyte solution. A 6.3 VDC constant voltage is applied continuously for four seconds and the average current is measured in milliamps using a WACO Enamel Rater II supplied by The Wilkens-Anderson Company or similar tester. If any uncoated metal is present on the inside of the can, a current is passed between these two probes and is displayed by the tester. The observed current is directly proportional to the amount of metal that has not been effectively covered with coating. The goal is to achieve 100% coating coverage on the inside of the can, which would result in a 0 mA metal exposure value. Preferred coatings give metal exposure values of less than 3 mA, more preferred values of less than 2 mA, and even more preferred values of less than 1 mA. Commercially acceptable metal exposure values are typically less than 2 mA on average.

6. Metal Exposure after Drop Damage

Drop damage resistance measures the ability of the coated container to resist cracks after being in conditions simulating dropping of a filled can, and may be used for both beverage and food containers. The presence of cracks is measured by passing electrical current via an electrolyte solution, as previously described in the Initial Metal Exposure section. A coated container is filled with the electrolyte solution (1% NaCl in deionized water) and the initial metal exposure is recorded. The electrolyte solution is removed and the can is then filled with room-temperature tap water. For "inside spray" beverage or food cans, the film weights described in the Initial Metal Exposure test can be used.

The water-filled can, which does not include a "top" can end, is dropped through a cylindrical tube having a 2 and ⅞ inch (7.3 centimeter) internal diameter, can bottom down, onto an impact wedge (e.g., an inclined plane angled upwards at 33 degrees). The impact wedge is positioned relative to the tube such that a dent is formed in the rim area where the can bottom end meets the sidewall (typically referred to as the "chime" of a beverage can). The water-filled can is dropped through the tube from a 24-inch (61 centimeter) height (as measured between the can bottom and the point of impact on the impact wedge) onto an inclined plane, causing a dent in the chime area. The can is then turned 180 degrees, and the process is repeated.

Water is then removed from the can and metal exposure is again measured as described above. If there is no damage, no change in current (mA) will be observed relative to the Initial Metal Exposure value. Typically, an average of 6 or 12 container runs is recorded. The metal exposures results for before and after the drop are reported as absolute values. The lower the milliamp value, the better the resistance of the coating to drop damage. Preferred coatings give metal exposure values after drop damage of less than 10 mA, more preferred values of less than 3.5 mA, even more preferred values of less than 2.5 mA, and optimal values of less than 1.5 mA.

Drop damage is often reported as a "delta" or "Δ" mA value, which is the difference in the measured current passage ("metal exposure") after the Drop Damage test relative to the initial measured current passage prior to drop damage (measured using the Initial Metal Exposure test above). Little (e.g., <1 mA) to no change in the measured current passage is an indication that the coating possesses good flexibility for the end use. In the Example Section below, the drop damage Δ values reported in Tables 3 and 4 were conducted using standard 12 ounce (355 mL) 211-diameter aluminum beverage cans using an inside spray coating dry film weight of 4.0 gsm (which corresponds to 115 mg/can).

7. Necking Test

This test measures the flexibility and adhesion of the film following commercial necking process. Necking is done to facilitate the application of a container end that allows sealing the container, and is commonly performed on beverage cans. The test involves applying the coating to the container at a recommended film thickness and subjecting the container to a recommended bake (see above can, coating, and bake specifications for items 2-4). Prior to the necking process, sample cans typically will have a metal exposure value of <1.0 mA (average of 12 cans) when evaluated using an electrolyte solution as described above. After the necking process, cans should display no increase in metal exposure compared to the average for 12 non-necked cans. Elevated mA values indicate a fracture in the film which constitutes film failure.

8. Adhesion

Adhesion testing is performed to assess whether the coating adheres to the coated substrate. The adhesion test was performed according to ASTM D 3359—Test Method B, using SCOTCH 610 tape, available from 3M Company of Saint Paul, Minn. Adhesion is generally rated on a scale of 0-10 where a rating of "10" indicates no adhesion failure (best), a rating of "9" indicates 90% of the coating remains adhered, a rating of "8" indicates 80% of the coating remains adhered, and so on. Adhesion ratings of 10 are typically desired for commercially viable coatings.

9. Blush Resistance

Blush resistance measures the ability of a coating to resist attack by various solutions. Typically, blush is measured by the amount of solution (e.g., water) absorbed into a coated film. When the film absorbs water, it generally becomes cloudy or looks white. Blush is generally measured visually using a scale of 0-10 where a rating of "10" indicates no blush (best) and a rating of "0" indicates complete whitening of the film (worst). Blush ratings of 7 or higher are typically desired for commercially viable coatings, and optimally 9-10.

10. Corrosion Resistance

These tests measure the ability of a coating to resist attack by solutions of different levels of aggressiveness. Briefly, a given coating is subjected to a particular solution, as described below, and then measured for adhesion and blush resistance, each also described below. For each test, a result is given using a scale of 0-10, based on the Adhesion Resistance, Blush Resistance, or Blush Adhesion Resistance, where a rating of "10" is best and a rating of "0 is worst.

A. Deionized Water

Deionized water is heated to 82° C. Coated panels are immersed in the heated solution for 30 minutes and then removed, rinsed, and dried. Samples are then evaluated for adhesion and blush, as previously described.

B. Acetic Acid Solution

A 3% solution of acetic acid ($C_2H_4O_2$) in deionized water is prepared and heated to 100° C. Coated panels are immersed in the heated solution for 30 minutes and then removed, rinsed, and dried. Samples are then evaluated for adhesion and blush, as previously described.

C. Citric Acid Solution

A 2% solution of citric acid ($C_6H_8O_7$) in deionized water is prepared and heated while subjected to a pressure sufficient to achieve a solution temperature of 121° C. Coated panels are immersed in the heated solution for 30 minutes and then removed, rinsed, and dried. Samples are then evaluated for adhesion and blush, as previously described.

11. Pasteurization

The pasteurization test determines how a coating withstands the processing conditions for different types of food products packaged in a container. Typically, a coated substrate is immersed in a water bath and heated for 5-60 minutes at temperatures ranging from 65° C. to 100° C. For the present evaluation, the coated substrate was immersed in either a deionized water bath for 45 minutes at 85° C., or a 3% solution of acetic acid ($C_2H_4O_2$) in deionized water for 30 minutes at 100° C. The coated substrate is then removed from the bath and tested for coating adhesion and blush as described above. Commercially viable coatings preferably provide adequate pasteurization resistance with perfect adhesion (rating of 10) and blush ratings of 5 or more, optimally 9-10.

12. Glass Transition Temperature ("Tg")

Samples for DSC testing may be prepared by first applying the liquid resin composition onto aluminum sheet panels. The panels are then baked in a Fisher ISOTEMP electric oven for 20 minutes at 300° F. (149° C.) to remove volatile materials. After cooling to room temperature, the samples are scraped from the panels, weighed into standard sample pans and analyzed via DSC using a standard heat-cool-heat method. The samples are equilibrated at −60° C., then heated at 20° C. per minute to 200° C., cooled to −60° C., and then heated again at 20° C. per minute to 200° C. Glass transitions are calculated from the thermogram of the last heat cycle. The glass transition is measured at the inflection point of the transition.

13. Flavor Scalping

Flavor scalping may be assessed as described in Published International Application. No. WO 2018/013766 A1 entitled "Latex Coating Composition Having Reduced Flavor Scalping Properties." The amounts of each aldehyde lost from a test solution during storage are measured and calculated as a percent of the original concentration. Flavor Scalping is reported as the % aldehyde lost relative to a current industry standard coating formulation, with high reported percentage values being preferred over low percentage values.

14. Global Extraction

The global extraction test is designed to estimate the total amount of mobile material that can potentially migrate out of a coating and into food packed in a coated can. Typically, a coated substrate is subjected to water or solvent blends under a variety of conditions to simulate a given end use. Acceptable extraction conditions and media can be found in 21 CFR § 175.300 paragraphs (d) and (e). The allowable global extraction limit as defined by the FDA regulation is 50 parts per million (ppm). The extraction procedure used in the current invention is described in 21 CFR § 175.300 paragraph (e)(4)(xv) with the following modifications to ensure worst-case scenario performance: (1) the alcohol (ethanol) content was increased to 10% by weight, and (2) the filled containers were held for a 10-day equilibrium period at 37.8° C. (100° F.). These conditions are per the FDA publication "Guidelines for Industry" for preparation of Food Contact Notifications.

The coated beverage can is filled with 10% by weight aqueous ethanol and subjected to pasteurization conditions (65.6° C., 150° F.) for 2 hours, followed by a 10-day equilibrium period at 37.8° C. (100° F.). Determination of the amount of extractives is determined as described in 21 CFR § 175.300 paragraph (e) (5), and ppm values were calculated based on surface area of the can (no end) of 44 square inches with a volume of 355 milliliters. Preferred coatings give global extraction results of less than 50 ppm, more preferred results of less than 10 ppm, and even more preferred results of less than 1 ppm. Most preferably, the global extraction results are optimally non-detectable.

For materials that have not previously been used as packaging coatings on food or beverage containers (e.g., for architectural or industrial coating materials), it can be difficult to use the above procedures to measure global extraction, as the coating material might not previously been applied at the low coating weights and low viscosities typically required for food and beverage packaging coatings. Also, the coating material might not have previously been thermally cured using the oven curing procedures typically employed for food and beverage coatings. In such cases the material may instead be evaluated by applying the material to a beverage can as described above, but using a coating weight and viscosity as disclosed or recommended for its existing use (e.g., its architectural or industrial use), followed by drying or otherwise hardening the coating as disclosed or recommended for its existing use and then within an hour after the material reaches a tack-free state subjecting the dried coating to the above-mentioned 21 CFR § 175.300 paragraph (e)(4)(xv) extraction procedure with the above-described worst-case scenario modifications. For example, for a latex wall paint containing a multi-stage latex, global extraction may need to be determined by applying the paint using the paint manufacturer's recommended spray painting procedure and viscosity, air-drying the applied coating and then performing the extraction procedure within an hour after the coating reaches a tack-free state. Wall paints and other industrial coatings that are so applied, dried and evaluated may exceed the recited 50 ppm global extraction limit due to factors such as incomplete cure and the presence of extractable species such as cosolvents, low molecular weight surfactants, coalescents and other coating material adjuvants.

EXAMPLES

The present disclosure is more particularly described in the following examples that are intended as illustrations only, since numerous modifications and variations within the scope of the present disclosure will be apparent to those skilled in the art. Unless otherwise indicated, all parts and percentages are by weight. Unless indicated otherwise, the test methods described above were used to generate the data included in the below Tables.

Example 1

Preformed Acrylic A

A monomer premix of 197.35 parts glacial methacrylic acid (MAA), 59.28 n-butyl methacrylate (BMA), 88.88 parts ethyl methacrylate (EMA), 44.45 parts ethyl acrylate (EA), 113.36 parts butanol and 12.63 parts deionized ("DI") water was prepared in a separate vessel. An initiator premix of 18.54 parts LUPEROX 26 initiator and 41.63 parts n-butanol ("butanol") was prepared in a separate vessel. A reactor was equipped with an agitator, reflux condenser, and thermocouple, capable of being heated and cooled and blanketed or sparged with inert gas or nitrogen. To the reactor, 141.39 parts butanol and 6.94 parts deionized water were added. With agitation on and the vessel being blanketed with inert gas, the contents were heated to 97° C. Once at temperature, 1.03 parts LUPEROX 26 initiator were added and the batch held for 5 minutes. After 5 minutes, the monomer premix and the remaining initiator premix were added to the vessel over a two hour period while maintaining the reactants at 97° C. to 100° C. When the addition was complete, 18.06 parts butanol was used to rinse the monomer premix vessel to the reactor and 6.03 parts butanol was used to rinse the initiator premix vessel to the reactor. The batch was held at 98° C. to 99° C. for 30 minutes after which 1.85 parts LUPEROX 26 initiator were added and rinsed with 1.86 parts butanol. The batch was held at 98° C. for 60 minutes after which a second addition of 1.85 parts LUPEROX 26 were added and rinsed with 1.86 parts butanol. The batch was held at 98° C. to 100° C. for two hours. After the two hour hold, 235.78 parts butyl cellosolve and 7.26 parts deionized water were added and the reactor contents cooled before removing from the reactor. The resulting acrylic pre-polymer gives a polymer with a monomer ratio (weight parts) of methacrylic acid/butyl methacrylate/ethyl methacrylate/ethyl acrylate at 50.6/15.2/22.8/11.4 and a Fox equation calculated Tg of 90° C. The butanol to Butyl Cellosolve ratio was ~58/42 by weight. The solids content was ~40.3% with an acid number of ~312 mg KOH/g resin and a viscosity of 7700 centipoise.

Example 2

Preformed Acrylic B

Using the process described above for Example 1, a second preformed acrylic was prepared using a monomer weight ratio of methacrylic acid/butyl methacrylate/methyl methacrylate (MMA)/ethyl acrylate at 60/15/10/15 and a Fox equation calculated Tg of 100° C. The butanol to Butyl Cellosolve ratio was adjusted to ~76/24 by weight. The solids content was ~38.6% with an acid number of ~384 mg KOH/g resin and a viscosity of 28,000 centipoise.

Example 3

Water-Based Polyether-Acrylate Copolymer Base Dispersion

To a reactor equipped with an agitator, reflux condenser, and thermocouple, capable of being heated and cooled and blanketed or sparged with inert gas or nitrogen and vacuum, the following were added: 1204.12 parts of the digylcidyl ether of tetramethyl bisphenol F, 295.1 parts hydroquinone, 0.71 parts ethyltriphenyl phosphonium iodide, 35.23 parts carbitol, and 131.36 parts butyl cellosolve. (Suitable preparations of the diglycidyl ether of tetramethyl bisphenol F are described, for example, in WO 2017079437 A1.) With agitation on and the vessel being blanketed with inert gas, the contents were heated to 155° C. The system was allowed to exotherm to 181° C. when vacuum was applied to create a reflux to control the peak temperature to a maximum of ~194° C. Once the peak temperature was achieved a 30 minute hold began and the temperature was allowed to drift down and the pressure was returned to atmospheric pressure. After the 30 minute hold, 0.08 parts ethyltriphenyl phosphonium iodide were added. After one hour from the peak temperature samples were taken every 30 minutes until an epoxy value of 0.039 equivalents per 100 gram solid resin was achieved. At the desired epoxy value, 144.15 parts butyl cellosolve and 64.15 parts hexyl cellosolve were added and the temperature allowed to drift down. Then 1617.58 parts of the Preformed Acrylic A of Example 1 were added. Once in, the material was rinsed in with 92.98 parts butyl cellosolve. The contents were mixed for 30 minutes while the temperature was adjusted to 99° C. After 30 minutes, 194.43 parts deionized water were added and the temperature adjusted to 93° C. At temperature, 142.87 parts of dimethyl ethanol amine ("DMEOA") were added over 5 minutes. The batch was then held at 96° C. to 101° C. for one hour. At the end of the hour, any external heat was turned off, the agitation increased and 1982.62 parts of deionized water were added uniformly over 50 minutes. After the water was in, another 2768.62 parts of deionized water were added over 30 minutes. Once all the water was in, the batch was held 30 minutes to assure uniformity. This produced a water based dispersion of the polyether-acrylate copolymer having 23.9% solids, 88.7 mg KOH/g resin acid number, 6.52 pH, 0.17 micron particle size and 35 second #4 Ford viscosity.

Example 4

Alternate Water-Based Polyether-Acrylate Copolymer Base Dispersion

To a reactor equipped with an agitator, reflux condenser, and thermocouple, capable of being heated and cooled and blanketed or sparged with inert gas or nitrogen and vacuum begin able to be applied, the following were added: 1202.92 parts of the digylcidyl ether of tetramethyl bisphenol F, 289.64 parts hydroquinone, 0.71 parts ethyltriphenyl phosphonium iodide, and 165.84 parts butyl cellosolve. With agitation on and the vessel being blanketed with inert gas, the contents were heated to 145° C. The system was allowed to exotherm to 184° C. Once the peak temperature was achieved a 30 minute hold began and the temperature was allowed to drift down. After the 30 minute hold, 0.08 parts ethyltriphenyl phosphonium iodide were added. After one hour from the peak temperature samples were taken every 30 minutes until an epoxy value of 0.039 equivalents per 100 gram solid resin was achieved. At the desired epoxy value, 236.04 parts butyl cellosolve and 63.9 parts hexyl cellosolve were added and the temperature allowed to drift down. Then 1964.03 parts of the preformed Acrylic B of Example 2 were added. The contents were mixed for 15 minutes, then 121.25 parts deionized water were added. The batch was mixed for 5 additional minutes, then 174.25 parts of dimethyl ethanol amine were added over 5 minutes. The batch was then held at 98° C. to 101° C. for 90 minutes. At the end of the 90 minute hold, any external heat was turned off, the agitation increased and 1973.91 parts of deionized water were added uniformly over 50 minutes. After the water was in, another 3807.40 parts of deionized water were added over about 40 minutes. Once all the water was in, the batch was held 30 minutes to assure uniformity. This produced a water based dispersion having 23.1% solids, 113.6 mg KOH g/resin acid number, 6.52 pH, and ~9100 centipoise viscosity.

Comparative Example 5

Water-Based Polyether-Acrylate Copolymer Dispersion with a Single-Stage Emulsion Polymerization Extension The contents of the reactor in Example 3 were heated to 85° C. At temperature, 373.9 parts butyl methacrylate, 467.79 parts ethyl methacrylate, and 93.34 parts butyl acrylate were added over ~60 minutes. The monomers used were butyl methacrylate/ethyl methacrylate/butyl acrylate at a weight ratio of 40/50/10 with a Fox equation calculated Tg of 30° C. When the monomer addition was complete, the residual monomer mixture was rinsed into the reactor using 345.56 parts deionized water. With the contents of the reactor at 82° C., 7.33 parts benzoin and 7.33 parts 34% hydrogen peroxide were added and rinsed into the reactor with 7.59 parts deionized water. The batch was held for two hours and allowed to increase in temperature to 88° C. After the two hours, 2.0 parts benzoin and 2.0 parts 34% hydrogen peroxide were added and rinsed into the reactor with 7.59 parts deionized water. The batch was held one hour after which 2.0 parts benzoin and 2.0 parts 34% hydrogen peroxide were added and rinsed into the reactor with 7.59 parts deionized water. The batch was held at temperature for one hour and then cooled. This produced a water-based dispersion at 30.8% Solids, 63.0 acid number, 6.42 pH, 0.21 micron average particle size and 73 seconds #4 Ford viscosity.

Example 6

Water-Based Polyether-Acrylate Copolymer Dispersion with a Multi-Stage Emulsion Polymerization Extension for Reduced Polyether Content To a reactor equipped with an agitator, reflux condenser, and thermocouple, capable of being heated and cooled and blanketed or sparged with inert gas or nitrogen, 714.34 parts of Example 5 and 189.04 parts deionized water were added. With agitation on and the vessel blanketed with inert gas, the material was heated to 75° C. to 82° C. At temperature, 8.78 parts butyl methacrylate, 74.43 parts ethyl methacrylate, and 4.35 parts butyl acrylate were added. This was a monomer blend of butyl methacrylate/ethyl methacrylate/butyl acrylate at a weight ratio of 10/85/5 with a Fox equation calculated Tg of 51° C. When the monomer addition was complete, the residual monomer mixture was rinsed into the reactor using 4.52 parts deionized water. With the contents of the reactor at 82° C., 0.73 parts benzoin and 0.73 parts 34% hydrogen peroxide were added and rinsed into the reactor with 0.76 parts deionized water. The batch was held for two hours and allowed to increase in temperature to 85° C. After the two hours, 0.20 parts benzoin and 0.20 parts 34% hydrogen peroxide were added and rinsed into the reactor with parts 0.76 deionized water. The batch was held one hour after which 0.20 parts benzoin and 0.20 parts 34% hydrogen peroxide were added and rinsed into the reactor with 0.76 parts deionized water. The batch was held at temperature for one hour and then cooled. This produced a water-based dispersion having 30.7% Solids, 43.2 acid number, 6.48 pH, a 0.22 micron average particle size and a 21 seconds #4 Ford Viscosity.

Examples 7-9

Additional Multi-Stage Latex Containing Resin Systems

Three additional resin system examples (viz., Examples 7-9) were prepared using the method described in Example 6. Similar to Example 6, the resin systems of Examples 7-9 were prepared by emulsion polymerizing a higher Tg stage ("Stage 2") in the presence of the single stage latex of Comparative Example 5 to yield a resin system including a multi-stage latex. Table 1 below compares these systems and Example 6 relative to Comparative Example 5, which includes only a single emulsion polymerized stage and a higher polyether level. Unless indicated otherwise, the amounts in Table 1 are all weight parts. The weight contribution of the polyether polymer portions and acrylic polymer portions present in the water-based polyether-acrylate copolymer dispersions used to make the particular latexes are indicated separately as "Overall % Polyether" and "% Preformed Acrylic." The weight contribution of each of the first emulsion polymerized stage and the second emulsion polymerized stage are referred to, respectively, as "% Stage 1" and "% Stage 2". The overall percentage of polymerized ethylenically unsaturated monomers (viz., the contribution from the preformed acrylic and the single stage or multi-stage latex is reported as the "Overall % Acrylic". In Examples 6-9, Stage 1 corresponds to the lower Tg emulsion polymerized stage, Stage 2 corresponds to the higher Tg emulsion polymerized stage, and the lower Tg stage was emulsion polymerized before the higher Tg stage.

TABLE 1

|  | Comparative Example 5 | Example 6 | Example 7 | Example 8 | Example 9 |
| --- | --- | --- | --- | --- | --- |
| Overall % Polyether | 49 | 35 | 35 | 35 | 35 |
| % Preformed Acrylic | 21 | 15 | 15 | 15 | 15 |
| % Stage 1 | 30 | 21.4 | 21.4 | 21.4 | 21.4 |
| % Stage 2 | 0 | 28.6 | 28.6 | 28.6 | 28.6 |

TABLE 1-continued

|  | Comparative Example 5 | Example 6 | Example 7 | Example 8 | Example 9 |
|---|---|---|---|---|---|
| Wt. Ratio Stage 1:Stage 2 | 100:0 | 43:57 | 43:57 | 43:57 | 43:57 |
| Stage 1 Monomer Wt. Ratios | EMA 50 BMA 40 BA 10 | EMA 50 BMA 40 BA 10 | EMA 50 BMA 40 BA 10 | EMA 50 BMA 40 BA 10 | EMA 50 BMA 40 BA 10 |
| Stage 1 Tg | 30° C. | 30° C. | 30° C. | 30° C. | 30° C. |
| Stage 2 Monomer Wt. Ratios | NA | EMA 85 BMA 10 BA 5 MMA 0 | EMA 25 BMA 35 BA 5 MMA 35 | EMA 10 BMA 30 BA 5 MMA 55 | EMA 0 BMA 20 BA 5 MMA 75 |
| Stage 2 Tg | NA | 51° C. | 51° C. | 60° C. | 72° C. |
| Delta Tg | NA | 21° C. | 21° C. | 30° C. | 42° C. |
| Overall % Acrylic | 51 | 65 | 65 | 65 | 65 |
| % Solids | 30.8% | 30.7% | 30.5% | 30.6% | 30.4% |
| Acid Number (mg KOH/g resin) | 63 | 43.2 | 43.8 | 43.3 | 44.7 |
| pH | 6.4 | 6.5 | 6.5 | 6.5 | 6.5 |
| Average Particle Size (micrometers) | 0.21 | 0.22 | 0.22 | 0.23 | 0.23 |
| Viscosity (#4 Ford) | 73" | 21" | 20" | 19" | 19" |

Resin System Examples 10-19

Additional Multi-Stage Latex-Containing Resin Systems

The following process was used to produce the resin systems of each of Examples 10 to 19. The indicated amounts were those used to produce Example 13. The amounts of each of the ingredients used in the remaining Examples 10-12 and 14-19 are shown below in Table 2 along with the Example 13 amounts. As shown in Table 2, adjustments were made to the various examples to provide different monomer ratios, different polymer Tg's and different ratios of Stage 2 to Stage 1.

To a reactor equipped with an agitator, reflux condenser, and thermocouple, capable of being heated and cooled and blanketed or sparged with inert gas or nitrogen, 399.5 parts of the Example 4 copolymer and 114.0 parts deionized water were added. With agitation on and the vessel blanketed with inert gas, the mixture was heated to 81° C. At temperature, 16.25 parts butyl methacrylate, 16.25 parts butyl acrylate, and 9.0 parts methyl methacrylate were added. This is a monomer blend of butyl methacrylate/butyl acrylate/methyl methacrylate at a ratio of 39/39/22 with a Fox equation calculated Tg of −2° C. When the monomer addition was complete, the residual monomer mixture was rinsed into the reactor using 31.25 parts deionized water. With the contents of the reactor at 82° C., 0.75 parts benzoin were rinsed into the reactor with 35.0 parts deionized water. The batch was heated to 82° C. and 0.75 parts 34% hydrogen peroxide were added. The batch was held for one hour and allowed to increase in temperature to 88° C. After the one hour hold, the conversion of monomer to polymer was determined to be 93%. After another hour hold, a sample was taken and 75 parts deionized water were added to the reactor. The sample was determined to have 95% of the monomer converted to polymer. The batch was heated to 82° C. and a monomer blend of 11.87 parts butyl methacrylate, 5.87 parts butyl acrylate, and 100.75 parts methyl methacrylate was added. This blend has butyl methacrylate/butyl acrylate/methyl methacrylate at a ratio of 10/5/85 with a Fox equation calculated Tg of 82° C. When the monomer addition was complete, the residual monomer mixture was rinsed into the reactor using 81.25 parts deionized water. Then 0.87 parts benzoin and 0.87 parts 34% hydrogen peroxide were added and rinsed into the reactor with parts 37.0 deionized water. The batch was held one hour after which 0.12 parts benzoin and 0.12 parts 34% hydrogen peroxide were added and rinsed into the reactor with 7.37 parts deionized water. The batch was held at temperature for 90 minutes. Then 0.12 parts benzoin and 0.12 parts 34% hydrogen peroxide were added and rinsed into the reactor with 7.37 parts deionized water. The batch was held for 2 hours and then cooled. This gave material at 30.0% solids, 35.8 mg KOH/g resin acid number and 0.34 micron average particle size.

Table 2 below compares the compositional makeup of the resin systems of Examples 10-19. Unless indicated otherwise, the amounts in Table 2 are all weight parts. In Table 2, the weight contribution of the polyether polymer portions and acrylic polymer portions are shown using the same nomenclature employed in Table 1. In Examples 10-19, Stage 1 corresponds to the lower Tg emulsion polymerized stage, Stage 2 corresponds to the higher Tg emulsion polymerized stage, and the lower Tg stage was emulsion polymerized before the higher Tg stage.

TABLE 2

|  | Ex. 10 | Ex. 11 | Ex. 12 | Ex. 13 | Ex. 14 |
|---|---|---|---|---|---|
| % Polyether | 20 | 20 | 20 | 20 | 20 |
| % Preformed Acrylic | 10.6 | 10.6 | 10.6 | 10.6 | 10.6 |
| % Stage 1 | 30 | 21.4 | 21.4 | 30 | 21.4 |
| % Stage 2 | 39.4 | 48 | 48 | 39.4 | 48 |
| Overall % Acrylic | 80 | 80 | 80 | 80 | 80 |
| Wt. Ratio Stage 1:Stage 2 | 43:57 | 31:69 | 31:69 | 43:57 | 31:69 |

TABLE 2-continued

| | | | | | |
|---|---|---|---|---|---|
| Stage 1 Monomer Wt. Ratios | BMA 42 MMA 40 BA 18 | BMA 72 MMA 10 BA 18 | BMA 42 MMA 40 BA 18 | BMA 72 MMA 10 BA 18 | BMA 72 MMA 10 BA 18 |
| Stage 1 Tg | 29° C. | 9° C. | 29° C. | 9° C. | 9° C. |
| Stage 2 Monomer Wt. Ratios | BMA 32 MMA 63 BA 5 | BMA 32 MMA 63 BA 5 | BMA 10 MMA 85 BA 5 | BMA 10 MMA 85 BA 5 | BMA 10 MMA 85 BA 5 |
| Stage 2 Tg | 62° C. | 62° C. | 82° C. | 82° C. | 82° C. |
| Delta Tg | 33° C. | 53° C. | 53° C. | 73° C. | 73° C. |
| % Solids | 39.9% | 30.0% | 30.2% | 30.0% | 29.9% |
| Acid Number (mg KOH/g resin) | 35.8 | 35.2 | 35.0 | 35.8 | 35.6 |
| Average Particle Size (micrometers) | 0.32 | 0.34 | 0.35 | 0.34 | 0.35 |

| | Ex. 15 | Ex. 16 | Ex. 17 | Ex. 18 | Ex. 19 |
|---|---|---|---|---|---|
| % Polyether | 20 | 20 | 20 | 20 | 20 |
| % Preformed Acrylic | 10.6 | 10.6 | 10.6 | 10.6 | 10.6 |
| % Stage 1 | 25 | 30 | 21.4 | 30 | 25 |
| % Stage 2 | 44.4 | 39.4 | 48 | 39.4 | 44.4 |
| Overall % Acrylic | 80 | 80 | 80 | 80 | 80 |
| Wt. Ratio Stage 1:Stage 2 | 36:64 | 43:57 | 31:69 | 43:57 | 36:64 |
| Stage 1 Monomer Wt. Ratios | BMA 57 MMA 25 BA 18 | BMA 42 MMA 40 BA 18 | BMA 42 MMA 40 BA 18 | BMA 72 MMA 10 BA 18 | BMA 57 MMA 25 BA 18 |
| Stage 1 Tg | 19° C. | 29° C. | 29° C. | 9° C. | 19° C. |
| Stage 2 Monomer Wt. Ratios | BMA 20 MMA 75 BA 5 | BMA 10 MMA 85 BA 5 | BMA 32 MMA 63 BA 5 | BMA 32 MMA 63 BA 5 | BMA 20 MMA 75 BA 5 |
| Stage 2 Tg | 72° C. | 82° C. | 62° C. | 62° C. | 72° C. |
| Delta Tg | 53° C. | 53° C. | 33° C. | 53° C. | 53° C. |
| % Solids | 29.7% | 29.7% | 29.9% | 29.9% | 29.9% |
| Acid Number (mg KOH/g resin) | 35.0 | 35.5 | 35.0 | 35.0 | 35.2 |
| Average Particle Size (micrometers) | 0.31 | 0.32 | | | |

Finish Examples 6-9

Inside Spray Coating Compositions

Inside spray beverage can coating compositions were formulated using the resin systems of each of Comparative Example 5 and Examples 6-9. The resulting inside spray coating compositions are indicated below in Table 3 as "Finish" Examples 6-9 and certain coating performance characteristics are reported in comparison to an inside spray coating composition made using Comparative Example 5. The particular Finish Example numbers correspond to the indicated resin system incorporated into the inside spray coating composition.

TABLE 3

| | Comparative Finish Example 5 | Finish Example 6 | Finish Example 7 | Finish Example 8 | Finish Example 9 |
|---|---|---|---|---|---|
| Comparative Example 5 | 63.7 | 63.8 | 64.2 | 64.1 | 64.5 |
| Example 6 | 0 | 63.8 | 0 | 0 | 0 |
| Example 7 | 0 | 0 | 64.2 | 0 | 0 |
| Example 8 | 0 | 0 | 0 | 64.1 | 0 |
| Example 9 | 0 | 0 | 0 | 0 | 64.5 |
| DI Water | 30.1 | 27.4 | 27.0 | 27.2 | 26.8 |
| Butyl Cellosolve | 2.7 | 4.1 | 4.1 | 4.1 | 4.1 |
| Amy Alcohol | 3.4 | 3.4 | 3.4 | 3.4 | 3.4 |
| Butyl Alcohol | 0 | 1.1 | 1.1 | 1.1 | 1.1 |
| DMEOA | As Needed | As Needed | As Needed | As Needed | As Needed |
| Formulated % Non-Volatiles | 20.5 | 20.5 | 20.5 | 20.5 | 20.5 |
| Viscosity | 36" | 43" | 41" | 41" | 39" |
| Drop Damage Δ (mA) | 0.2 | 0.4 | 0.5 | 0.1 | 0.1 |

TABLE 3-continued

|  | Comparative Finish Example 5 | Finish Example 6 | Finish Example 7 | Finish Example 8 | Finish Example 9 |
|---|---|---|---|---|---|
| Measured Tgs (° C.) | 44/106 | 45/102 | 61/103 | 40/70/102 | 39/79/103 |
| Scalping, % | 96 | 77 | 87 | 89 | 92 |
| Citric Blush SW | 10 | 6 | 6 | 6 | 6 |

For Comparative Finish Example 5, two Tg values were observed, with the 44° C. value being attributable to the single stage latex, and the 106° C. value being attributable to the polyether-acrylate copolymer dispersion.

As in Table 3, inside spray beverage can coating compositions were also formulated using the resin systems of each of Examples 10-19. The resulting inside spray coating compositions are indicated below in Table 4 as "Finish" Examples 10-19 and certain coating performance characteristics are reported. The particular Finish Example numbers correspond to the indicated resin system incorporated into the inside spray coating composition.

TABLE 4

| | Finish Example | | | | | | | | | |
|---|---|---|---|---|---|---|---|---|---|---|
| | 10 | 11 | 12 | 13 | 14 | 15 | 16 | 17 | 18 | 19 |
| Polymer | 65.6 | 65.4 | 64.9 | 65.4 | 65.6 | 66.0 | 66.0 | 65.6 | 65.6 | 65.6 |
| % Polyether | 20 | 20 | 20 | 20 | 20 | 20 | 20 | 20 | 20 | 20 |
| % Acrylic | 80 | 80 | 80 | 80 | 80 | 80 | 80 | 80 | 80 | 80 |
| DI Water | 23.6 | 23.8 | 24.2 | 23.6 | 23.6 | 23.2 | 23.2 | 23.6 | 23.6 | 23.6 |
| Butyl Cellosolve | 5.4 | 5.4 | 5.4 | 5.4 | 5.4 | 5.4 | 5.4 | 5.4 | 5.4 | 5.4 |
| Amy Alcohol | 3.4 | 3.4 | 3.4 | 3.4 | 3.4 | 3.4 | 3.4 | 3.4 | 3.4 | 3.4 |
| Butyl Alcohol | 1.8 | 1.8 | 1.8 | 1.8 | 1.8 | 1.8 | 1.8 | 1.8 | 1.8 | 1.8 |
| DMEOA | As needed | As needed | As needed | As needed | As needed | As needed | As needed | As needed | As needed | As needed |
| Formulated % NV | 18.5 | 19.0 | 18.5 | 18.5 | 18.5 | 18.0 | 18.5 | 18.5 | 18.0 | 19.5 |
| Viscosity (sec) | 62" | 55" | 52" | 37" | 38" | 39" | 41" | 41" | 41" | 57" |
| Drop Damage Δ (mA) | 1.5 | 0.1 | 68.8 | 0.2 | 25 | 34.6 | 62.1 | 24.9 | 0.4 | 11.8 |
| Measured Tgs (° C.) | 44/77/101 | 18/82/102 | 45/102 | 13/102 | 17/101 | 34/94/103 | 41/103 | 46/77/104 | 17/82/104 | 30/93/107 |
| Scalping % | 68 | 80 | 97 | 93 | 99 | 91 | 88 | 80 | 74 | 90 |
| Citric SW Blush | 7 | 6 | 8 | 6 | 8 | 8 | 9 | 9 | 8 | 8 |

As indicated by the coating performance data included in Tables 3 and 4, the use of a multi-stage latex enabled a substantial reduction in the polyether polymer level, with a corresponding increase in the acrylic level together with preservation of certain important end use performance attributes. Those attributes included flexibility as indicated by the low change in metal exposure values after drop damage, and comparable resistance to flavor scalping relative to the control (viz., Comparative Finish Example 5, and compare e.g., Finish Example 13). Notably, flexibility comparable to the control was achieved in several of the Finish Examples even though the control resin system contained 49 wt. % percent polyether and 51 wt. % acrylic, whereas the Finish Example resins systems contained 20 to 35 wt. % polyether and 65 to 80 wt. % acrylic. Surprisingly, good flexibility was achieved even in many Finish Examples whose resin system contained as much as 80 wt. % acrylic. This result was significant because as discussed above, typically there is a tradeoff in conventional acrylic systems between flexibility and resistance to flavor scalping, especially for acrylics made without using styrene.

Additional multi-stage latex systems were also produced that were similar to those of Examples 10-19, but included small amounts of multi-ethylenically unsaturated monomers (e.g., 1,4-butanediol dimethacrylate) in one or both of the higher Tg and lower Tg stages. It was observed (data not shown) that the inclusion of such multi-ethylenically monomers could improve both the corrosion resistance and blush resistance of inside spray beverage can coatings formulated from the resins systems, while not negatively impacting either the advantageous drop damage resistance or flavor scalping resistance properties of the coating. Such beneficial properties were observed, for example, for resin systems that included about 2.5 to about 5 weight percent of multi-ethylenically unsaturated monomers (e.g., 1,4-butanediol dimethacrylate), based on the weight of multi-ethylenically unsaturated monomer relative to the total weight of monomers used to generate all of the emulsion polymerized stages (e.g., the aggregate weight of the monomers used to form the lower and high Tg stages).

Example 20

Gradient Tg Latex Made with Low Molecular Weight Surfactant

To a reactor equipped with an agitator, reflux condenser, and thermocouple, capable of being heated and cooled and blanketed or sparged with inert gas or nitrogen, 318.6 parts deionized water and 9.6 parts RHODAPON UB (29-30% active sodium lauryl sulfate, CAS No. 68585-47-7, commercially available from Solvay) are added. With agitation on and the vessel blanketed with inert gas, the mixture is heated to 80° C. In a separate vessel, a mixture of 52.8 parts deionized water, 4.2 parts RHODAPON UB, 119.4 parts butyl methacrylate, 29.9 parts butyl acrylate, 14.9 parts methyl methacrylate and 1.7 parts methacrylic acid is prepared. The monomers used are butyl methacrylate/butyl acrylate/methyl methacrylate/methacrylic acid at a weight ratio of 72/18/9/1 with a Fox equation calculated Tg of 9.6° C. This mixture represents polymerizable monomer pre-emulsion 1 (ME-1). In a second vessel, a mixture of 71.3 parts deionized water, 5.4 parts RHODAPON UB, 21.7 parts butyl methacrylate, 10.9 parts butyl acrylate, 171.6 parts methyl methacrylate, 19.7 parts 2-hydroxyethyl methacrylate (HEMA) and 2.2 parts methacrylic acid is prepared. The monomers used are butyl methacrylate/butyl acrylate/methyl methacrylate/HEMA/methacrylic acid at a weight ratio of 10/5/75.2/8.8/1 with a Fox equation calculated Tg of 78.0° C. This mixture represents polymerizable monomer pre-emulsion 2 (ME-2), and its HEMA content facilitates film crosslinking using a suitable crosslinker (e.g., phenolic or melamine resins). When the reactor temperature reaches 80° C., 1.9 parts ammonium persulfate dissolved in 50 parts deionized water are added. After a 5 minute hold, ME-1 is fed directly into the reactor over 240 minutes. Concurrently, ME-2 is fed into the ME-1 vessel over 225 minutes. After 240 minutes, 40 parts deionized water is used to rinse the remaining contents of the ME-1 and ME-2 vessels into the reactor. The batch is held for 30 additional minutes while cooling to about 70° C. Once the batch temperature reaches about 70° C., a solution of 0.95 parts tert-butyl hydroperoxide in 25 parts deionized water is added followed immediately by addition of a solution of 0.43 parts erythorbic acid dissolved in 25 parts deionized water. The batch is held at temperature for 30 minutes and then cooled. Once the batch cools to ≤40° C., sufficient dimethylamino ethanol is added to raise the pH to about 8.0. The latex is filtered through a 100 micron filter bag. The resultant gradient Tg latex should contain about 40% solids and have a pH of about 8.

Example 21

Gradient Tg Latex Made with Low Molecular Weight Surfactant

To a reactor equipped with an agitator, reflux condenser, and thermocouple, capable of being heated and cooled and blanketed or sparged with inert gas or nitrogen, 318.0 parts deionized water and 10.0 parts RHODAPON UB are added. With agitation on and the vessel blanketed with inert gas, the mixture is heated to 80° C. In a separate vessel, a mixture of 55.2 parts deionized water, 4.3 parts RHODAPON UB, 125.0 parts butyl methacrylate, 31.3 parts butyl acrylate, 11.9 parts methyl methacrylate, 3.9 parts HEMA and 1.7 parts methacrylic acid is prepared. The monomers used are butyl methacrylate/butyl acrylate/methyl methacrylate/HEMA/methacrylic acid at a weight ratio of 72/18/6.8/2.2/1 with a Fox equation calculated Tg of 8.9° C. This mixture represents polymerizable monomer pre-emulsion 1 (ME-1). In a second vessel, a mixture of 72.2 parts deionized water, 5.7 parts RHODAPON UB, 22.4 parts butyl methacrylate, 11.4 parts butyl acrylate, 185.6 parts methyl methacrylate, 6.6 parts HEMA and 2.3 parts methacrylic acid is prepared. The monomers used are butyl methacrylate/butyl acrylate/methyl methacrylate/HEMA/methacrylic acid at a weight ratio of 10/5/81.2/2.8/1 with a Fox equation calculated Tg of 81.0° C. This mixture represents polymerizable monomer pre-emulsion 2 (ME-2). When the reactor temperature reaches 80° C., 2.0 parts ammonium persulfate dissolved in 50 parts deionized water are added. After a 5 minute hold, ME-1 is fed directly into the reactor over 240 minutes. Concurrently, ME-2 is fed into ME-1 vessel over 225 minutes. After 240 minutes, 40 parts deionized water is used to rinse the remaining content of the ME-1 and ME-2 vessels into the reactor. The batch is held for 30 additional minutes while cooling to about 70° C. Once the batch temperature reaches about 70° C., a solution of 0.97 parts tert-butyl hydroperoxide in 25 parts deionized water is added followed immediately by addition of a solution of 0.44 parts erythorbic acid dissolved in 25 parts deionized water. The batch is held at temperature for 30 minutes and then cooled. Once the batch cools to ≤40° C., sufficient dimethylethanol amine is added to raise its pH to about 8.0. The latex is filtered through a 100 micron filter bag. The resultant gradient Tg latex should contain about 40% solids and have a pH of about 8.

Example 22

Gradient Tg Latex Made with Water-Dispersible Polymeric Surfactant

To a reactor equipped with an agitator, reflux condenser, and thermocouple, capable of being heated and cooled and blanketed or sparged with inert gas or nitrogen, 399.5 parts of the Example 4 copolymer and 220.3 parts deionized water are added. With agitation on and the vessel blanketed with inert gas, the mixture is heated to 82° C. In a separate vessel a mixture of 65.15 parts butyl methacrylate, 16.29 parts butyl acrylate, 9.05 parts methyl methacrylate and 0.75 parts benzoin is prepared. The monomers used are butyl methacrylate/butyl acrylate/methyl methacrylate at a weight ratio of 72/18/10 with a Fox equation calculated Tg of 9° C. This mixture represents stage 1 polymerizable monomers. In another vessel an initiator solution is prepared by mixing 1.62 parts 34% hydrogen peroxide and 72 parts deionized water. In yet another vessel a mixture of 11.87 parts butyl methacrylate, 5.87 parts butyl acrylate, 100.75 parts methyl methacrylate and 0.87 parts benzoin is prepared. The monomers used are butyl methacrylate/butyl acrylate/methyl methacrylate at a weight ratio of 10/5/85 with a Fox equation calculated Tg of 82° C. This mixture represents stage 2 polymerizable monomers. When the reactor temperature reaches 81° C., the stage 1 monomer mixture and the initiator solution are fed separately into the reactor over 240 minutes. Concurrently, the stage 2 monomer mixture is fed into the stage 1 monomer mixture over 225 minutes. After 240 minutes, 81.25 parts deionized water is used to rinse both stage 1 and 2 monomer mixture vessels into the reactor. With the contents of the reactor at 82° C., 0.12 parts benzoin and 0.12 parts 34% hydrogen peroxide are added and rinsed into the reactor with 7.37 parts deionized water. The batch is held for 30 minutes and allowed to exotherm. After 30 minutes 0.12 parts benzoin and 0.12 parts 34% hydrogen peroxide are added and rinsed into the reactor with 7.37 parts deionized water. The batch is held at temperature for one hour and then cooled. The resultant gradient Tg latex should contain about 30% solids and have an acid number of about 36 mg KOH/g and 0.3 micrometer average particle size.

The invention is further disclosed in the following embodiments:

1. An aqueous coating composition comprising:
a multi-stage polymeric latex having two or more emulsion polymerized stages, wherein the latex has one or both of: (i) a lower Tg emulsion polymerized stage having a calculated Tg that is at least 20° C., at least 30° C., at least 35° C., at least 40° C., at least 50° C., at least 60° C., or at least 70° C. lower than a calculated Tg of a higher Tg emulsion polymerized stage or (ii) a gradient Tg; with the proviso that if the latex has (i), more than 50 weight percent of the emulsion polymerized stages preferably have a calculated Tg of at least 40° C., at least 50° C., at least 60° C., at least 70° C., or at least 80° C.; and
an aqueous carrier liquid;
wherein the aqueous coating composition is a food or beverage can coating composition.

2. An aqueous coating composition comprising:
a resin system including a water-dispersible polymer and two or more emulsion polymerized stages of a multi-stage polymeric latex; wherein the water-dispersible polymer is incorporated into the multi-stage polymeric latex, blended with the multi-stage polymeric latex, or both; and wherein the latex has one or both of: (i) a lower Tg emulsion polymerized stage having a calculated Tg that is at least 20° C., at least 30° C., at least 35° C., at least 40° C., at least 50° C., at least 60° C., or at least 70° C. lower than a calculated Tg of a higher Tg emulsion polymerized stage or (ii) a gradient Tg; and
an aqueous carrier liquid;
wherein the aqueous coating composition is a food or beverage can coating composition.

3. The coating composition of embodiment 2, wherein monomers used to form the two or more emulsion polymerized stages are emulsion polymerized in the presence of the water-dispersible polymer.

4. The coating composition of embodiment 2 or 3, wherein the water-dispersible polymer comprises an acrylic polymer, a polyether polymer, a polyolefin polymer, a polyester polymer, a polyurethane polymer, or a mixture or copolymer thereof.

5. An aqueous coating composition comprising:
a resin system including a multi-stage polymeric latex having two or more emulsion polymerized stages, wherein the multi-stage latex is formed by emulsion polymerizing ethylenically unsaturated monomers in the presence of an aqueous dispersion of a water-dispersible polymer, wherein:
the latex has one or both of: (i) a lower Tg emulsion polymerized stage having a calculated Tg that is at least 20° C., at least 30° C., at least 35° C., at least 40° C., at least 50° C., at least 60° C., or at least 70° C. lower than a calculated Tg of a higher Tg emulsion polymerized stage or (ii) a gradient Tg, and
the water-dispersible polymer comprises a polyether polymer; and
an aqueous carrier liquid;
wherein the aqueous coating composition is a food or beverage can coating composition.

6. The coating composition of any of embodiments 2 to 5, with the proviso that if the latex has (i), more than 50 weight percent of the emulsion polymerized stages have a calculated Tg of at least 40° C., at least 50° C., at least 60° C., at least 70° C., or at least 80° C.

7. An aqueous coating composition comprising:
a resin system including a multi-stage polymeric latex formed by emulsion polymerizing ethylenically unsaturated monomers in two or more stages (e.g., a lower Tg stage and a higher Tg stage) in the presence of a water-dispersible polymer (e.g., a polyether polymer), wherein the emulsion polymerized ethylenically unsaturated monomers comprise at least 80 wt. % of two or more (e.g., two, three, four, or five) of methyl methacrylate, ethyl acrylate, ethyl methacrylate, butyl acrylate (e.g., n-butyl acrylate), and butyl methacrylate (e.g., n-butyl methacrylate); and
an aqueous carrier liquid;
wherein the coating composition is a food or beverage can coating composition.

8. The coating composition of any of embodiments 2 to 7, wherein the resin system includes at least 60 wt. %, at least 65 wt. %, at least 70 wt. %, at least 75 wt. %, or at least 80 wt. % of units derived from ethylenically unsaturated monomers, based on the combined weight of the water-dispersible polymer and the monomers used to form the emulsion polymerized stages.

9. The coating composition of any preceding embodiment, wherein the higher Tg emulsion polymerized stage has a calculated Tg of greater than 40° C. and the lower Tg emulsion polymerized stage has a calculated Tg of less than 40° C.

10. The coating composition of any preceding embodiment, wherein the higher Tg emulsion polymerized stage has a calculated Tg of greater than 45° C. and the lower Tg emulsion polymerized stage has a calculated Tg of less than 35° C.

11. The coating composition of any preceding embodiment, wherein the higher Tg emulsion polymerized stage has a calculated Tg of greater than 50° C. and the lower Tg emulsion polymerized stage has a calculated Tg of less than 30° C.

12. The coating composition of any preceding embodiment, wherein the higher Tg emulsion polymerized stage has a calculated Tg of greater than 60° C. and the lower Tg emulsion polymerized stage has a calculated Tg of less than 20° C.

13. The coating composition of any preceding embodiment, wherein the higher Tg emulsion polymerized stage has a calculated Tg of greater than 70° C. and the lower Tg emulsion polymerized stage has a calculated Tg of less than 10° C.

14. The coating composition of any preceding embodiment, wherein the lower Tg emulsion polymerized stage is emulsion polymerized before the higher Tg emulsion polymerized stage.

15. The coating composition of any of embodiments 1 to 13, wherein the lower Tg emulsion polymerized stage is emulsion polymerized after the higher Tg emulsion polymerized stage.

16. The coating composition of any preceding embodiment, wherein the weight ratio of the lower Tg emulsion polymerized stage relative to the higher Tg emulsion polymerized stage ranges from 5:95 to 95:5, from 20:80 to 70:30, or from 25:75 to 48:52.

17. The coating composition of any preceding embodiment, wherein the monomers used to form at least one of the emulsion polymerized stages (and in some embodiments the aggregate of monomers used to form the two or more emulsion polymerized stages) include at least 30 wt. %, at least 50 wt. %, at least 70 wt. %, at least 85 wt. %, or at least 95 wt. % (or even 100 wt. %) of one or more (meth) acrylates.

18. The coating composition of any preceding embodiment, wherein the monomers used to form at least one of the emulsion polymerized stages (and in some embodiments the aggregate of monomers used to form the two or more emulsion polymerized stages) include at least 30 wt. %, at least 50 wt. %, at least 70 wt. %, at least 85 wt. %, or at least 95 wt. % (or even 100 wt. %) of one or more alkyl (meth)acrylates.

19. The coating composition of any preceding embodiment, wherein the monomers used to form at least one of the emulsion polymerized stages (and in some embodiments the aggregate of monomers used to form the two or more emulsion polymerized stages) include at least 30 wt. %, at least 50 wt. %, at least 70 wt. %, at least 85 wt. %, or at least 95 wt. % of one or more alkyl methacrylates.

20. The coating composition of any preceding embodiment, wherein the monomers used to form at least one of the emulsion polymerized stages (and in some embodiments the aggregate of monomers used to form the two or more emulsion polymerized stages) include at least 30 wt. %, at least 35 wt. %, at least 40 wt. %, or at least 45 wt. %, or even 80 wt. % or more of one or more ethylenically unsaturated monomers having a cycloaliphatic group or a linear or branched hydrocarbon group including at least 4 carbon atoms.

21. The coating composition of any preceding embodiment, wherein the monomers used to form at least one of the emulsion polymerized stages (and in some embodiments the aggregate of the monomers used to form the two or more emulsion polymerized stages) include at least 20 wt. %, at least 30 wt. %, at least 35 wt. %, at least 40 wt. %, or even 80 wt. % or more of one or more ethylenically unsaturated monomers having a linear or branched hydrocarbon group including at least 4 carbon atoms and having a longest chain length of at least 3 carbon atoms.

22. The coating composition of any preceding embodiment, wherein the monomers used to form at least one of the emulsion polymerized stages (and in some embodiments the monomers used to form each of the respective two or more emulsion polymerized stages) include one or more C1-C3 alkyl (meth)acrylates.

23. The coating composition of embodiment 22, wherein the one or more C1-C3 alkyl (meth)acrylates comprise ethyl methacrylate, methyl methacrylate, or a combination thereof.

24. The coating composition of any of embodiments 20 to 23, wherein the monomers used to form at least one of the emulsion polymerized stages (and in some embodiments the monomers used to form each of two or more respective two or more emulsion polymerized stages) include both the one or more ethylenically unsaturated monomers having a cycloaliphatic group or a linear or branched hydrocarbon group including at least 4 carbon atoms and the one or more C1-C3 alkyl (meth)acrylates.

25. The coating composition of any of embodiments 1 to 6 or 8 to 24, wherein the monomers used to form at least one of the emulsion polymerized stages (and in some embodiments the aggregate of monomers used to form the two or more emulsion polymerized stages) include at least 80 wt. % of one or more (e.g., one, two, three, four, or five) of methyl methacrylate, ethyl acrylate, ethyl methacrylate, butyl acrylate (e.g., n-butyl acrylate), and butyl methacrylate (e.g., n-butyl methacrylate).

26. The coating composition of any preceding embodiment, wherein the monomers used to form at least one of the emulsion polymerized stages (and in some embodiments the monomers used to form each of the respective two or more emulsion polymerized stages) include a butyl methacrylate, a butyl acrylate, or both.

27. The coating composition of embodiment 26, wherein the monomers used to form the at least one emulsion polymerized stage, and in some embodiments the monomers used to form each of the respective two or more emulsion polymerized stages, include both n-butyl methacrylate and one or both of ethyl methacrylate or methyl methacrylate.

28. The coating composition of embodiment 27, wherein the monomers used to form the at least one emulsion polymerized stage, and in some embodiments the monomers used to form each of the respective two or more emulsion polymerized stages, further include one or more of ethyl acrylate, methyl acrylate, or n-butyl acrylate.

29. The coating composition of any preceding embodiment, wherein the monomers used to form at least one of the emulsion polymerized stages includes a multi-ethylenically unsaturated monomer (e.g., a multi-ethylenically unsaturated (meth)acrylate).

30. The coating composition of any preceding embodiment, wherein the coating composition is substantially free of, completely free of or does not contain each of bisphenol A, bisphenol F, and bisphenol S.

31. The coating composition of any preceding embodiment, wherein the coating composition is not prepared using halogenated monomers, or is substantially free of, completely free of or does not contain halogenated monomers.

32. The coating composition of any preceding embodiment, wherein the coating composition is substantially free of, completely free of or does not contain styrene and optionally also is substantially free of, completely free of or does not contain substituted styrene compounds.

33. The coating composition of any preceding embodiment, wherein the resin system (and optionally the coating composition) is substantially free of, completely free of or does not contain vinyl aromatic compounds 34. The coating composition of any preceding embodiment, wherein the calculated Tg of the aggregate of monomers used to form the two or more emulsion polymerized stages is at least 0° C., at least 20° C., at least 30° C., at least 40° C., or at least 50° C.

35. The coating composition of any preceding embodiment, wherein the monomers used to form the lower Tg and higher Tg emulsion polymerized stages (and optionally any additional optional emulsion polymerized stages) do not include any monomers that do not have a homopolymer Tg.

36. The coating composition of any preceding embodiment, wherein the monomers used to form the lower Tg and higher Tg emulsion polymerized stages include less than 5 weight percent, if any, of monomers that do not have a homopolymer Tg, based on the total weight of the monomers used to form the lower Tg and higher Tg stages.

37. The coating composition of any of embodiments 2 to 36, wherein the resin system consists essentially of the water-dispersible polymer and the two or more emulsion polymerized ethylenically unsaturated monomers.

38. The coating composition of any preceding embodiment, wherein the two or more emulsion polymerized stages consist essentially of the lower Tg and higher Tg emulsion polymerized stages.

39. The coating composition of any of embodiments 2 to 36, wherein the water-dispersible polymer includes one or more neutralized acid or base groups.

40. The coating composition of any of embodiments 2 to 39, wherein the water-dispersible polymer includes one or more structural units derived from ethylenically unsaturated monomer, more typically one or more structural units derived from an acrylate or a methacrylate.

41. The coating composition of embodiment 40, wherein the water-dispersible polymer includes one or more structural unit derived from an acid- or anhydride-functional ethylenically unsaturated monomer.

42. The coating composition of any of embodiments 39 to 41, wherein the water-dispersible polymer includes one or more ammonia-neutralized or amine-neutralized acid or anhydride groups.

43. The coating composition of any of embodiments 2 to 42, wherein the weight ratio of water-dispersible polymer to emulsion polymerized stages is less than 50:50, less than 40:60, less than 30:70, less than 25:75, or less than 20:80.

44. The coating composition of any of embodiments 2 to 43, wherein the water-dispersible polymer comprises a polyether polymer that has a calculated Tg of at least 60° C., at least 70° C., at least 80° C., or from 80 to 110° C.

45. The coating composition of any of embodiments 2 to 44, wherein the water-dispersible polymer comprises an aromatic polyether polymer.

46. The coating composition of any of embodiments 2 to 45, wherein the water-dispersible polymer has a number average molecular weight of at least 2,000, at least 3,000, or at least 4,000.

47. The coating composition of any of embodiments 2 to 46, wherein the water-dispersible polymer comprises an organic solution polymerized polymer.

48. The coating composition of any of embodiments 2 to 47, wherein the water-dispersible polymer comprises a polyether polymer formed from reactants including an extender and a diepoxide.

49. The coating composition of embodiment 48, wherein the diepoxide comprises a diepoxide of a dihydric phenol.

50. The coating composition of embodiment 49, wherein the dihydric phenol comprises an ortho-substituted dihydric phenol.

51. The coating composition of embodiment 50, wherein the diepoxide of an ortho-substituted dihydric phenol comprises a diepoxide of tetramethyl bisphenol F (e.g., a diglycidyl ether of tetramethyl bisphenol F).

52. The coating composition of embodiment 50, wherein the diepoxide of an ortho-substituted dihydric phenol comprises a diepoxide of 2,2'-biphenol or other bridged dihydric phenol having a ring to ring bridge linkage located ortho to a phenol oxygen atom.

53. The coating composition of embodiment 48, wherein the diepoxide comprises a diepoxide of an aromatic diol (e.g., benzene dimethanol, vanillyl alcohol, furan dimethanol, and the like), an aromatic diacid (e.g., isophthalic acid, terephthalic acid, and the like), an aliphatic diol, an aliphatic diacid, a cycloaliphatic diol (e.g., cyclobutane diols such as 2,2,4,4-tetramethyl-1,3-cyclobutanediol), a cycloaliphatic diacid (e.g., cyclobutane diacids such as 2,2,4,4-tetramethyl-1,3-cyclobutane dicarboxylic acid), or a combination thereof.

54. The coating composition of any of embodiments 48 to 53, wherein the extender comprises a dihydric phenol.

55. The coating composition of embodiment 54, wherein the extender comprises a dihydric monophenol.

56. The coating composition of embodiment 55, wherein the dihydric monophenol comprises hydroquinone.

57. The coating composition of embodiment 54, wherein the extender comprises 2,2'-biphenol or other bridged dihydric phenol having a ring to ring bridge linkage located ortho to a phenol oxygen atom.

58. The coating composition of any of embodiments 2 to 50 and 53 to 56, wherein the water-dispersible polymer (and optionally the coating composition) is substantially free of, completely free of or does not contain any structural units derived from a bisphenol.

59. The coating composition of any of embodiments 2 to 58, wherein the water-dispersible polymer comprises a copolymer that includes both a polyether polymer and a vinyl addition component.

60. The coating composition of embodiment 59, wherein the water-dispersible polymer comprises a polyether-acrylate copolymer.

61. The coating composition of embodiment 59 or 60, wherein the vinyl addition component is formed from a monomer mixture that includes both (i) a (meth)acrylic acid and (ii) a (meth)acrylate.

62. The coating composition of embodiment 60 or 61, wherein the polyether-acrylate copolymer comprises the reaction product of an oxirane-functional polyether polymer reacted with an acid- or anhydride-functional acrylate polymer in the presence of a tertiary amine.

63. The coating composition of any of embodiments 60 to 62, wherein a polyether polymer used to form the polyether-acrylate copolymer comprises from 30 to 95 wt. % of the polyether-acrylate copolymer.

64. The coating composition of any of embodiments 2 to 63, wherein the water-dispersible polymer has an acid number from 40 to 200 mg KOH per gram.

65. The coating composition of any of embodiments 2 to 64, wherein the water-dispersible polymer includes secondary hydroxyl groups.

66. The coating composition of any of embodiments 2 to 65, wherein the water-dispersible polymer includes —CH$_2$CH(OH)CH$_2$— segments.

67. The coating composition of any preceding embodiment, wherein the coating composition is substantially free of, completely free of or does not contain each of bisphenol A, bisphenol F, and bisphenol S.

68. The coating composition of any preceding embodiment, wherein the coating composition has a viscosity of from 20 to 80 seconds (Ford Cup #2, 25° C.) and is an inside spray coating composition for a food or beverage can.

69. The coating composition of any preceding embodiment, wherein the coating composition, when spray applied onto an interior of a 355 mL no. 211 drawn & ironed aluminum beverage can at a dry film weight of 115 milligrams per can and cured at 188° C. to 199° C. (measured at the can dome) for 55 seconds, exhibits a lower sidewall adhesion rating value of 9 or 10 after retort in 2% citric acid under pressure at 121° C. and tested according to ASTM D 3359—Test Method B, using SCOTCH 610 tape, available from 3M Company of Saint Paul, Minn.

70. The coating composition of any preceding embodiment, wherein the coating composition, when spray applied onto an interior of a 355 mL no. 211 drawn & ironed aluminum beverage can at a dry film weight of 115 milligrams per can and cured at 188° C. to 199° C. (measured at the can dome) for 55 seconds, exhibits a contact angle with deionized water greater than about 80, more preferably greater than about 85, and even more preferably greater than about 90.

71. The coating composition of any preceding embodiment, wherein the resin system comprises at least 10 wt. %, at least 20 wt. %, at least 50 wt. %, at least 75 wt. %, at least 90 wt. %, or at least 99 wt. % of the coating composition, based on the combined weight of the water-dispersible polymer and the two or more emulsion polymerized stages relative to the total weight of the resin solids in the coating composition.

72. The coating composition of any preceding embodiment, wherein the coating composition includes a crosslinker.

73. The coating composition of embodiment 72, wherein the crosslinker comprises a phenoplast.

74. The coating composition of any preceding embodiment, wherein the aqueous carrier liquid comprises at least 50 wt. % water.

75. The coating composition of any preceding embodiment, wherein the coating composition comprises from 5 wt. % to 40 wt. % of solids, more typically from 10 wt. % to 30 wt. % of solids, and from 15 wt. % to 25 wt. % of solids.

76. The coating composition of any preceding embodiment, wherein the coating compositions includes, based on total resin solids, at least 50 wt. % of the two or more emulsion polymerized stages.

77. The coating composition of any of embodiments 2 to 76, wherein the coating composition includes, based on total resin solids, at least 50 wt. %, at least 75 wt. %, at least 90 wt. %, or at least 95 wt. % of the water-dispersible polymer and the two or more emulsion polymerized stages, based on the combined weight of the water-dispersible polymer and the two or more emulsion polymerized stages.

78. The coating composition of any of embodiments 2 to 77, wherein the total amount of polymerized ethylenically unsaturated monomers comprise more than 50 wt. %, preferably more than 60 wt. %, even more preferably more than 70 wt. %, and optimally 80 wt. % or more of the total resin solids of the coating composition.

79. The coating composition of embodiment 78, where the emulsion polymerized monomers of the higher Tg and lower Tg comprise at least 50 wt. %, at least 60 wt. %, at least 75 wt. %, or at least 85 wt. % or more of the total amount of polymerized ethylenically unsaturated monomers present in the coating composition.

80. The coating composition of any of embodiments 2 to 79, wherein polymerized ethylenically unsaturated monomers comprise at least 60 wt. %, at least 65 wt. %, at least 70 wt. %, at least 75 wt. %, or at least 80 wt. % of the total combined weight of water-dispersible polymer and polymerized ethylenically unsaturated monomers.

81. The coating composition of any preceding embodiment, wherein when the coating composition, when spray applied onto an interior of a 355 mL no. 211 two-piece drawn and ironed aluminum beverage can at 115 milligrams per can coating weight and cured at 188° C. to 199° C. (measured at the can dome) for 55 seconds, gives a metal exposure of less than 3.5 mA when tested pursuant to the Metal Exposure after Drop Damage test disclosed herein.

82. The coating composition of any preceding embodiment, wherein when the coating composition, when spray applied onto an interior of a 355 mL no. 211 two-piece drawn and ironed aluminum beverage can at 115 milligrams per can coating weight and cured at 188° C. to 199° C. (measured at the can dome) for 55 seconds, is capable of passing a necking and flanging test as indicated by a change of metal exposure after necking of less than 1.0 mA, more preferably a change of less 0.1 mA, and even more preferably no measurable change.

83. A food or beverage can, or a portion thereof, having a cured coating formed from the coating composition of any preceding embodiment disposed on at least a portion of a metal substrate.

84. The food or beverage can, or a portion thereof, of embodiment 83, wherein the overall average dry coating film weight is from 1.0 to 6.5 grams per square meter.

85. The food or beverage can, or a portion thereof, of embodiment 83 or 84, wherein the metal substrate has an average thickness from 125 to 635 micrometers.

86. The food or beverage can, or a portion thereof, of any of embodiments 82 to 84 wherein the coating is an interior food-contact coating of an aluminum beverage can.

87. The food or beverage can of any of embodiments 83 to 86, wherein the cured coating exhibits a contact angle with deionized water greater than about 80, more preferably greater than about 85, and even more preferably greater than about 90.

88. The food or beverage can of any of embodiments 83 to 87 containing a packaged food or beverage product.

89. A method of coating a food or beverage can comprising applying the coating composition of any of embodiments 1 to 82 to a surface of a metal substrate prior to or after forming the metal substrate into a food or beverage can or a portion thereof.

90. The method of embodiment 89 wherein the coating composition is spray applied onto an interior surface of a can including a sidewall body portion and end portion.

91. The method of embodiment 89 or 90, wherein the can is an aluminum beverage can.

92. The multi-stage polymeric latex of embodiment 1 or resin system of any of embodiments 2 to 81.

93. A method of making a latex dispersion that is substantially free of, completely free of or does not contain each of bisphenol A, bisphenol F, and bisphenol S, and is also optionally substantially free of, completely free of or does not contain styrene, the method comprising:
   providing an aqueous dispersion of a water-dispersible polymer (e.g., a water-dispersible polymer of any preceding embodiment); and
   emulsion polymerizing two or more stages in the presence of the aqueous dispersion to form a multi-stage polymeric latex, wherein the latex has one or both of: (i) a lower Tg emulsion polymerized stage having a calculated Tg that is preferably at least 20° C., at least 30° C., at least 35° C., at least 40° C., at least 50° C., at least 60° C., or at least 70° C. lower than a calculated Tg of a higher Tg emulsion polymerized stage or (ii) a gradient Tg.

94. The method of embodiment 93, wherein the water-dispersible polymer comprises a polyether polymer.

95. The method of embodiment 93, wherein the polyether polymer comprises an aromatic polyether polymer having base-neutralized acid groups, acid-neutralized base groups, or a combination thereof.

96. The method of any of embodiments 93 to 95, wherein the weight ratio of water-dispersible polymer to emulsion polymerized stages is less than 50:50, less than 40:60, less than 30:70, less than 25:75, or less than 20:80.

97. The method of any of embodiments 93 to 95, wherein polymerized ethylenically unsaturated monomers comprise at least 60 wt. %, at least 65 wt. %, at least 70 wt. %, at least 75 wt. %, or at least 80 wt. % of the total combined weight of water-dispersible polymer and polymerized ethylenically unsaturated monomers.

98. The method of any of embodiments 93 to 97, wherein the lower Tg emulsion polymerized stage is emulsion polymerized before the higher Tg emulsion polymerized stage.

99. The method of any of embodiments 93 to 97, wherein the lower Tg emulsion polymerized stage is emulsion polymerized after the higher Tg emulsion polymerized stage.

100. The latex dispersion resulting from any of embodiments 93 to 99.

101. The coating composition, can, method, polymeric latex or latex dispersion of any preceding embodiment, wherein the emulsion polymerized ethylenically unsaturated monomer component, and more preferably the entire latex, includes or is derived from no more than 0.5 wt. %, and more preferably no more than 0.1 wt. % of low molecular weight surfactants based on the aggregate weight of the ethylenically unsaturated monomer component and polymerizable monomers employed to make the latex.

102. The coating composition, can, method, polymeric latex or latex dispersion of any of embodiments 1 to 100, wherein the emulsion polymerized ethylenically unsaturated monomer component, and more preferably the entire latex, is derived using primarily or only low molecular weight surfactants.

103. The coating composition, can, method, polymeric latex or latex dispersion of any preceding embodiment, wherein the emulsion polymerized ethylenically unsaturated monomer component, and more preferably the entire latex, is also or instead emulsion polymerized in the presence of one or more polymerizable surfactants.

104. The coating composition, can, method, polymeric latex or latex dispersion of any preceding claim, wherein the emulsion polymerized ethylenically unsaturated monomer component, and more preferably the entire latex, includes or is derived from no more than 0.5 wt. %, and more preferably no more than 0.1 wt. % of acrylamide-type monomers based on the aggregate weight of the ethylenically unsaturated monomer component and polymerizable monomers employed to make the latex.

The complete disclosure of all patents, patent applications, and publications (including material safety data sheets, technical data sheets and product brochures for the raw materials and ingredients used in the Examples), and electronically available material cited herein are incorporated herein by reference as if individually incorporated. The foregoing detailed description and examples have been given for clarity of understanding only. No unnecessary limitations are to be understood therefrom. The invention is not limited to the exact details shown and described, for variations obvious to one skilled in the art will be included within the invention defined by the embodiments. The invention illustratively disclosed herein suitably may be practiced, in some embodiments, in the absence of any element which is not specifically disclosed herein.

The invention claimed is:

1. An aqueous coating composition comprising:
a resin system including a water-dispersible polymer and a multi-stage polymeric latex having two or more emulsion polymerized stages in an aqueous carrier liquid, wherein the water-dispersible polymer is incorporated into the multi-stage polymeric latex, blended with the multi-stage polymeric latex, or both; the aqueous carrier liquid contains greater than about 5% organic solvents based on the total weight of the aqueous carrier liquid; the aqueous coating composition is a sprayable composition for a food or beverage container; and wherein the latex has one or both of:
  (i) a lower Tg emulsion polymerized stage having a calculated Tg that is at least 20° C. lower than a calculated Tg of a higher Tg emulsion polymerized stage, and wherein polymerization of the lower Tg emulsion polymerized stage is initiated before initiating polymerization of the higher Tg emulsion polymerized stage, or
  (ii) a gradient Tg with at least a 20° C. differential in the calculated Tg of monomers fed at the start of polymerization compared to monomers fed at the end of polymerization.

2. An article that has been or will be formed into a food or beverage container or container component, the article comprising a metal substrate having on at least one surface a coating formed from a sprayable aqueous coating composition comprising:
a resin system including a water-dispersible polymer and two or more emulsion a multi-stage polymeric latex having two or more emulsion polymerized stages in an aqueous carrier liquid, wherein the water-dispersible polymer is incorporated into the multi-stage polymeric latex, blended with the multi-stage polymeric latex, or both; the aqueous carrier liquid contains greater than about 5% organic solvents based on the total weight of the aqueous carrier liquid; and wherein the latex has one or both of:
  (i) a lower Tg emulsion polymerized stage having a calculated Tg that is at least 20° C. lower than a calculated Tg of a higher Tg emulsion polymerized stage, and wherein polymerization of the lower Tg emulsion polymerized stage is initiated before initiating polymerization of the higher Tg emulsion polymerized stage, or
  (ii) a gradient Tg with at least a 20° C. Tg differential in the calculated Tg of monomers fed at the start of polymerization compared to monomers fed at the end of polymerization.

3. A method for making a coated food or beverage container or container component, the method comprising the steps of:
  (a) spray-applying on an interior surface of a metal food or beverage container having a body portion and an end portion an aqueous coating composition comprising a resin system including a water-dispersible polymer and a multi-stage polymeric latex having two or more emulsion polymerized stages in an aqueous carrier liquid, wherein the water-dispersible polymer is incorporated into the multi-stage polymeric latex, blended with the multi-stage polymeric latex, or both; the aqueous carrier liquid contains greater than about 5% organic solvents based on the total weight of the aqueous carrier liquid; and wherein the latex has one or both of:
    (i) a lower Tg emulsion polymerized stage having a calculated Tg that is at least 20° C. lower than a calculated Tg of a higher Tg emulsion polymerized stage, and wherein polymerization of the lower Tg emulsion polymerized stage is initiated before initiating polymerization of the higher Tg emulsion polymerized stage, or
    (ii) a gradient Tg with at least a 20° C. Tg differential in the calculated Tg of monomers fed at the start of polymerization compared to monomers fed at the end of polymerization; and (b) curing the coating composition to form a hardened coating.

4. The composition of claim 1, wherein the latex has a gradient Tg.

5. The composition of claim 4, wherein the water-dispersible polymer comprises a solution-polymerized acrylic polymer, a polyether polymer, a polyolefin polymer, a polyester polymer, a polyurethane polymer, or a mixture or copolymer thereof.

6. The composition of claim 4, wherein the water-dispersible polymer comprises a polyolefin polymer.

7. The composition of claim 4, wherein the water-dispersible polymer comprises an aromatic polyether polymer.

8. The composition of claim 4, wherein the water-dispersible polymer comprises a polyether polymer formed from reactants including an extender and a diepoxide of an ortho-substituted dihydric phenol.

9. The composition of claim 4, wherein the water-dispersible polymer comprises a polyether-acrylate copolymer.

10. The composition of claim 4, wherein the two or more emulsion polymerized stages are emulsion polymerized in the presence of the water-dispersible polymer.

11. The composition of claim 4, wherein the two or more emulsion polymerized stages are emulsion polymerized in the presence of one or more polymerizable surfactants.

12. The composition of claim 4, wherein the two or more emulsion polymerized stages are emulsion polymerized without the use of non-polymeric surfactants.

13. The composition of claim 4, wherein the multi-stage polymeric latex does not include and is not derived from more than 0.5 wt. % of low molecular weight surfactants based on the aggregate weight of polymerizable monomers employed to make the latex.

14. The composition of claim 4, wherein the water-dispersible polymer has an acid number from 40 to 200 mg KOH per gram.

15. The composition of claim 4, wherein the weight ratio of water-dispersible polymer to emulsion polymerized stages is less than 40:60.

16. The composition of claim 4, wherein the latex has a lower Tg emulsion polymerized stage having a calculated Tg of less than 20° C. and a higher Tg emulsion polymerized stage having a calculated Tg of greater than 60° C.

17. The composition of claim 4, wherein the latex has a lower Tg emulsion polymerized stage having a calculated Tg that is at least 40° C. lower than a calculated Tg of the higher Tg emulsion polymerized stage.

18. The composition of claim 4, wherein more than 50 weight percent of the emulsion polymerized stages have a calculated Tg of at least 40° C.

19. The composition of claim 4, wherein two or more of the emulsion polymerized stages are formed from monomers having in the aggregate a calculated Tg of at least 30° C.

20. The composition of claim 4, wherein the aqueous coating composition includes, based on total resin solids, at least 50 wt. % of the two or more emulsion polymerized stages, and contains more than 70 wt. % resin solids from polymerized ethylenically unsaturated monomers based on total resin solids in the coating composition.

21. The composition of claim 4, wherein at least one of the emulsion polymerized stages is formed from monomers including at least 50 wt. % of one or more (meth)acrylates.

22. The composition of claim 4, wherein at least one of the emulsion polymerized stages is formed from monomers including at least 80 wt. % of one or more of methyl methacrylate, ethyl acrylate, ethyl methacrylate, butyl acrylate, and butyl methacrylate.

23. The composition of claim 4, wherein the coating composition is substantially free of each of bisphenol A, bisphenol F, and bisphenol S; is not prepared using halogenated monomers; and includes or is derived from no more than 0.5 wt. % of acrylamide-type monomers based on the aggregate weight of the ethylenically unsaturated monomer component and polymerizable monomers employed to make the latex.

24. The composition of claim 4, wherein the coating composition is substantially free of styrene and substituted styrene compounds.

25. The composition of claim 4, wherein the aqueous coating composition has a viscosity of from 20 to 80 seconds (Ford Cup #2, 25° C.) and is an inside spray coating composition for a food or beverage can.

26. The composition of claim 4, wherein the aqueous coating composition, when spray applied onto an interior of a 355 mL no. 211 two-piece drawn and ironed aluminum beverage can at 115 milligrams per can coating weight and cured at 188° C. to 199° C. (measured at the can dome) for 55 seconds, exhibits:
  (i) a global extraction result of less than 50 ppm; and
  (ii) a metal exposure of less than 3 mA on average when the can is filled with 1% NaCl in deionized water and tested pursuant to the Initial Metal Exposure test method disclosed herein.

27. The composition of claim 4, wherein the aqueous coating composition, when spray applied onto an interior of a 355 mL no. 211 two-piece drawn and ironed aluminum beverage can at 115 milligrams per can coating weight and cured at 188° C. to 199° C. (measured at the can dome) for 55 seconds, gives a metal exposure of less than 3.5 mA when tested pursuant to the Metal Exposure after Drop Damage test disclosed herein.

28. The article of claim 2, wherein the coating composition is cured and is on an interior food-contact coating of an aluminum beverage can.

29. The article of claim 2, wherein the coating composition is cured and the container further comprises a packaged food or beverage product.

30. The composition of claim 4, wherein the aqueous coating composition further comprises a beta-hydroxyalkyl-amide crosslinker.

31. The composition of claim 1, wherein the latex has a lower Tg emulsion polymerized stage having a calculated Tg that is at least 20° C. lower than a calculated Tg of a higher Tg emulsion polymerized stage, and wherein polymerization of the lower Tg emulsion polymerized stage is initiated before initiating polymerization of the higher Tg emulsion polymerized stage.

32. The composition of claim 31, wherein the water-dispersible polymer comprises a solution-polymerized acrylic polymer, a polyether polymer, a polyolefin polymer, a polyester polymer, a polyurethane polymer, or a mixture or copolymer thereof.

33. The composition of claim 31, wherein the water-dispersible polymer comprises a polyolefin polymer.

34. The composition of claim 31, wherein the water-dispersible polymer comprises an aromatic polyether polymer.

35. The composition of claim 31, wherein the water-dispersible polymer comprises a polyether polymer formed from reactants including an extender and a diepoxide of an ortho-substituted dihydric phenol.

36. The composition of claim 31, wherein the water-dispersible polymer comprises a polyether-acrylate copolymer.

37. The composition of claim 31, wherein the multi-stage polymeric latex is emulsion polymerized in the presence of the water-dispersible polymer.

38. The composition of claim 31, wherein the multi-stage polymeric latex is emulsion polymerized in the presence of one or more polymerizable surfactants.

39. The composition of claim 31, wherein the multi-stage polymeric latex is emulsion polymerized without the use of non-polymeric surfactants.

40. The composition of claim 31, wherein the multi-stage polymeric latex does not include and is not derived from more than 0.5 wt. % of low molecular weight surfactants based on the aggregate weight of polymerizable monomers employed to make the latex.

41. The composition of claim 31, wherein the water-dispersible polymer has an acid number from 40 to 200 mg KOH per gram.

42. The composition of claim 31, wherein the weight ratio of water-dispersible polymer to emulsion polymerized stages is less than 40:60.

43. The composition of claim 31, wherein the latex has a lower Tg emulsion polymerized stage having a calculated Tg of less than 20° C. and a higher Tg emulsion polymerized stage having a calculated Tg of greater than 60° C.

44. The composition of claim 31, wherein the latex has a lower Tg emulsion polymerized stage having a calculated Tg that is at least 40° C. lower than a calculated Tg of the higher Tg emulsion polymerized stage.

45. The composition of claim 31, wherein more than 50 weight percent of the emulsion polymerized stages have a calculated Tg of at least 40° C.

46. The composition of claim 31, wherein two or more of the emulsion polymerized stages are formed from monomers having in the aggregate a calculated Tg of at least 30° C.

47. The composition of claim 31, wherein the aqueous coating composition includes, based on total resin solids, at least 50 wt. % of the two or more emulsion polymerized stages, and contains more than 70 wt. % resin solids from polymerized ethylenically unsaturated monomers based on total resin solids in the coating composition.

48. The composition of claim 31, wherein at least one of the emulsion polymerized stages is formed from monomers including at least 50 wt. % of one or more (meth)acrylates.

49. The composition of claim 31, wherein at least one of the emulsion polymerized stages is formed from monomers including at least 80 wt. % of one or more of methyl methacrylate, ethyl acrylate, ethyl methacrylate, butyl acrylate, and butyl methacrylate.

50. The composition of claim 31, wherein the coating composition is substantially free of each of bisphenol A, bisphenol F, and bisphenol S; is not prepared using halogenated monomers; and includes or is derived from no more than 0.5 wt. % of acrylamide-type monomers based on the aggregate weight of the ethylenically unsaturated monomer component and polymerizable monomers employed to make the latex.

51. The composition of claim 31, wherein the coating composition is substantially free of styrene and substituted styrene compounds.

52. The composition of claim 31, wherein the aqueous coating composition has a viscosity of from 20 to 80 seconds (Ford Cup #2, 25° C.) and is an inside spray coating composition for a food or beverage can.

53. The composition of claim 31, wherein the aqueous coating composition, when spray applied onto an interior of a 355 mL no. 211 two-piece drawn and ironed aluminum beverage can at 115 milligrams per can coating weight and cured at 188° C. to 199° C. (measured at the can dome) for 55 seconds, exhibits:
  (i) a global extraction result of less than 50 ppm; and
  (ii) a metal exposure of less than 3 mA on average when the can is filled with 1% NaCl in deionized water and tested pursuant to the Initial Metal Exposure test method disclosed herein.

54. The composition of claim 31, wherein the aqueous coating composition, when spray applied onto an interior of a 355 mL no. 211 two-piece drawn and ironed aluminum beverage can at 115 milligrams per can coating weight and cured at 188° C. to 199° C. (measured at the can dome) for 55 seconds, gives a metal exposure of less than 3.5 mA when tested pursuant to the Metal Exposure after Drop Damage test disclosed herein.

55. The article of claim 32, wherein the coating composition is cured and is on an interior food-contact coating of an aluminum beverage can.

56. The article of claim 32, wherein the coating composition is cured and the container further comprises a packaged food or beverage product.

57. The composition of claim 31, wherein the aqueous coating composition further comprises a beta-hydroxyalkylamide crosslinker.

* * * * *